(12) United States Patent
Eggert et al.

(10) Patent No.: US 7,192,284 B2
(45) Date of Patent: Mar. 20, 2007

(54) INTERACTIVE EDUCATION SYSTEM FOR TEACHING PATIENT CARE

(75) Inventors: John S. Eggert, Miami, FL (US); Michael S. Eggert, Norfolk, VA (US); Devin Johns, Miami, FL (US); Phillip Vallejo, Miami, FL (US); Alberto Rodriguez, Miami, FL (US)

(73) Assignee: Gaumard Scientific Company, Inc., Miami, FL (US)

(*) Notice: Subject to any disclaimer, the term of this patent is extended or adjusted under 35 U.S.C. 154(b) by 322 days.

(21) Appl. No.: 10/721,307

(22) Filed: Nov. 25, 2003

(65) Prior Publication Data

US 2004/0157199 A1    Aug. 12, 2004

Related U.S. Application Data

(63) Continuation-in-part of application No. 10/292,192, filed on Nov. 11, 2002, now abandoned, which is a continuation of application No. 09/640,700, filed on Aug. 17, 2000, now Pat. No. 6,527,558.

(51) Int. Cl.
*G09B 23/28* (2006.01)

(52) U.S. Cl. ...................................... 434/268; 434/267

(58) Field of Classification Search ................ 434/262, 434/265, 267, 268, 272
See application file for complete search history.

(56) References Cited

U.S. PATENT DOCUMENTS 3,641,703 A    2/1972  Tepper et al.
3,797,130 A    3/1974  Knapp et al.
3,822,486 A    7/1974  Knapp et al.
3,824,709 A    7/1974  Knapp et al.
3,826,019 A    7/1974  Knapp et al.

(Continued)

FOREIGN PATENT DOCUMENTS

WO    WO02/01536    1/2002

(Continued)

OTHER PUBLICATIONS

American Heart Association CPR and Advanced Cardiac Life Support Learning System, Fighting Heart Disease and Stroke, American Heart Association.

(Continued)

*Primary Examiner*—Kurt Fernstrom
(74) *Attorney, Agent, or Firm*—Haynes and Boone, LLP

(57) ABSTRACT

An interactive education system is described for teaching patient care to a user. In one example, the system includes a model of a human body, including lungs, a passage in fluid communication with the lungs, and a breathing valve for controlling the flow of fluid through the passage. The system also includes a pneumatic module for delivering pressurized fluid to the fluid passage. A processor may be used to control the breathing valve. A memory is accessible to the processor for storing instructions for execution by the processor, including instructions for manipulating the breathing valve to regulate the flow of pressurized fluid from the pneumatic module to the lungs. The processor may also produce various physiological indicators, including waveforms, a pulse, etc. The indicators may be prerecorded or dynamically generated. An external device may be used to wirelessly control the processor.

45 Claims, 45 Drawing Sheets

U.S. PATENT DOCUMENTS

| | | | |
|---|---|---|---|
| 4,155,196 A | | 5/1979 | Bollinger et al. |
| 4,360,345 A | | 11/1982 | Hon |
| 4,430,893 A | | 2/1984 | Barkalow |
| 4,464,123 A | | 8/1984 | Glover et al. |
| 4,611,998 A | | 9/1986 | Ramamurthy |
| 4,797,104 A | | 1/1989 | Laerdal et al. |
| 4,828,501 A | | 5/1989 | Ingenito et al. |
| 4,850,876 A | | 7/1989 | Lutaenko et al. |
| 4,867,685 A | | 9/1989 | Brush et al. |
| 4,907,973 A | | 3/1990 | Hon |
| 4,932,879 A | * | 6/1990 | Ingenito et al. ............. 434/265 |
| 5,055,052 A | | 10/1991 | Johnsen |
| 5,083,962 A | | 1/1992 | Pracas |
| 5,100,329 A | | 3/1992 | Deesen et al. |
| 5,104,328 A | | 4/1992 | Lounsbury |
| 5,137,458 A | | 8/1992 | Ungs et al. |
| 5,195,896 A | * | 3/1993 | Sweeney et al. ............. 434/265 |
| 5,385,474 A | | 1/1995 | Brindle |
| 5,454,722 A | | 10/1995 | Holland et al. |
| 5,509,810 A | | 4/1996 | Schertz et al. |
| 5,538,005 A | | 7/1996 | Harrison et al. |
| 5,609,485 A | | 3/1997 | Bergman et al. |
| 5,704,791 A | | 1/1998 | Gillio |
| 5,769,640 A | | 6/1998 | Jacobus et al. |
| 5,799,282 A | | 8/1998 | Rakshit et al. |
| 5,853,292 A | | 12/1998 | Eggert et al. |
| 5,882,206 A | | 3/1999 | Gillio |
| 6,050,826 A | | 4/2000 | Christianson et al. |
| 6,117,078 A | | 9/2000 | Lysyansky et al. |
| 6,193,519 B1 | | 2/2001 | Eggert et al. |
| 6,219,032 B1 | | 4/2001 | Rosenberg et al. |
| 6,220,866 B1 | | 4/2001 | Amend et al. |
| 6,296,490 B1 | * | 10/2001 | Bowden ..................... 434/265 |
| 6,428,321 B1 | | 8/2002 | Jurmain et al. |
| 2003/0073060 A1 | | 4/2003 | Eggert et al. |

FOREIGN PATENT DOCUMENTS

WO     WO03/041034     5/2003

OTHER PUBLICATIONS

Promotional Literature, Advanced Cardiac Life Support, Ambu MegaCode Trainer System and Ambu Defib Training Manikin (1 page).

University of Miami, Division of Research in Medical Education, "Harvey"—The Cardiology Patient Simulator, pp. 1-5.

Human Patient Simulator, Clinical Features Summary, Medical Education Technologies, Inc., pp. 1-9.

Putting it all Together, Laerdal ALS Trainer Product Information.

Helping Save Lives, Laerdal Catalogue 1992.

Promotional Literature, Human Patient Simulator, 1994, Loral Data Systems.

Loral Data Systems, Physiology, Pharmacology & Technology together in the Human Patient Simulator, Mar. 1994.

Loral Data Systems, Education Curriculum Example Scenerio, Jul. 1994.

Loral Data Systems, Loral Data Systems Delivers Human Patient Simulators, Aug. 1994.

Loral Data Systems, Physiology, Pharmacology & Technology together in the Human Patient Simulator, Aug. 1994.

Medical Testing Takes Leap into the Future, newspaper article, Nov. 8, 1994.

Easy ACLS Quick Reference Chart 2, Advanced Cardiac Life Support Preparatory Manual, 1995.

Gaumard Scientific 95/96 Catalogue, p. 38.

Nasco Health Care Educational Materials, 1996-1997 Catalogue, pp. 46-67.

Armstrong 1996, #120 Catalogue, pp. 16-27.

Medical Education Technologies, Inc., Human Patient Simulator 1996.

METI, Practice is the Best Teacher Brochure, Medical Education Technologies, Inc. 1997.

www.laerdal.com Early Defibrillation Products—Laerdal AED Trainer and Laerdal Early Defibrillation Training Manikins, Nov. 16, 1998.

METI, The Biggest Smallest Innovation in Simulation Technology, Medical Education Technologies, Inc. 1999.

Gaumard Scientific 2002/2003 Catalogue.

Noelle, Birthing Simulator Product Promotional Information, 2002.

Lifesaving products for Today's Good Samaritans, Laerdal Catalogue 2003.

International Search Report and Written Opinion for PCT/US2004/39409, dated Oct. 24, 2005.

* cited by examiner

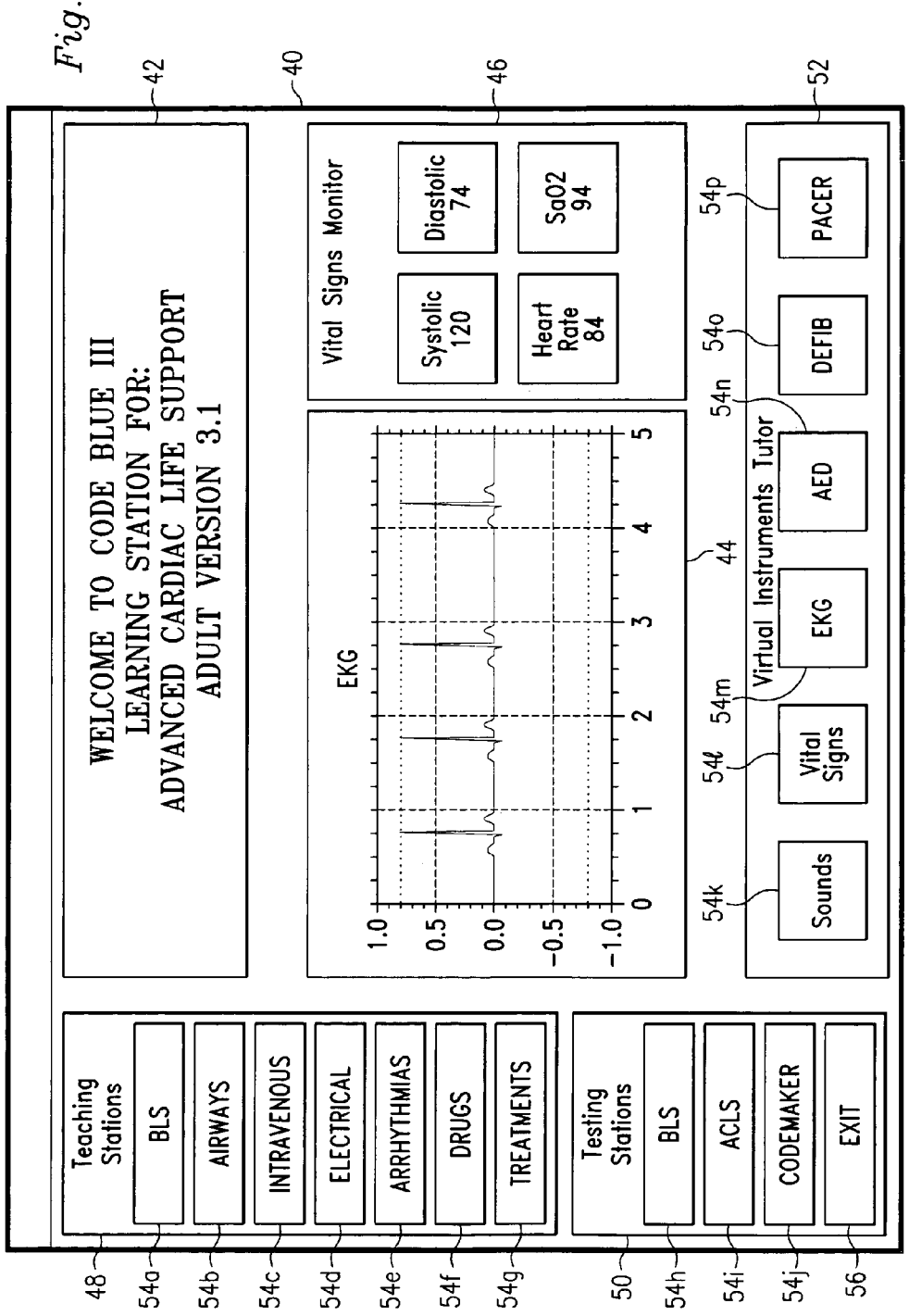

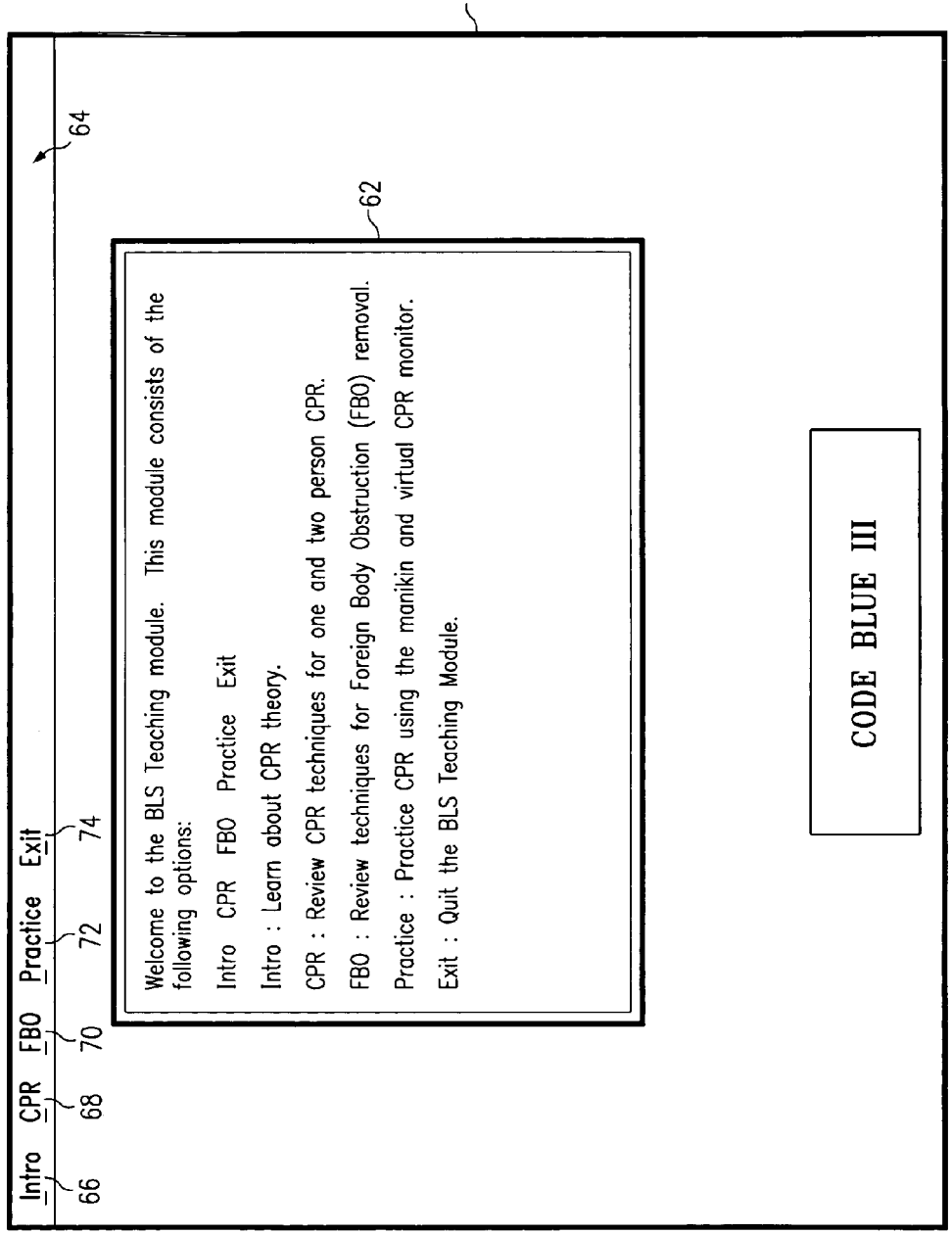

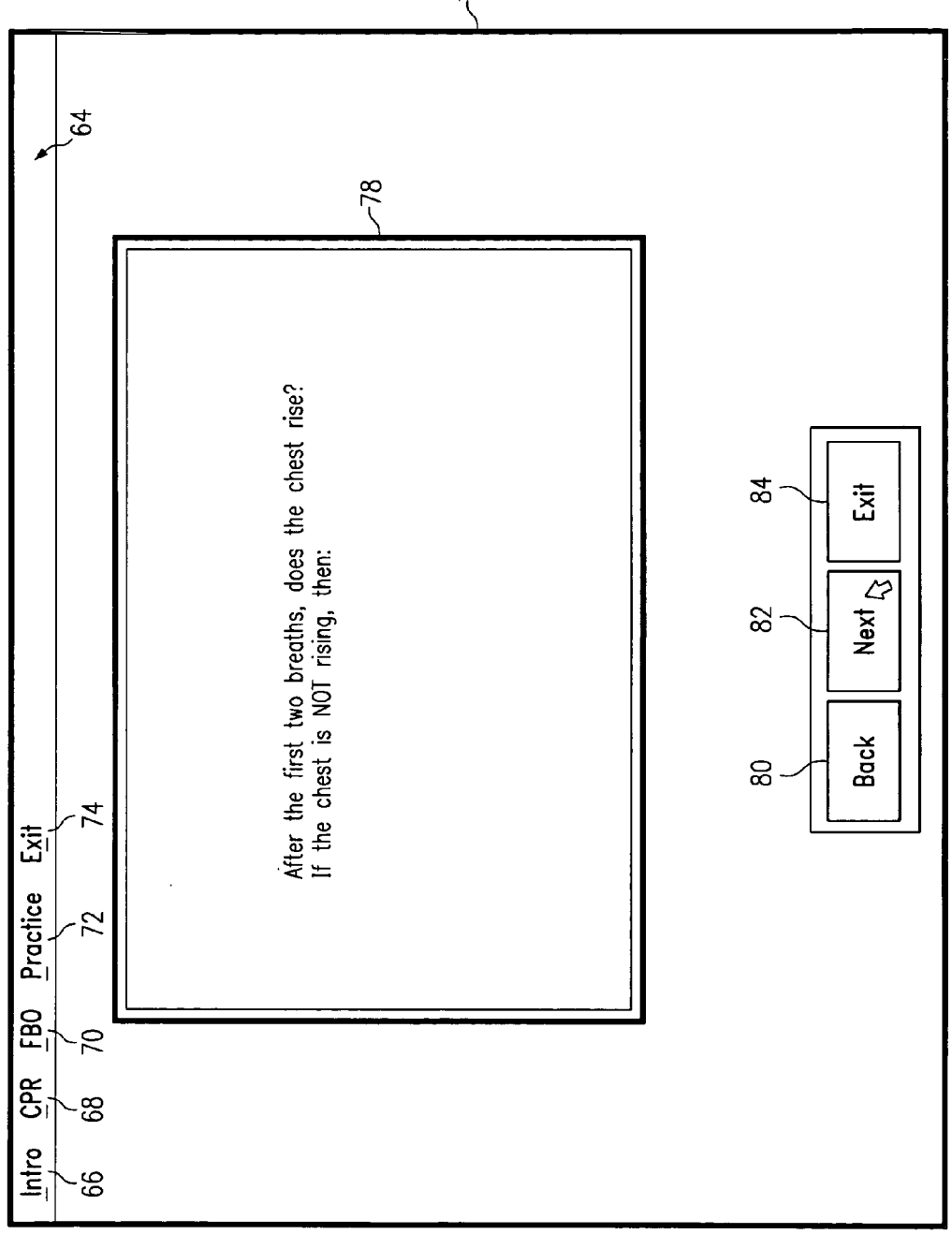

Instrumentation  Logging  EKG Sounds  Comm  Help  Exit

14 Status Update

Airway [Adequate to Ve]

Breathing
Sounds [Bilateral]
Movement [Symmetrical]
Respiration [Controlled]

Circulation
Adequacy [Compromis]
Radial Pulse [Yes]
Femoral Pulse [No]
Carotid Pulse [Yes]

Mental Status [Alert]
Skin Color [Pale]
Skin Temp. [Cool]

Student Actions
Action: Assess circulation – succeeded
Thought time: 00:03   Action Time: 00:01
Question time: 00:04                    03:16
Circulation is being compromised, with a palpable
radial and carotid pulse.                03:20
The patient has Normal Sinus Rhythm at a rate of
90 bpm; blood pressure is at 155/70; oxygen
saturation is at 71%; the respiration rate is 3
breaths per minute; body temperature is 26 degrees
Celsius.                                 03:32

Preliminary Information
Test Complete
Instructor Actions
Student Actions

Vital Signs Monitor
Systolic  Diastolic
Heart Rate  SaO2

Total Time
06:14

—211
—213
—215
—216

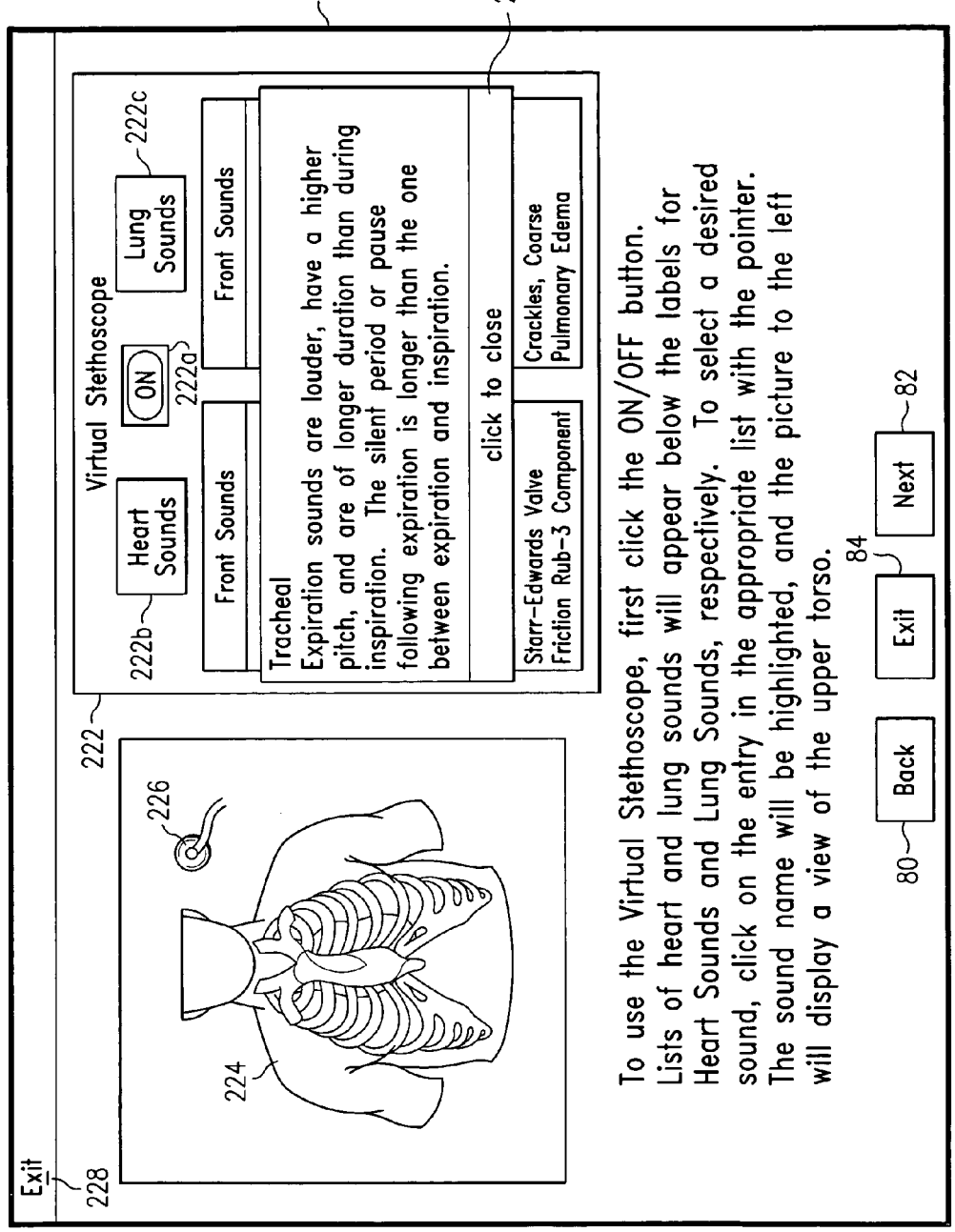

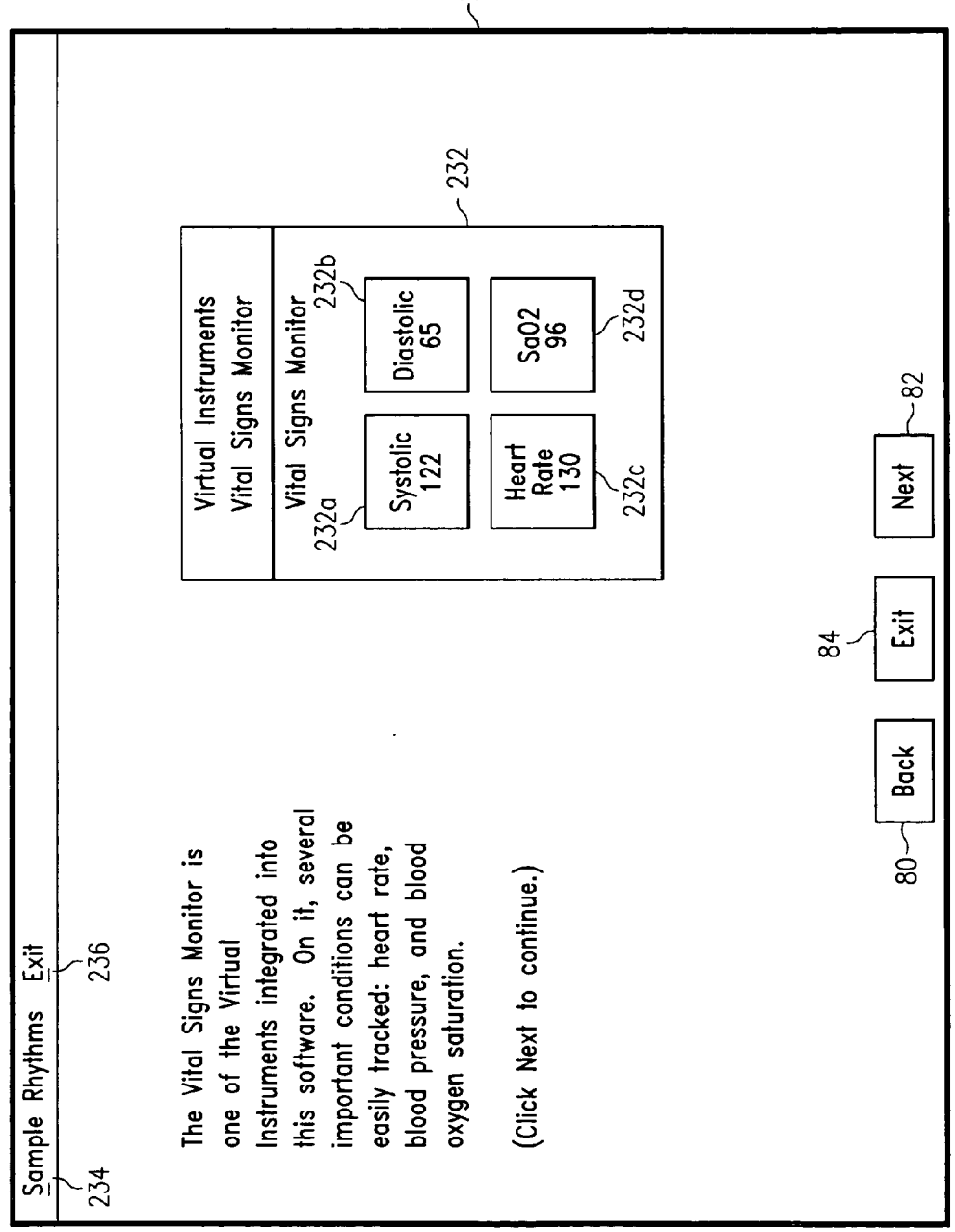

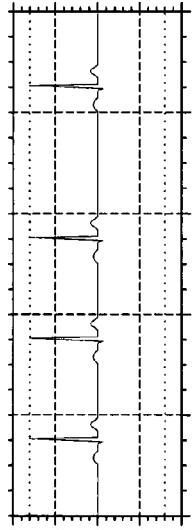

INTERACTIVE EDUCATION SYSTEM FOR TEACHING PATIENT CARE

CROSS-REFERENCE TO RELATED APPLICATIONS

This application is a continuation-in-part of U.S. patent application Ser. No. 10/292,192, filed on Nov. 11, 2002 now abandoned, which is a continuation of U.S. patent application Ser. No. 09/640,700, now U.S. Pat. No. 6,527,558, filed on Aug. 17, 2000.

BACKGROUND

The present disclosure relates generally to the field of interactive education and, more particularly, to an interactive education system for teaching patient care protocols.

While it is desirable to train students in patient care protocols before allowing contact with real patients, textbooks and flash cards lack the important benefit to students attained from "hands-on" practice. Thus, patient care education has often been taught using devices, such as a manikin configured to simulate a patient, along with corresponding medical instruments to perform patient care activity. However, one disadvantage of such a system is that medical instruments are often prohibitively expensive, and consequently, many users must settle for using a smaller variety of instruments, even at the cost of a less comprehensive educational experience. One solution to the foregoing problem is using a set of relatively inexpensive, simulated medical instruments ("virtual" instruments), as taught in U.S. Pat. No. 5,853,292, the entire disclosure of which is hereby incorporated by reference.

Another problem in patient care education is teaching a user to locate and interpret certain patient body sounds. Charts or displays of audible locations are of little practical value, for they do not provide the user with some form of realistic feedback, such as audio, visual, or tactile responses to the user's activity. For example, knowing that an apex heart sound is heard at the fifth intercostal space along the midclavicular line is a very different matter from actually finding the location and recognizing the sound on a patient. In an attempt to provide a more realistic experience, prior methods have disposed speakers playing body sounds at locations throughout a manikin, but this is undesirable, as speakers have a tendency to reverberate throughout the manikin, thus allowing an unnatural juxtaposition of normally distal sounds. Moreover, even if only one sound is played at a time, the nature of a speaker results in the sound being heard over a wider anatomical area than would be found in a real patient, thus reinforcing sloppy sound location and detection by the user.

Still another problem in patient care education is teaching the user to recognize physiological symptoms and to respond to such symptoms appropriately. However, such responses are generally not particularly realistic due to constraints in the educational environment, such as difficulties in simulating physiological behavior.

Therefore, what is needed is an interactive education system using both real and virtual instruments, in cooperation with simulated patient treatment, for rewarding the user with realistic audible or visual feedback. What is also needed is an interactive system that exhibits realistic physiological behavior, thereby enabling the user to interpret and respond to such behavior.

SUMMARY

In one embodiment, the present disclosure provides a simulator system for teaching patient care to a user. The system includes a model of at least a portion of a human body, wherein the model comprises first and second lungs, a first fluid passage in fluid communication with the lungs, and a breathing valve, wherein the breathing valve is adapted to control the flow of fluid through the first fluid passage. The system also includes a pneumatic module in fluid communication with the first fluid passage and adapted for delivering pressurized fluid to the first fluid passage. A processor is accessible to the breathing valve, and a memory storing a plurality of instructions for execution by the processor is accessible to the processor. The instructions include instructions for manipulating the breathing valve to regulate the flow of pressurized fluid from the pneumatic module through the first fluid passage to the first and second lungs.

BRIEF DESCRIPTION OF THE DRAWINGS

FIG. 2 is a schematic view of the interaction between a set of virtual instruments and the simulator of the system of FIG. 1a.

FIG. 3 is a perspective view of a virtual PA catheter instrument of the system of FIG. 1a.

FIG. 4a is a perspective view of a virtual stethoscope instrument of the system of FIG. 1a.

FIGS. 5–7 are views of screen displays generated by a program of the educational systems of FIGS. 1a–b.

FIGS. 8–17a are schematic views of modules contained in the program.

FIGS. 17b–17f are views of screen displays generated by the program for the Codemaker module.

FIG. 18 is a view of a screen display generated by the program relating to the interaction between a software-generated virtual instrument and a software-generated simulator of the system of FIG. 1b.

FIGS. 19–23 are views of screen displays generated by the program relating to virtual instruments of the systems of FIGS. 1a–b.

DETAILED DESCRIPTION

Figure 1A:
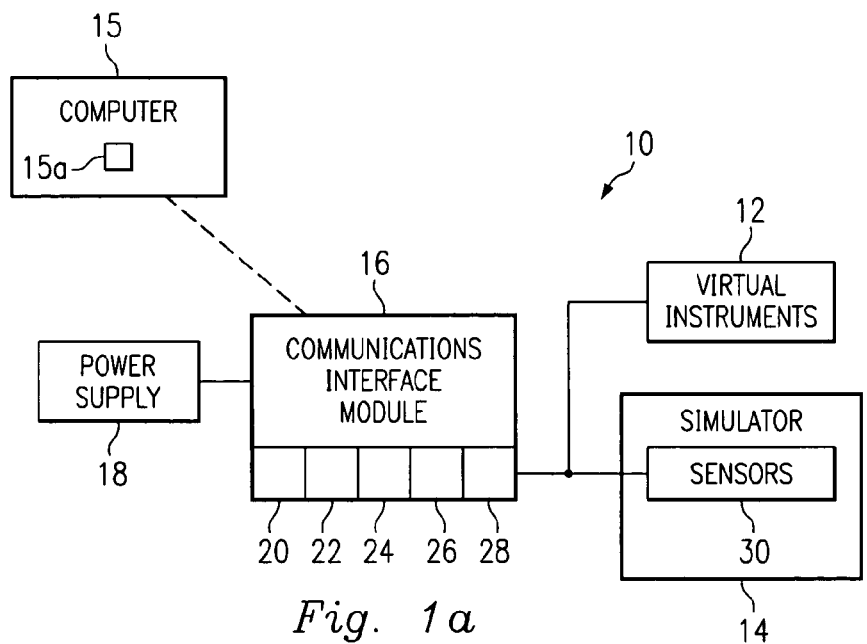
FIG. 1a is a schematic view of an exemplary interactive education system for teaching patient care using virtual instruments and a patient simulator.

The present disclosure relates generally to the field of interactive education and, more particularly, to an interactive education system for teaching patient care protocols. It is understood, however, that the following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1a, the reference numeral 10 refers, in general, to an interactive education system for teaching patient care protocols to a user. The system 10 comprises a set of virtual instruments 12 used to simulate medical instruments, and a simulator 14 used to simulate a patient for receiving patient care activity from the user. In this embodiment, the virtual instruments 12 and simulator 14 are tangible objects. Thus, the virtual instruments 12 look, feel, and operate like real medical devices in conjunction with the simulator 14, which is understood to encompass a variety of forms, including a fully articulating and adult-sized manikin, as well as a fetus, a neonate, a child, a youth, or portion of a manikin, such as the arm, torso, head, or pelvic region. Patient care activity received by the simulator 14 is sensed in a manner to be described, and in response to the activity, the system 10 provides feedback to the user. It is understood that feedback may comprise any audio, visual, or tactile response.

Figure 1B:
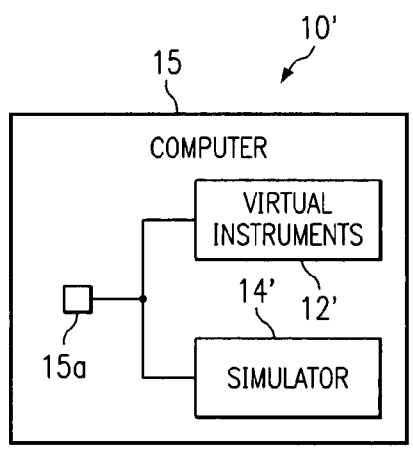
FIG. 1b is a schematic view of an exemplary interactive education system for teaching patient care using software-generated virtual instruments and a software-generated patient simulator.

Referring to FIG. 1b, a system 10' comprises a computer 15 having a program 15a a portion of which produces a software-generated set of virtual instruments 12' and a software-generated simulator 14'. Thus, the patient care activity performed by the user comprises manipulating an icon relating to a selected software-generated virtual instrument 12' to provide patient care to the software-generated simulator 14'. In this embodiment, the program 15a uses conventional means, such as clicking the mouse or voice-activated software, to monitor activity by the user, and provides feedback in response, as will be described.

Returning to FIG. 1a, the system 10 further comprises a communications interface module ("CIM") 16, which receives operating power from a conventional power source 18, and contains a microcontroller ("PIC") 20. Microcontrollers are available from many vendors, such as Microchip Technology, Inc. (Chandler, Ariz.), and are then customized (i.e., programmed). The CIM 16 may be internal or external to the system 10.

As will be described, the PIC 20 receives input signals from the user's activity, and is programmed to respond in a certain manner to provide feedback to the user. For example, to provide audio feedback, the CIM 16 additionally includes an audio chip 22 which is responsive to the PIC 20 for causing a speaker 24 to produce realistic patient sounds, for example, heart, lung, blood pressure (Korotkoff), intestinal, and the like. A control 26 is included in the CIM 16 for adjusting the volume of the speaker 24.

Alternatively, depending on the complexity of the desired feedback, the CIM 16 may be connected to the computer 15 and program 15a. In the present example of audio feedback, the program 15a could be used to provide a vast library of body sounds.

The CIM 16 has a plurality of ports, collectively 28, for receiving input signals occasioned by interaction between the virtual instruments 12 and sensors 30 disposed on the simulator 14, resulting from the user's patient care activity. It is understood that the interaction between the virtual instruments 12 and the sensors 30 may be electrical, optical, pressure differential, tactile, temperature-controlled, wireless (e.g., radio frequency), or electromagnetic, and furthermore, that there may be more than one PIC 20, and more than one CIM 16, to manage the input signals thus created.

Figure 2:
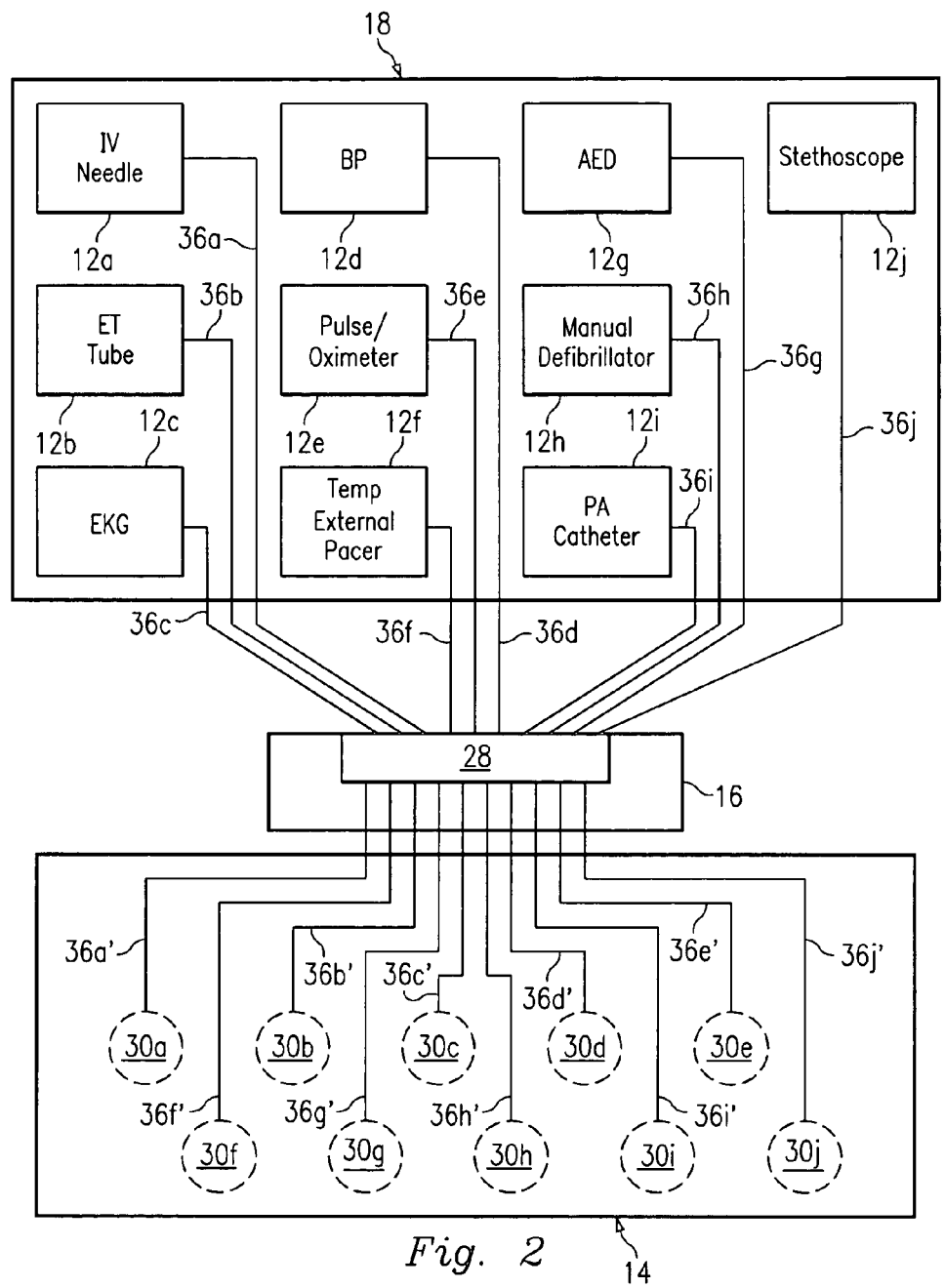

Referring to FIG. 2, the virtual instruments 12 include at least one IV needle, an endotracheal (ET) tube, an electrocardiogram (ECG or EKG) monitor, a blood pressure (BP) cuff, a pulse oximeter cuff, a temporary external cardiac pacemaker, an automatic external defibrillator (AED), a manual defibrillator, a pulmonary artery (PA) catheter or similar hemodynamic monitoring device, and a virtual stethoscope, respectively 12a–j, each instrument having a corresponding sensor 30a–j, as indicated by lines, collectively 36. Unless otherwise indicated, the lines 36 are schematic, and merely illustrate that the virtual instruments 12 and the sensors 30 are functionally connected to each other for providing an interaction created by the user's patient care activity, the interaction being reported as an input signal to the CIM 16. When one of the lines 36 also represents a physical connection, it will be noted, and it is understood that the sharing of such physical lines among instruments 12, or sensors 30, is contemplated as well.

The IV needle 12*a* corresponds with a portion of the simulator 14 capable of accepting medications. Generally speaking, an electrical interaction (which would also provide the input signal) could be created via a virtual instrument 12 having one node and a sensor 30 with another node, both of which are physically connected to the CIM 16, or by a virtual instrument with two nodes and a sensor formed of conductive material, or vice versa, only one of which may be physically connected to the CIM 16. In the present embodiment, the antecubital region of an arm of the simulator 14 may have a sensor 30*a* comprising an insulator sandwiched between two layers of conductive material having an appropriate thickness and weave density for permitting the needle 12*a* to pass through the cloth at a low acute angle (e.g., 20°). The conductive layers of the sensor 30*a* are electrically coupled to the CIM 16 via line 36*a'*, such that when the needle 12*a* is correctly passed through the two conductive layers, simulating cannulation of a vein of the simulator 14, a circuit is completed between the layers and sensed by the CIM 16. In one embodiment, the needle 12*a* has a selectable group of specific drugs and dosages provided by the program 15*a*, and is part of a medication tray with an assortment of labeled syringes for dispensing the drugs to the simulator 14, with the effects of administration controlled by the program 15*a*.

The ET tube 12*b* is used in simulated patient airway management, the simulator 14 having a head, eyes, a nose, a mouth, and a realistic airway capable of accepting conventional airway adjuncts, with the airway configuration adjustable to display a large tongue, an obstructed pharynx, or closed vocal cords, to increase the difficulty of the patient care activity. In order to confirm proper placement in the tracheal airway of the simulator 14, an optical sensor 30*b* is mounted in the wall of the trachea of the simulator 14 and connected to the CIM 16 via line 36*b'*. Correct placement of the ET tube 12*b* in the trachea is confirmed when the tip of the ET tube interrupts the beam of the optical sensor 30*b*. The sensor 30*b* may also be used to determine whether a fluid has passed. The sensor 30*b* could alternatively be an electrical device.

The ECG monitor 12*c* comprises a multi-lead system, including a real-time trace monitor and R-wave sonic markers, and a line 36*c* that connects to the CIM 16 at one end, and has a plurality of color-coded patches at the opposite end for attachment to a plurality of sensors, collectively 30*c*, mounted on the correct regions of the torso of the simulator 14. The electrical interaction between the patches and the sensors, as sensed by the CIM 16, confirms proper placement.

The BP cuff 12*d* attaches to the simulator 14, for example around an arm, and includes a line 36*d* that attaches to the CIM 16. The simulator 14 contains a simulated heart, lungs, and other organs. Palpable pulses may be found at carotid, brachial, radial, femoral, and dorsalis pedis locations, and may change to represent the condition of the simulated patient; for example, specific pulse locations may become non-palpable as the systolic pressure falls. The cuff 12*d* includes means 30*d* for sensing proper positioning of the cuff 12*d* on the simulator 14, and is attached to the CIM 16 via line 36*d*.

The pulse oximeter finger cuff 12*e* attaches to the simulator 14, for example around a finger, and includes a line 36*e* that attaches to the CIM 16. Normal gas exchange lung dynamics are virtual and are controlled by the program 15*a*, which may also determine tidal volumes (TV) and functional residual capacity (FRC). The cuff 12*e* includes means 30*e* for sensing proper positioning of the cuff 12*e* on the simulator 14.

The temporary external cardiac pacemaker 12*f* contains a line 36*f* that connects to the CIM 16 at one end, and has a plurality of anterior and posterior cardiac pacemaker pads at the opposite end for attachment to a plurality of sensors, collectively 30*f*, mounted on the correct regions of the torso of the simulator 14. In this manner, the CIM 16 confirms proper placement of the temporary external cardiac pacemaker 12*f* on the simulator 14. The cardiac pacemaker 12*f* has means for controlling cardiac pacemaker rate, cap time, and current, as well as exhibiting rhythm pacing, which is controlled by the program 15*a*.

The automatic external defibrillator (AED) 12*g* contains a line 36*g* that connects to the CIM 16 at one end, and has an apex and sternum AED pad at the opposite end for attachment to sensors, collectively 30*g*, mounted on the correct regions of the torso of the simulator 14, confirming via the CIM 16 that the AED 12*g* is properly placed on the simulator. Upon selecting a software generated shock button, the system 10 simulates defibrillation shock, with the resultant conditions controlled by the program 15*a*.

The manual defibrillator 12*h* contains a line 36*h* that connects, to the CIM 16 at one end, and has apex and sternum defibrillator paddles at the opposite end for attachment to a plurality of sensors, collectively 30*h*, mounted on the correct regions of the torso of the simulator 14, confirming via the CIM 16 that the manual defibrillator 12*h* is properly placed on the simulator. Upon selecting a software-generated shock button, or alternatively, by using dual shock buttons associated with manual defibrillator 12*h*, the system 10 simulates defibrillation shock, with the resultant conditions controlled by the program 15*a*.

Figure 3:
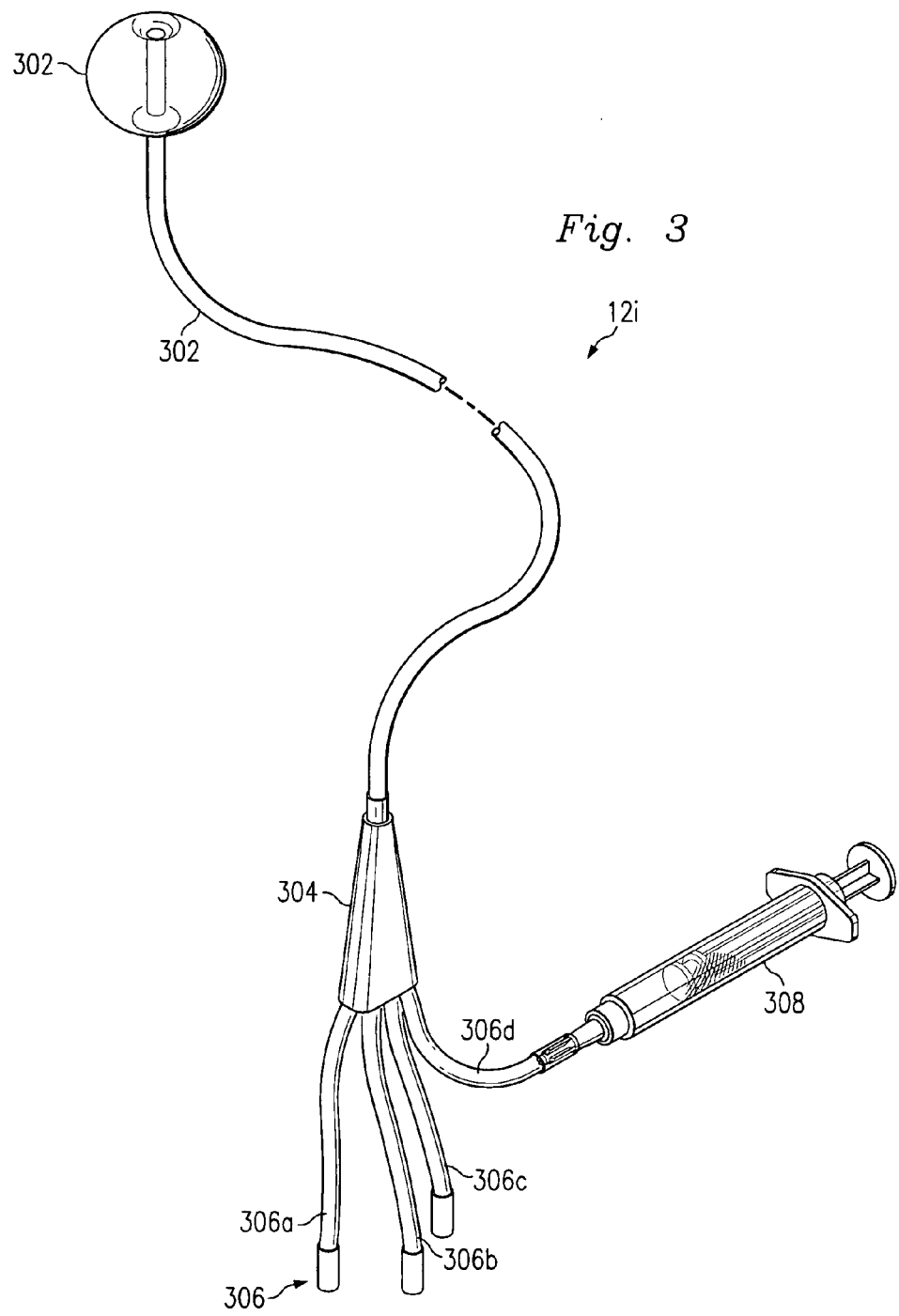

Referring to FIGS. 2 and 3, the PA catheter, or similar hemodynamic monitor, 12*i* is an endovascular catheter for insertion in central vein sites (not depicted) of the simulator 14. The PA catheter 12*i* comprises a long tube 300, with an inflatable balloon 302 at one distal end. The opposite end of the tube 300 contains a divider 304, having a plurality of connectors 306*a*–*d*. Connector 306*a* is for proximal injectate; connector 306*b* is for distal injectate; and connector 306*c* reports the pulmonary artery (PA) pressure. Connector 306*d* is connected to a syringe 308 for providing pressure to the balloon 302 for inflation. Proper placement of the balloon 302 is determined by sensors 30*i* placed in the simulator 14, and catheter data comprising important hemodynamic indices such as PA occlusion pressure, cardiac output, and mixed venous oxygen saturation are created by the program 15*a*.

Figure 4A:
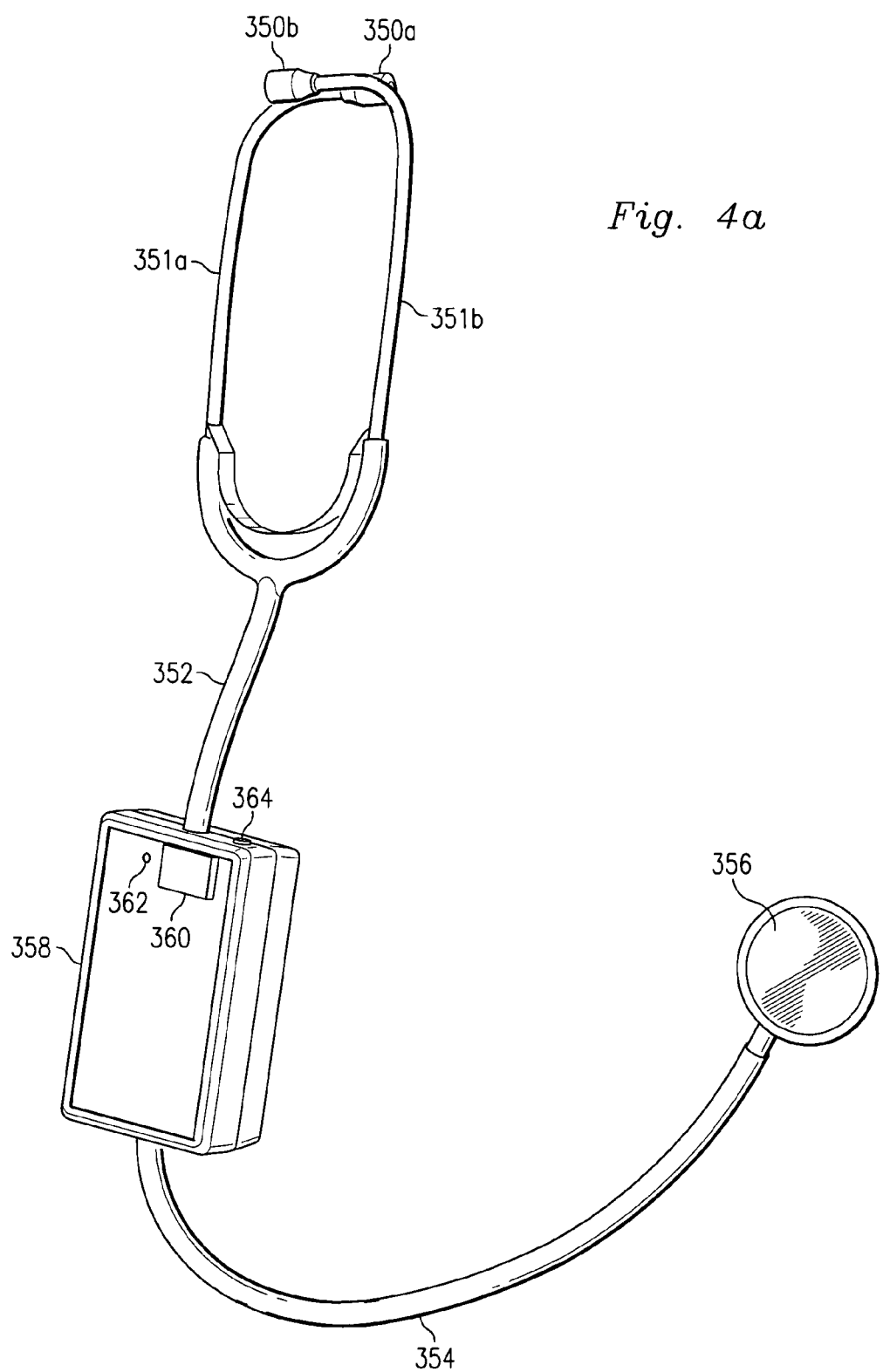

Referring to FIGS. 2 and 4*a*, the stethoscope 12*j* is moved from anatomical location to location on the simulator 14, engaging sensors 30*j* as will be described, to allow the user to hear realistic patient body sounds. In some respects, the appearance of the stethoscope 12*j* resembles a standard stethoscope, having earpieces 350*a*–*b* for hearing sounds, and being connected to extenders 351*a*–*b*, which are joined to a bifurcated ear tube 352. Similarly, the stethoscope further comprises a bell tube 354, and a bell 356, preferably made of nonferrous material.

Unlike conventional stethoscopes, an electronic control box 358 is disposed between the ear tube 352 and the bell tube 354. The control box 358 has an On/Off button 360 for activating the stethoscope 12*j*, and a conventional indicator 362 for indicating a potential loss of operating power, such as a low battery. A jack 364 is provided on the control box 358 for output to an external speaker (not depicted), so that other users may hear the sounds heard in the earpieces 350a–b. This not only increases the number of users who benefit from the patient care activity, but allows an instructor to test the user's ability, and correct the user's technique if required.

Figure 4B:
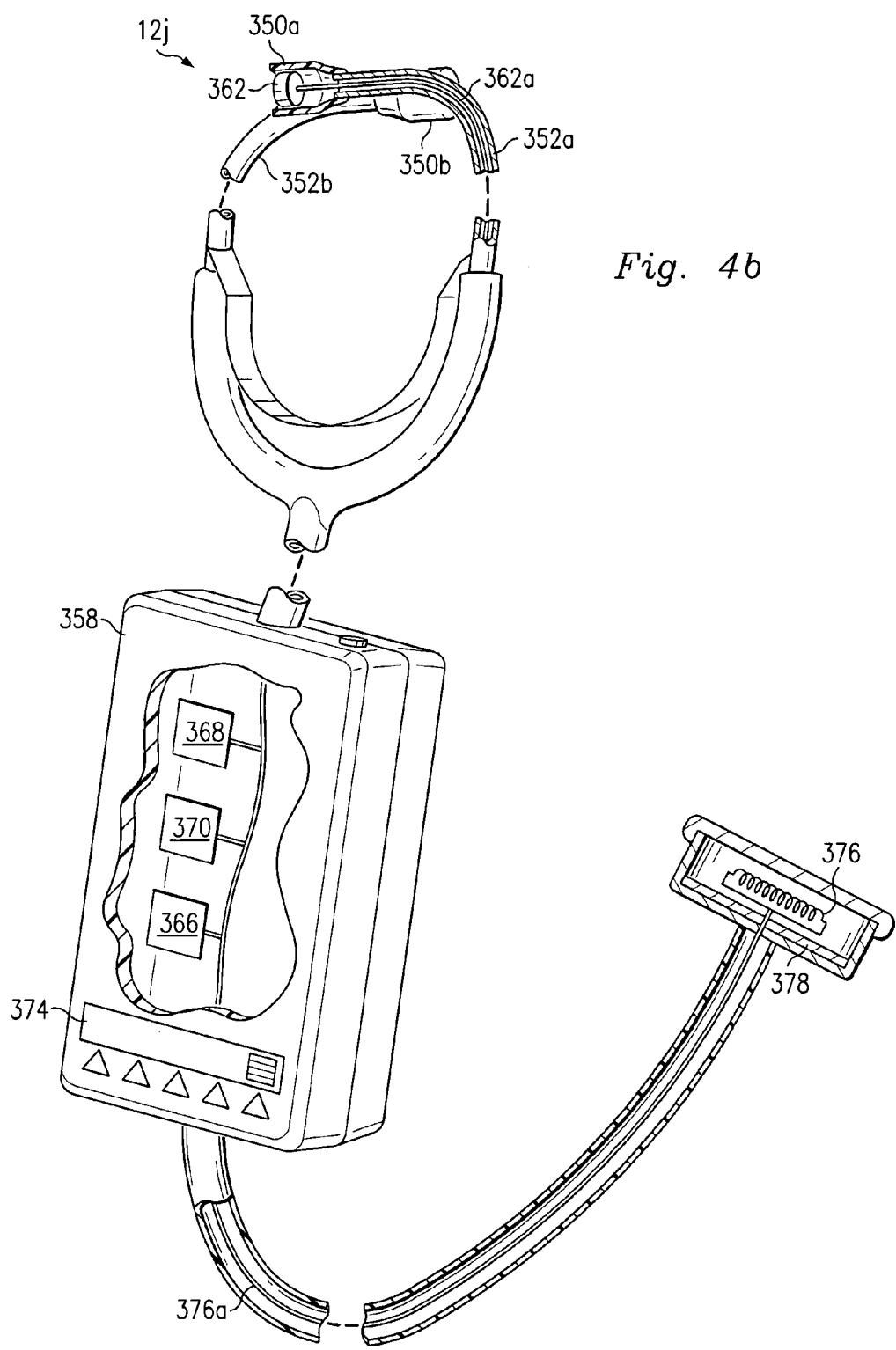
FIG. 4b is a perspective view with a cutaway of the virtual stethoscope instrument.
Figure 4C:
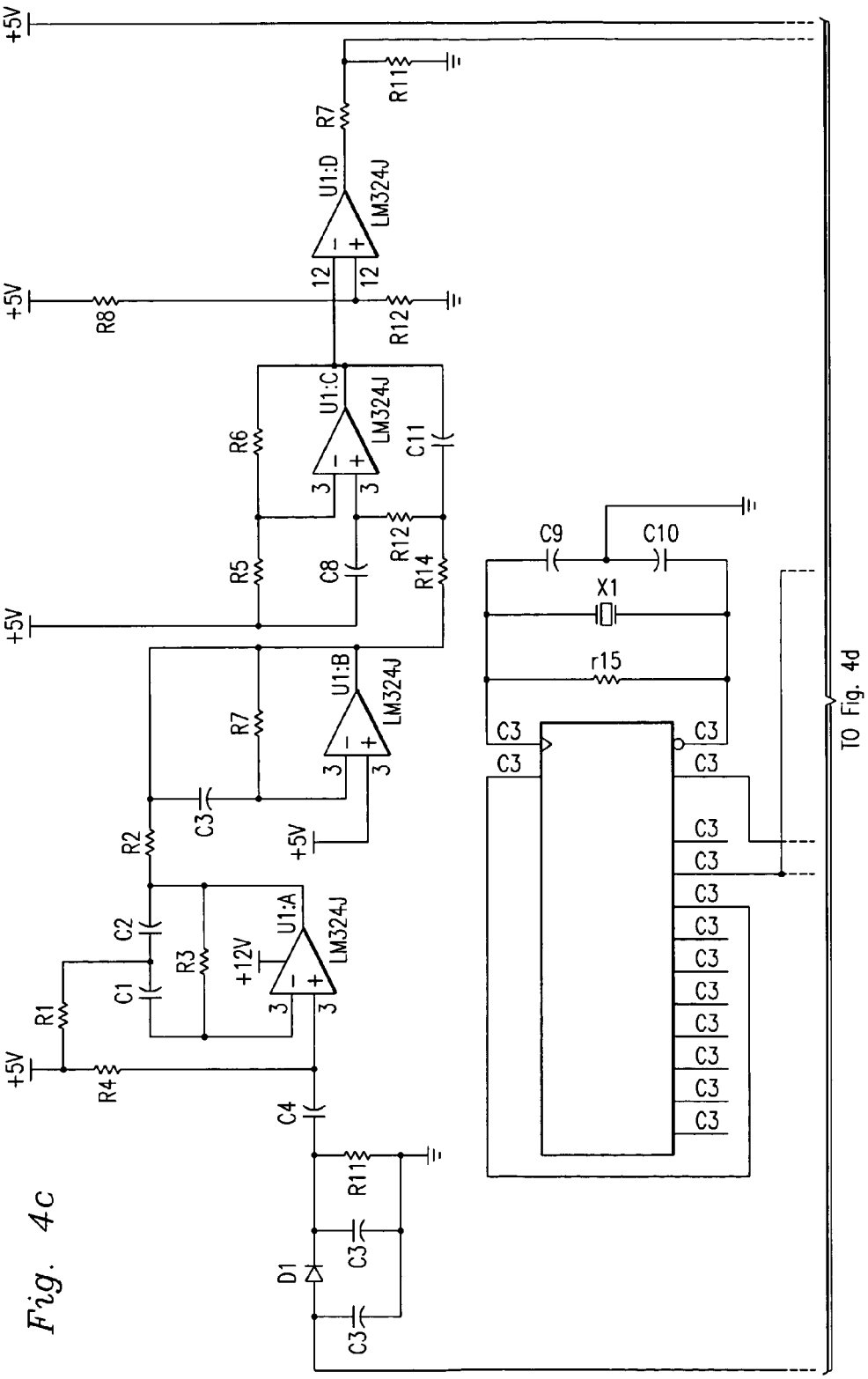
FIGS. 4c and 4d are a circuit diagram for an acquisition control device of the virtual stethoscope instrument.
Figure 4D:
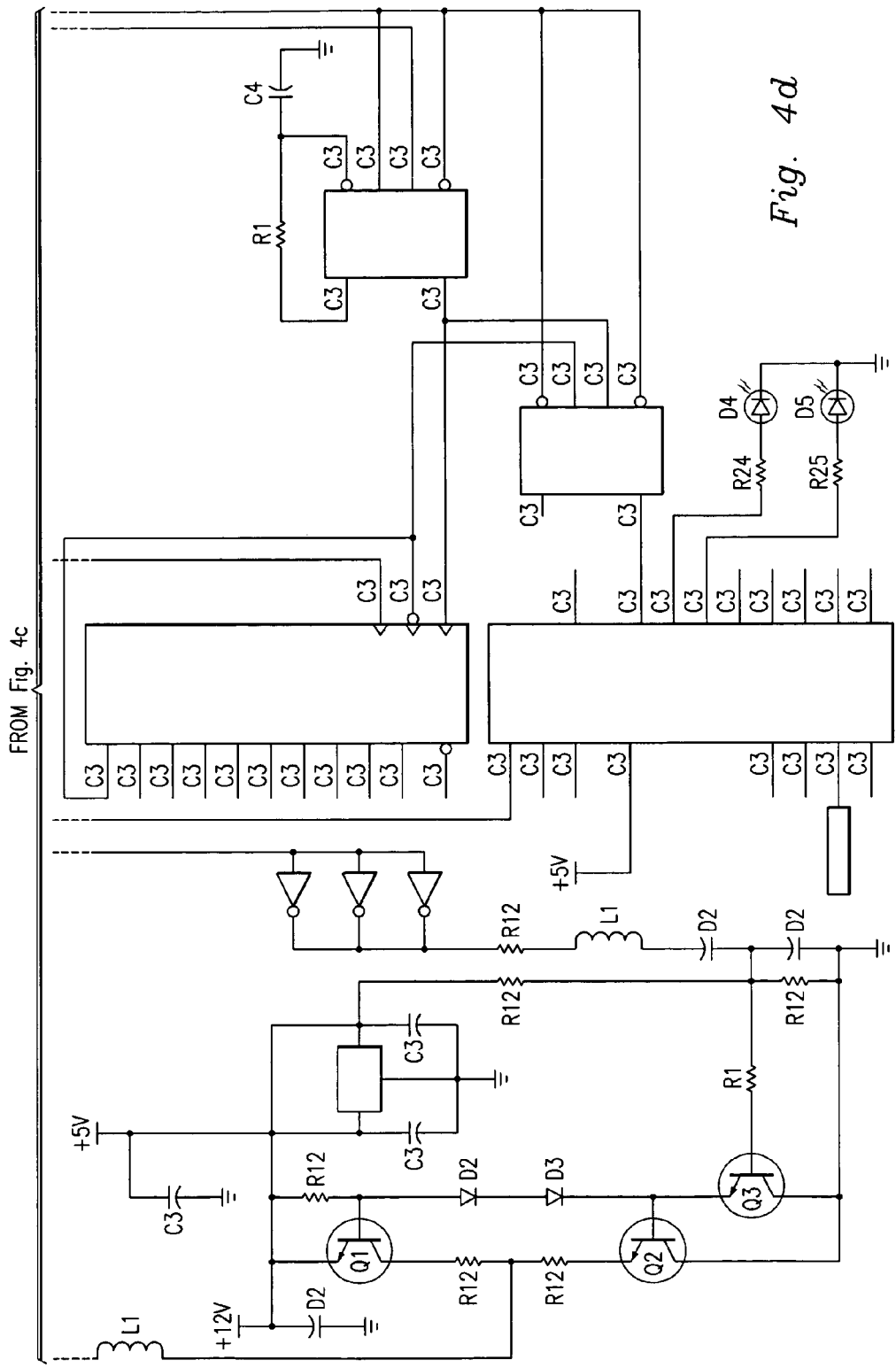

Turning to FIG. 4b, the control box 358 retains a small power source 366, such as a battery, an acquisition circuit 368 (FIGS. 4c and 4d) for reasons to be described, and a sound circuit 370 (FIG. 4e) for directing a small speaker 372, such as is available from ADDAX Sound Company (Northbrook, Ill.), to play a predetermined sound. FIG. 4f is an alternative circuit diagram according to another embodiment of the circuits of FIGS. 4c–4e, which uses less components.

Figure 4E:
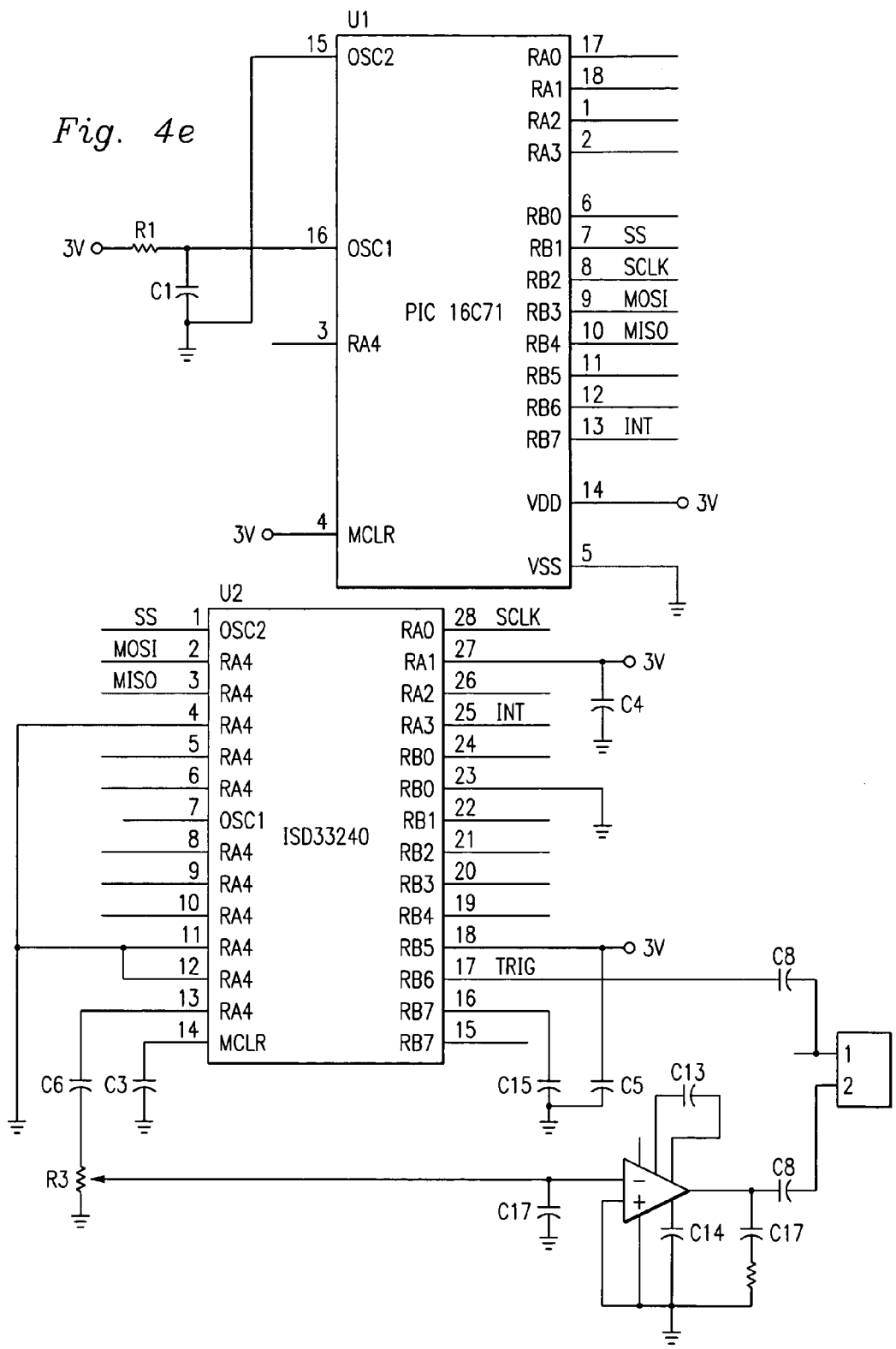
FIG. 4e is a circuit diagram for a sound control feature of the virtual stethoscope instrument.
Figure 4F:
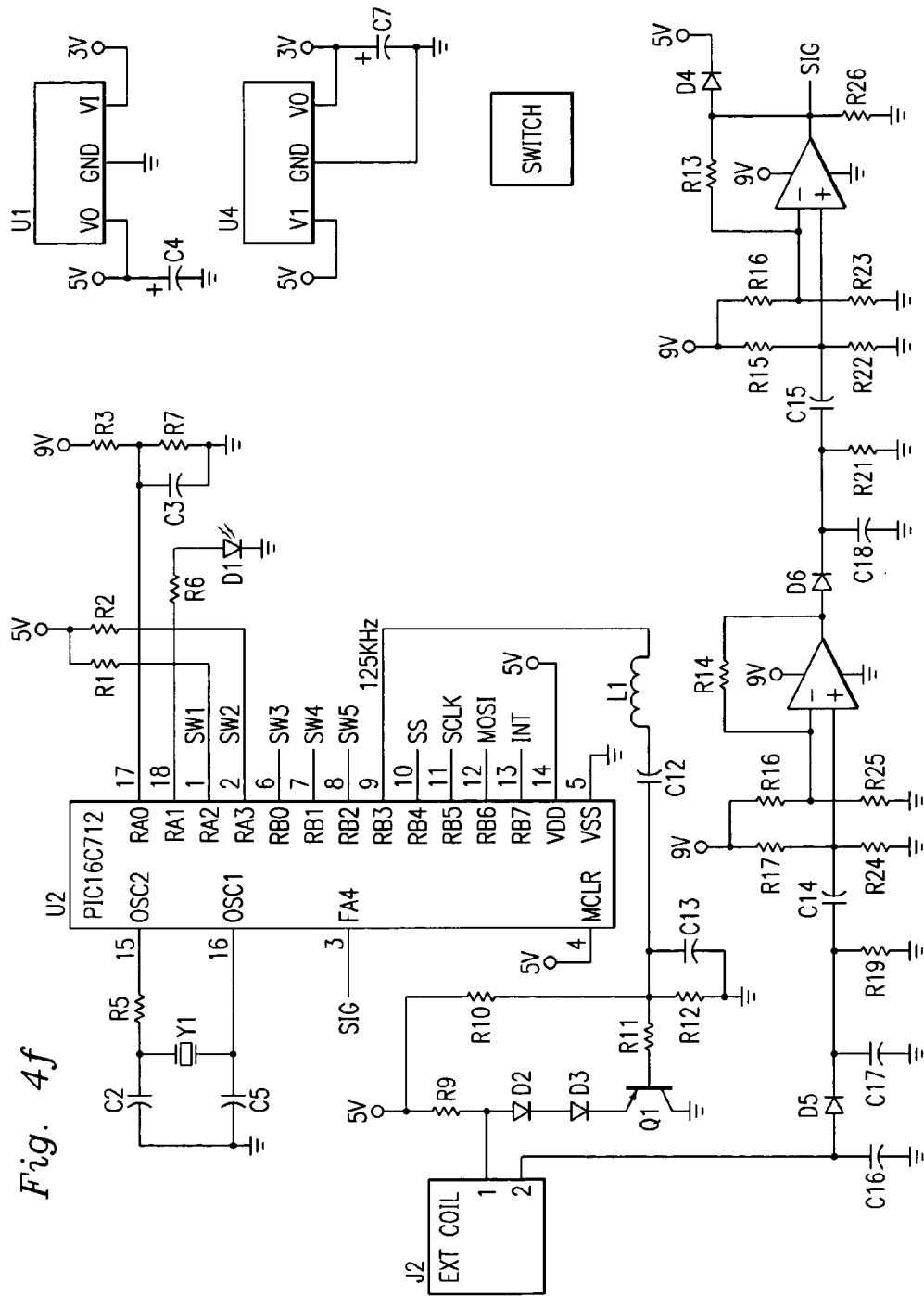
FIG. 4f is a circuit diagram according to another embodiment of the circuits of FIGS. 4c–4e.
Figure 4G:
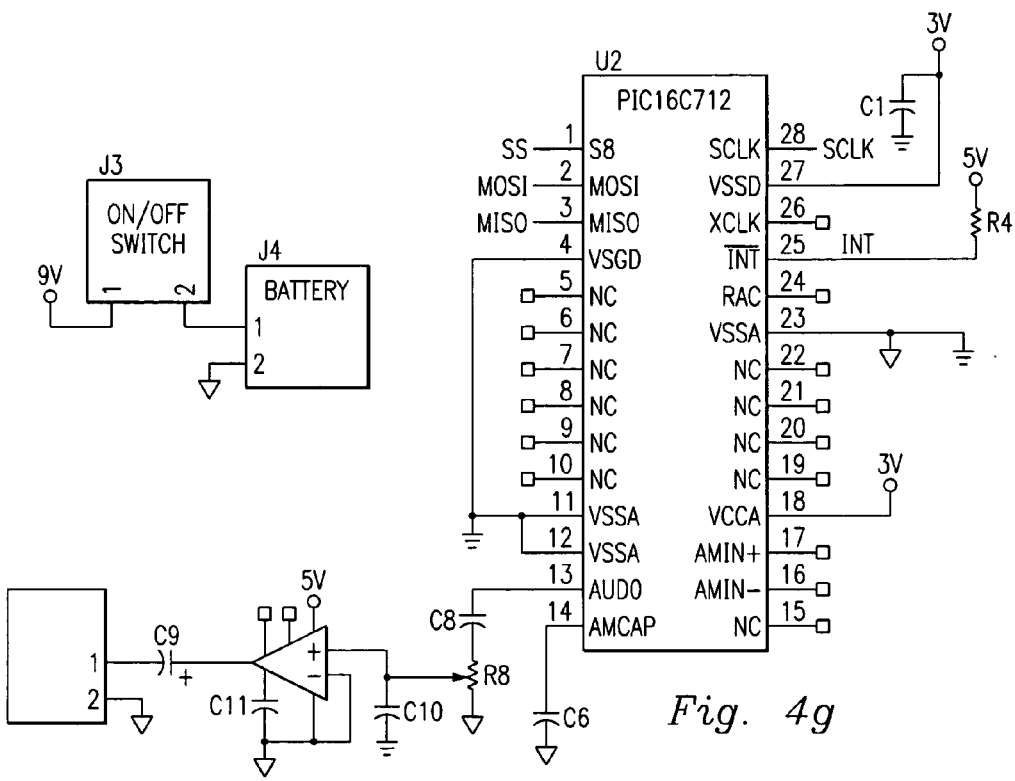
FIG. 4g is a circuit diagram according to another embodiment of the circuits of FIGS. 4c–4f.

The speaker 372 is disposed in the earpiece 350a, and connected to the control box 358 via a wire 372a, allowing the user to hear the sounds produced by the sound circuit 370 (FIG. 4e). It is understood that a second, substantially identical speaker may be disposed in the opposite earpiece 350b, and also connected to the control box 358. The sound circuit 370 is also connected to the jack 364 for allowing connection to an external speaker for the above-described reasons. In an alternative embodiment, the speaker may be disposed in the control box, and sounds transmitted via conventional ear tubes to the ear pieces. A switch 374, having a number of positions, is disposed on the control box 358 for switching between groups of sounds, as will be described.

An RF (radio frequency) signal acquisition coil 376, such as is available from M.C. Davis Co. (Arizona City, Ariz.), is disposed in the interior of the bell 356 for transmitting and acquiring RF signals, as will be explained. The acquisition coil 376 is a copper coil and circuitry having an associated wire 376a, which is attached to the electronic control box 358. A polymeric disc 378 is disposed between the acquisition coil 376 and the bell 356 to decrease noise from the bell.

Figure 4H:
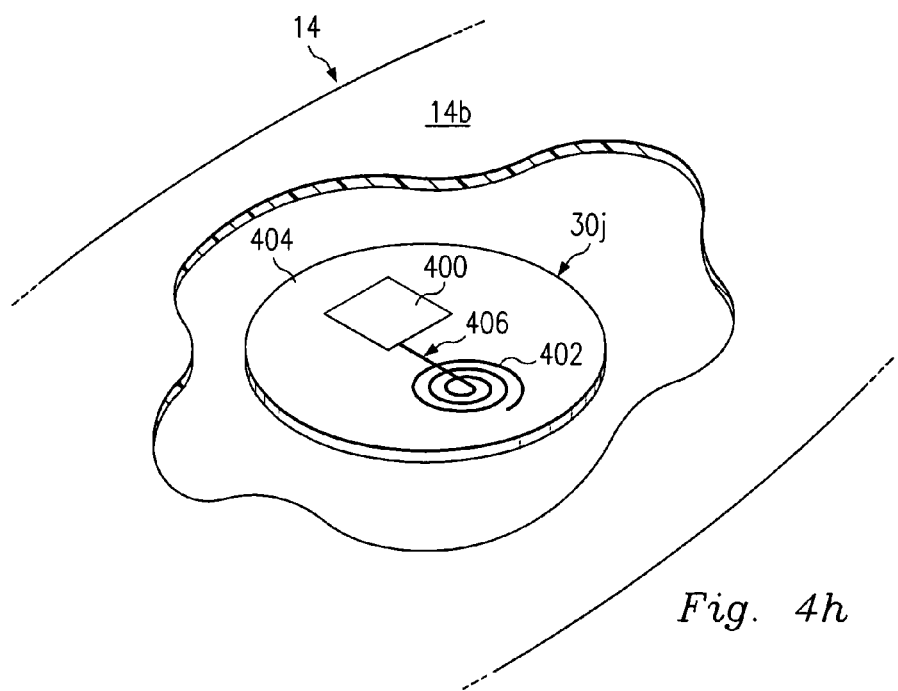
FIG. 4h is a perspective view with a cutaway of a sensor for cooperating with the virtual stethoscope instrument.

Referring to FIG. 4h, at least one sensor 30j is placed at an anatomical location on the simulator 14 where specific heart, lung (including airway), Korotkoff, or other sounds are normally heard. The sensor 30j provides at least one signal which is identified by the acquisition circuit 368 (FIGS. 4c and 4d) of the stethoscope 12j, thereby directing the sound circuit 370 (FIG. 4e) to play a sound to the user appropriate for the anatomical location of the sensor on the simulator 14. It is understood that the sound circuit 370 (FIG. 4e) has a stored library of body sounds corresponding to the location of the selected sensor 30j, and that the sensor 30j represents any number of similar sensors.

The sensor 30j is disposed beneath the skin 14b of the simulator to avoid visual detection by the user. Likewise, it is advantageous that the sensor 30j have a minimal thickness to prevent intentional or accidental detection, as some anatomical locations, for example, intercostal spaces, must be palpated in order to be located. In an alternative embodiment, the sensors 30j may be affixed to an overlay (not depicted) substantially similar to the skin 14b, thus allowing the overlay to be placed over other simulators and models of patients, thereby converting those devices to allow them to be used with the stethoscope 12j.

The sensor 30j comprises an RF ID tag 400, such as is available from Microchip Technology, Inc. (Chandler, Ariz.) (Part No. MCRF200-I/3C00A), which may be programmed using "Developer's Tools" also sold by Microchip Technology, Inc. to engender a unique signal that serves to identify the particular sensor 30j. A coil 402, such as is available from M. C. Davis Co. (Arizona City, Ariz.), is operably connected to the tag 400. The tag 400 and coil 402 are potted in RTV potting material 404, or silicon rubber, such as is available from M. C. Davis Co. (Arizona City, Ariz.), to prevent damage. Once potted, the tag 400 and coil 402 collectively form an RF transmitter 406 which emits a signal comprising a unique train of frequencies.

In operation, referring to FIGS. 4b and 4h, the transmitter 406 may actively broadcast the frequencies, but preferably the transmitter is passive, that is, only activated when interrogated by the acquisition coil 376 in the stethoscope bell 356. In this preferred embodiment, the acquisition coil 376 delivers a carrier signal, such as a 125 kHz excitation frequency, which is received by the transmitter 406 when the bell 356 is brought within a predetermined proximity, or acquisition distance, of the transmitter. The acquisition distance of the bell 356, and therefore the acquisition coil 376, to the transmitter 406 is determined by the strength to noise (S/N) ratio of the carrier signal. Thus, adjustment of the S/N ratio of the carrier signal provides a means for controlling the precision with which the user must place the stethoscope bell 356 in relation to the anatomical location of the sensor 30j, and therefore the transmitter 406. Precise placement of the bell 356 on the simulator 14 by the user is rewarded with feedback, in the form of an appropriate body sound. Normally, the S/N ratio is set to require that the bell 356 be brought within approximately one-half to two centimeters of the transmitter 406 of the sensor 30j.

In response to receiving a sufficiently strong carrier signal, the transmitter 406 emits a train of two identifying frequencies for use in a process conventionally known as frequency shift keying (FSK), although other keying methods could be used. The acquisition coil 376 in the stethoscope bell 356 receives the emitted frequencies and relays the signal to the acquisition circuit 368 (FIGS. 4c and 4d). The acquisition circuit 368 (FIGS. 4c and 4d) determines the identity of the sensor 30j. As the anatomical position of each sensor 30j is known to the programmer, a selection of appropriate body sounds associated with each sensor is provided, and accessible to the sound circuit 370 (FIG. 4e). Thus, by identifying the sensor 30j, the acquisition circuit 368 (FIGS. 4c and 4d) directs the sound circuit 370 (FIG. 4e) to play an appropriate body sound for the anatomical position of the transmitter 406, which is heard by the user through the speaker 372 disposed in the earpiece 350a.

It can be appreciated that to expose the user to a greater selection of sounds, more sensors 30j could be added to the simulator 14, or each sensor could correspond to more than one sound. As depicted, the switch 374 (FIG. 4b) has five different positions, and includes means for switching the sound circuit 370 (FIG. 4e) between five different groups of sounds. Thus, it is understood that the number of switch positions corresponds to the number of sounds that can be produced by a single sensor, i.e., with thirteen sensors and five switch positions, the user could listen to up to sixty-five location-appropriate sounds, including examples of normal and abnormal sounds. As shown in Table 1, the exemplary normal and abnormal sounds may be those heard in an adult patient.

TABLE 1

| Sensor Location | Position 1 | Position 2 | Position 3 | Position 4 | Position 5 |
|---|---|---|---|---|---|
| Base Right | Base Sounds | Base Sounds | Fixed Split S2 | Fixed Split S2 | Fixed Split S2 |
| Base Left | Physiological Split S2 | Physiological Split S2 | Physiological Split S2 | Split S2 | Split S2 |
| LLSB | Paradoxical Split S2 | Opening Snap | Opening Snap | Friction Rub | Friction Rub |
| Apex | Apex Sounds | Mid-Systolic Click | S3 | Intermittent S4 | Starr-Edwards Valve |
| Trachea | Tracheal Sounds | Tracheal Sounds | Stridor Sounds | Stridor Sounds | Stridor Sounds |
| Upper Anterior | Bronchial Sounds | Bronchial Sounds | Wheezing Sounds | Wheezing Sounds | Wheezing Sounds |
| Lower Anterior | Bronchial Sounds | Wheezing Sounds | Pleural Friction | Pleural Friction | Med-Fine Crackles |
| Posterior | Ronchi Crackles | Coarse Crackles | Coarse Crackles | Pulmonary Edema | Pulmonary Edema |

Likewise, as shown in Table 2, the exemplary normal and abnormal sounds may be those heard in a child. Of course, the sounds listed in Tables 1 and 2 are given merely for illustrative purposes, and any number of different sounds are contemplated.

TABLE 2

| Sensor Location | Position 1 | Position 2 | Position 3 | Position 4 | Position 5 |
|---|---|---|---|---|---|
| Base Right | Aortic Stenosis | Aortic Stenosis | Venous Hum | Venous Hum | Venous Hum |
| Base Left | Split S2 | Systolic Fixed S2 | Systolic Fixed S2 | Pulmonic Stenosis | Pulmonic Stenosis |
| LLSB | Pulmonary Stenosis | Pulmonary Stenosis | Split S1 | Split S1 | Split S1 |
| Apex | 1 Year Heart | 6 Year Heart | Stills Murmur | Split S1 | Mitral Valve Regurg. |
| Trachea | Normal Infant | Normal Child | Stridor Sounds | Stridor Sounds | Stridor Sounds |
| Upper Anterior | Wheezing Sounds | Wheezing Sounds | Wheezing Sounds | Wheezing Sounds | Wheezing Sounds |
| Lower Anterior | Wheezing Sounds | Wheezing Sounds | Wheezing Sounds | Wheezing Sounds | Wheezing Sounds |
| Posterior | Ronchi Crackles | Ronchi Crackles | Ronchi Crackles | Ronchi Crackles | Ronchi Crackles |

The stethoscope 12*j* is a significant improvement because such predetermined body sounds can be pinpointed to exact locations on the simulator 14 by selecting the proximity (via the S/N ratio) required between the acquisition coil 376 and the sensor 30*j*, thus better testing a user's patient care skills. Only one body sound is heard by the user at a time, and then only in the correct anatomical area for locating the sound.

In the preferred embodiment, the sound at a particular sensor location is either heard or not heard, based on a threshold proximity, as explained above. However, in an alternative embodiment, the S/N ratio could be adjusted to overlap for signals from two sensors 30*j* (and corresponding sounds), allowing the sound to get clearer as the user moved the stethoscope bell 356 closer to one sensor and away from the other sensor to simulate a real life scenario. Referring to FIGS. 1*a* and 4*b*, another advantage of the system 10, as regards the stethoscope 12*j*, is that the electronic control box 358, which is understood to be an appropriately developed CIM 16, is physically integrated into the virtual instrument 12*j*, thus simplifying the system.

In another embodiment, the virtual stethoscope 12*j* is appropriately developed to play Korotkoff sounds, and operably connected to a CIM 16 attached to a standard blood pressure cuff or the BP cuff 12*d*, a manikin arm (not depicted) equipped with a sensor 30*j*, and air pressure measuring means. The BP cuff 12*d* is placed around the arm, and it is understood that all the elements are connected to the CIM 16 (tutorial software or an electronic control box). A first user preselects a pulse rate, auscultation gap (optional), systolic blood pressure, and diastolic blood pressure for the arm. When a second user places the bell 356 of the stethoscope within a predetermined proximity of the sensor 30*j*, a brachial pulse is heard at the preselected pulse rate. The second user then increases the pressure in the BP cuff 12*d* to a level judged to be above the systolic pressure. If correct, the heartbeats cease, providing audio feedback to the second user, as well as to others if the external speaker is being used. Then, as the second user reduces pressure in the BP cuff 12*d*, the first Korotkoff sound (K1), representing the systolic pressure, will be heard in synchrony with the selected pulse rate. As pressure is further reduced, sounds including the second, third, and fourth Korotkoff sounds (K2, K3, and K4) will be heard, followed by silence upon reaching the diastolic pressure. The second user records his estimate of the systolic and diastolic pressures, which can be compared to the preselected values. If an ausculation gap has been selected, the second user may have estimated the systolic pressure far below the preselected value, thus "misdiagnosing" a case of hypertension, and gaining valuable experience for future patient care activities.

Referring now to FIG. 5, an introductory screen display 40 of the program 15a is presented on the computer 15. The display 40 includes several decorative features: a title box 42, an ECG box 44, and a vital signs box 46. The display 40 also contains a teaching box 48, a testing box 50, and a virtual instruments box 52.

The screen 40 also displays a group of selectable patient care modules 54a–54p provided by the program 15a, which furnish information on medical topics and associated concepts. As will be described, each module has a single topic, and represents an interactive patient care training session for the user. The modules 54a–g are disposed in the teaching box 48, the modules 54h–j are disposed in the testing box 50, and the modules 54k–p are disposed in the virtual instruments tutor box 52. An exit box 56 for exiting the program 15a is also disposed in the testing box 50.

Referring to FIGS. 5 and 6, if one of the modules is selected by the user, such as by voice recognition or selection with a mouse of the computer 15, the program 15a displays a menu screen, listing information categories specific to the topic of the selected module. For example, if the BLS module 54a is selected by a user, the program 15a displays an instruction screen 60, as shown in FIG. 6. The instruction screen 60 contains an information box 62, which contains information regarding a menu bar 64 of the Basic Life Support information items 66–74 of module 54a. It is understood that an item, such as items 66–74 of the BLS module 54a, may be selected from the screen 60 via the menu bar 64, and that each module 54a–p has its own instruction screen with its own menu of specific informational items, as will be described.

Referring to FIG. 7, selection of an item from a menu, other than an exit item, causes an information display screen 76 to be displayed. The screen 76 has an information box 78, which may contain text and/or illustrations topical to the selected menu item. It is understood that the information screen 76 is used as an example of any number of screens, and furthermore, such screens can be displayed in sequential order, or a series, for each item.

A series of screens, such as screen 76, comprises a tutorial regarding patient treatment protocols for the selected menu item. Thus, the user can review information from a library of topics by selecting the appropriate module from the teaching box 48, and navigating through a series. Navigation in a series of screens is attained by the user's selection between three boxes: 80, 82, and 84, comprising "Back", "Next", and "Exit", respectively, with corresponding function among the screens, such as proceeding backwards or forwards in the series. If no "Back" or "Next" function is possible, as respectively would be the case of the first and last screen of a series, the boxes 80 or 82 may be unselectable. The display screen 76 also has a menu, in this example the pull down menu 64 corresponding to the module 54a, and thus the user may switch between items within the selected module at any point during a series by using the menu bar.

Figure 8:
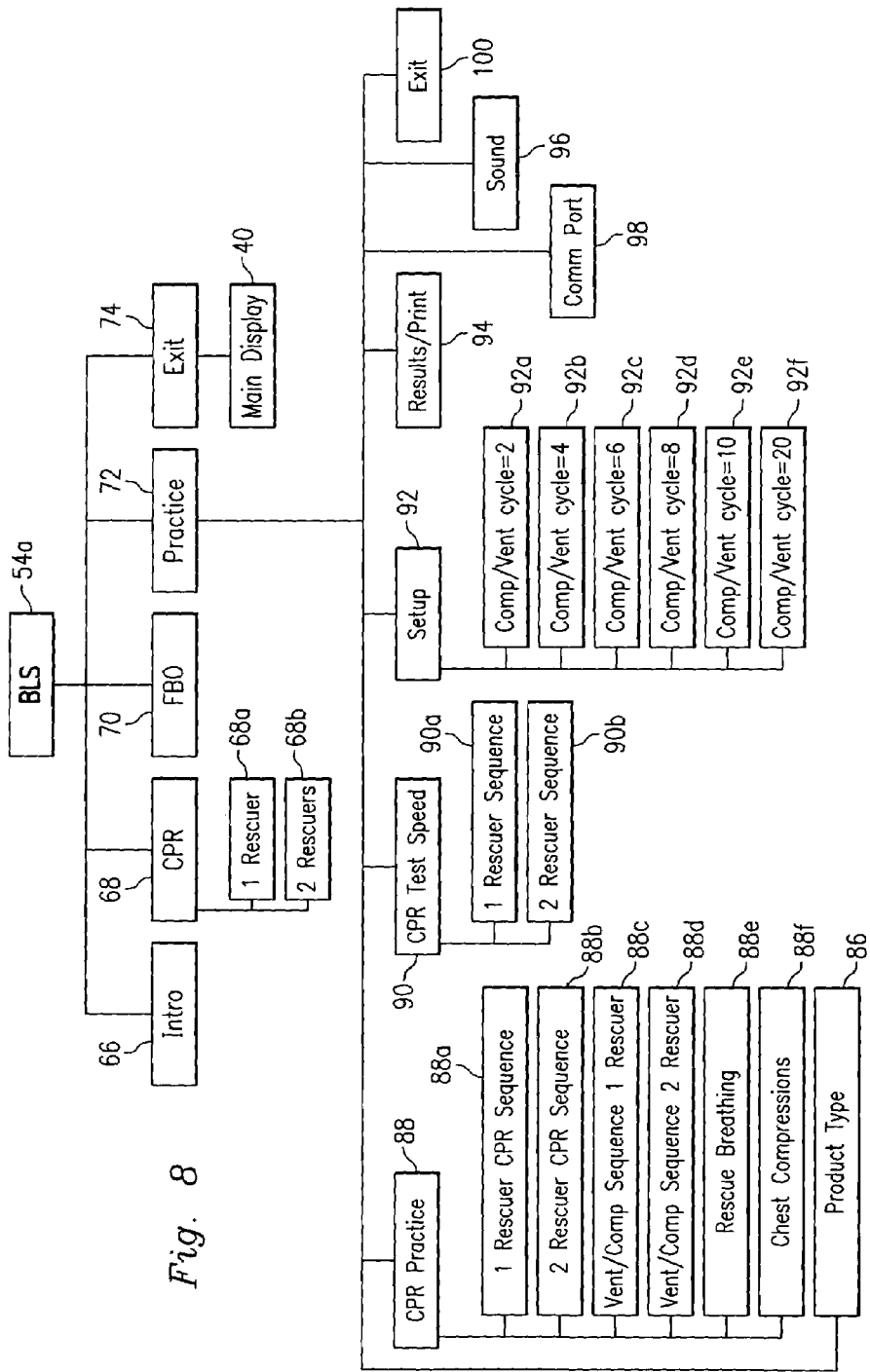

Referring to FIG. 8, the module 54a contains a group of items relating to Basic Life Support: an Intro item 66, a CPR item 68, an FBO (foreign body obstruction) item 70, a Practice item 72, and an Exit item 74 for returning to the display screen 40. Selection of an item begins a series of information display screens (FIG. 7) with appropriate information being supplied by the program 15a, or an item may also be divided into sub-items before the series begins, for example, if the CPR item 68 is selected, the user must select between a set of sub-items 68a and 68b, for one person and two person CPR, respectively.

If the Practice item 72 is selected, the user may practice CPR on the simulator 14 (FIG. 1a), and the program 15a senses the user's compression and ventilation, via the CIM 16 (FIG. 1a) and sensors 30 (FIG. 1a). The heart and lungs of the simulator 14 are connected to pressure transducers confirming airway ventilation and cardiac compression; for example, an air line may be mounted in tracheal wall of the simulator 14 and connected to a sensor 30 connected to the CIM 16, so that when CPR ventilation is performed on the simulator, the CIM 16 monitors the timing and magnitude of the pressure and volume of the ventilation activity, via the air line and the sensor. Similarly, a compression bladder may be embedded within the chest cavity of the simulator 14 for sensing and confirming proper timing and magnitude of a CPR chest compression procedure, when connected by an air line to a compression sensor 30 attached to the CIM 16. The program 15a compares the information pertaining to the user's activity with predetermined standards, and thus provides an interactive training session.

The predetermined standards are selectable, and reflect medical protocols used around the world, including BLS and ACLS guidelines set forth by the American Heart Association and others. At least seven major protocols for cardiopulmonary resuscitation (CPR) are stored and selectable by the user. Moreover, a user may update the protocols, or enter and store a "New Protocol" reflecting the local protocol regarding depth, duration, and frequency of cardiac compressions and airway ventilations. The program will use this series of acceptable limits to generate a new CPR waveform for testing CPR.

The Practice 72 item contains a group of sub-items 86–100 displayed by the program 15a, as shown. The Product Type sub-item 86 is provided for specifying the type of simulator 14. Upon selection of the CPR Practice sub-item 88, the user may select among a plurality of action sequences 88a–f, to receive training in CPR with one rescuer, CPR with two rescuers, CPR ventilation and compression techniques with one rescuer, or with two rescuers, rescue breathing, or chest compression, respectively. The CPR test speed sub-item 90 prompts the user to select between action sequences 90a or 90b for either one or two rescuers, respectively. The Setup sub-item 92 enables the user to specify that the action sequences comprise 2, 4, 6, 8, 10, or 20 compression/ventilation cycles, respectively 92a–f. The Results/Print sub-item 94 directs the program 15a to record the time and magnitude of the compression and ventilation activity executed by the user on the simulator 14. The Sound sub-item 96 comprises a group of choices (not depicted) for CIM beeps, realistic sounds, or no sound. The Comm port sub-item 98 allows selection between a group of choices (not depicted) for serial port 1 and serial port 2. Selection of the Exit sub-item 100 directs the program 15a to exit from the Practice item 72, and return to the module 54a.

Figure 9:
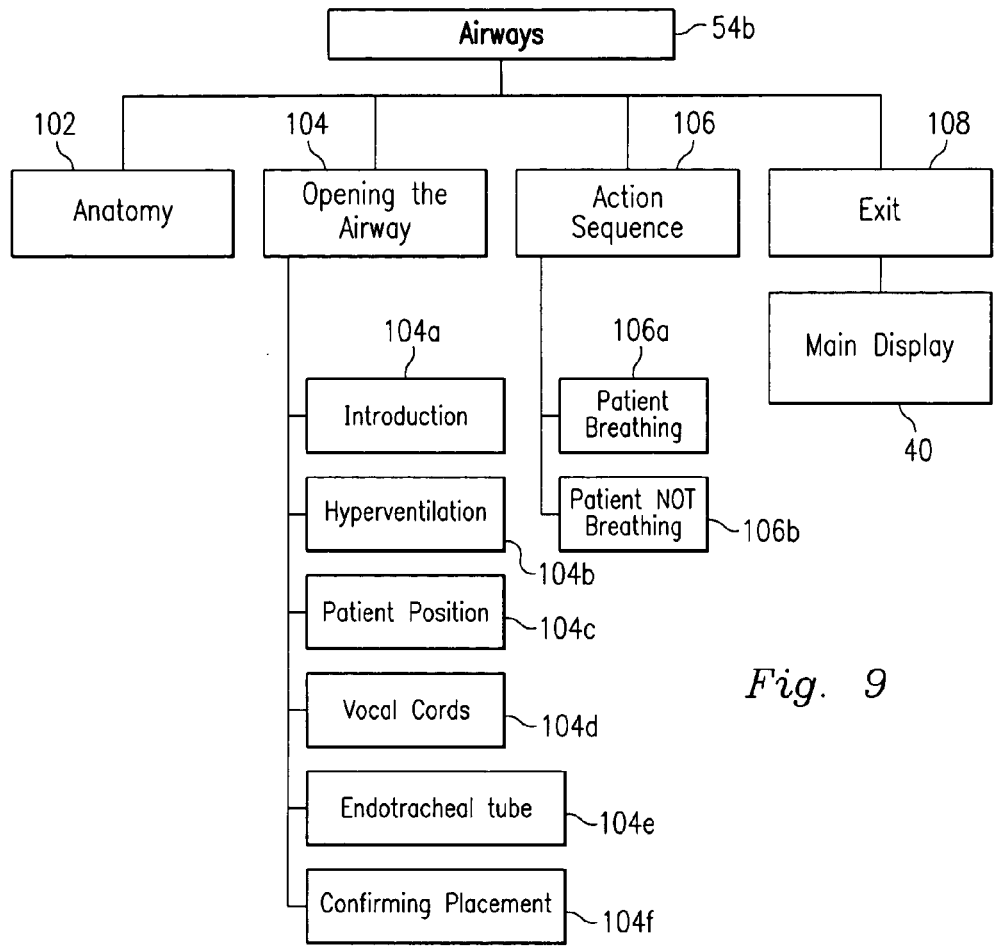

Referring to FIG. 9, selection of the Airways module 54b (FIG. 5) directs execution of the program 15a to provide information items 102–108 directed to Anatomy, Opening the Airway, Action Sequence, and Exit, respectively. The Anatomy item 102 can be selected to display a series of informational screens pertaining to airway anatomy, including the upper torso, neck, head, mouth, and vocal cords. The Opening the Airway item 104 includes sub-items 104a–f regarding introduction, hyperventilation, patient position, vocal cords, endotracheal tube, and confirming placement, respectively. The Action Sequence item 106 includes sub-items 106a and 106b regarding situations where the patient is breathing, and where the patient is not breathing, respectively. The Exit item 108 is selected to exit the Airways module 54b and return to the display 40 (FIG. 5).

Figure 10:
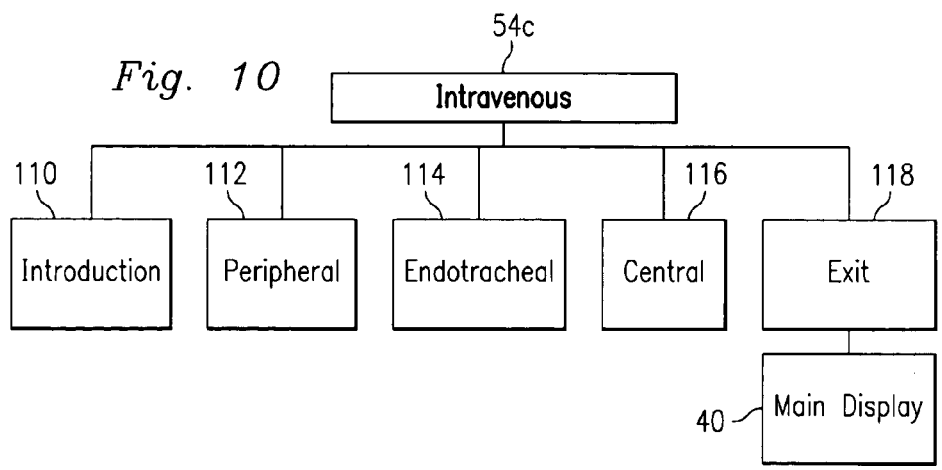

Referring to FIG. 10, selection of the Intravenous module 54c (FIG. 5) directs execution of the program 15a to a provide information items 110–118 directed to Introduction, Peripheral, Endotracheal, Central, and Exit, respectively. The Peripheral item 112 can be selected to display a series of informational screens pertaining to peripheral sites such as the antecubital vein, external jugular vein, saphenous vein, and intraosseous access. The Endotracheal item 114 can be selected to display a series of informational screens pertaining to the administration of atropine, lidocaine, epinephrine (ALE) drugs in an ET tube. The Central item 116 can be selected to display a series of informational screens pertaining to central sites including the femoral vein, subclavian vein, and internal jugular vein. The Exit item 118 is selected to direct the program to exit the Intravenous module 54c and return to the display 40 (FIG. 5).

Figure 11:
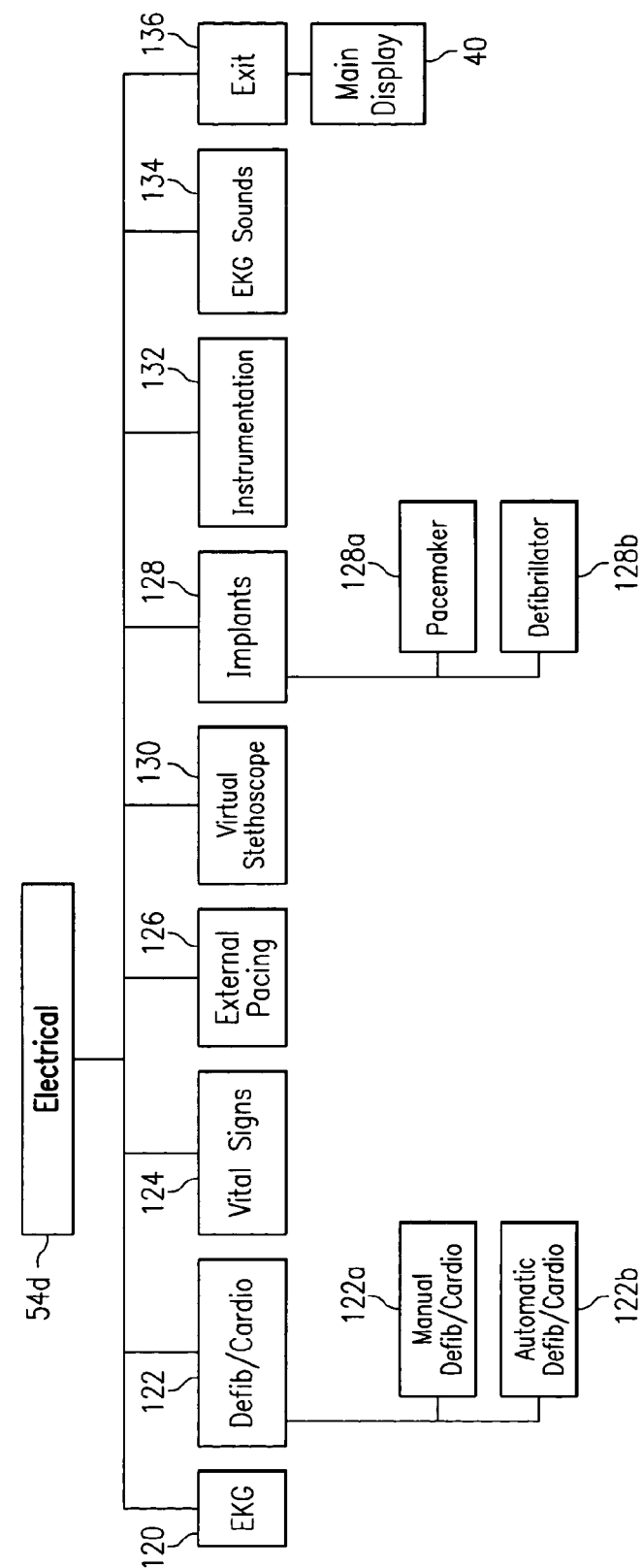

Referring to FIG. 11, selection of the Electrical module 54d (FIG. 5) directs execution of the program 15a to provide information items 120–136 for ECG, Defib/Cardio, Vital Signs, Ext. Pacing, Implants, Virtual Stethoscope, Instrumentation, ECG Sounds, and Exit, respectively. The ECG item 120 can be selected to display a series of informational screens pertaining to theory, use, and virtual ECG. The Defib/Cardio item 122 includes sub-items for manual defibrillation 122a and automatic defibrillation 122b ("AED"). The Vital signs item 124 can be selected to display a series of informational screens pertaining to blood pressure, heart rate, and oxygen saturation. The External Pacing item 126 can be selected to display a series of informational screens pertaining to theory, use, virtual defibrillation, and a virtual cardiac pacemaker. The Implants item 128 has sub-items for a pacemaker 128a and a defibrillator 128b. The Virtual stethoscope item 130 can be selected to display a series of informational screens pertaining to using the software-generated stethoscope, which will be described in greater detail below at FIG. 18, of the program 15a with respect to the virtual instruments tutor box 52. The Instrumentation item 132 has a set of choices (not depicted) for enabling, disabling, or checking the connections between the virtual instruments 12, the sensors 30, and the CIM 16. The ECG Sounds item 134 has set of choices (not depicted) for enabling or disabling the sounds. Exit item 136 is selected to direct the program 15a to exit from the Electrical module 54d, and return to the display 40 (FIG. 5).

Figure 12:
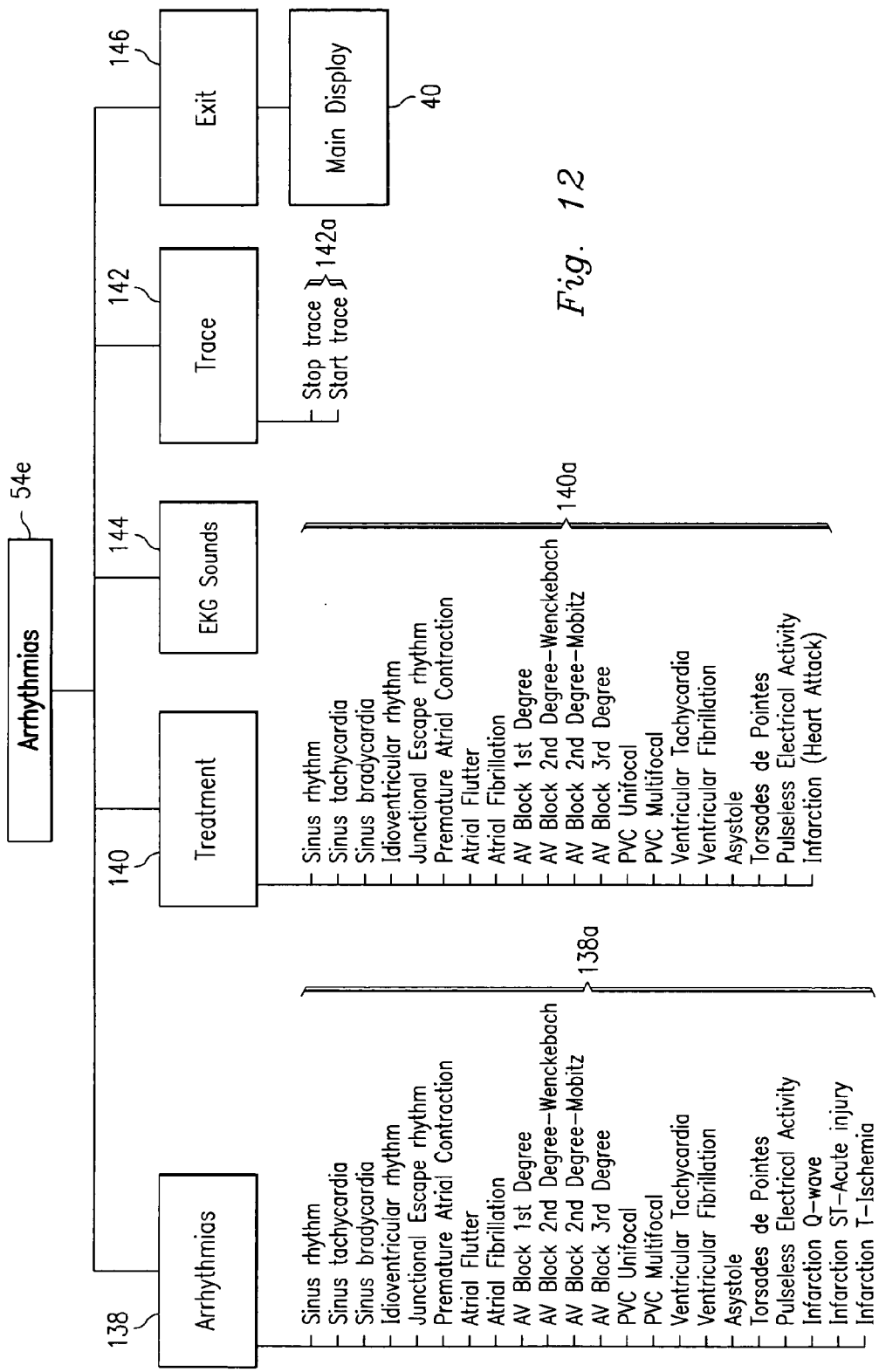

Referring to FIG. 12, selection of the Arrhythmias module 54e (FIG. 5) directs execution of the program 15a to a provide information regarding Arrhythmias, Treatment, Trace, and Exit, respectively items 138–146. The items 138 and 140 include a group of choices for information about a number of problems and treatments, respectively 138a and 140a. The Trace item 142 has controls for starting and stopping the trace, collectively 142a. The ECG Sounds item 144 has set of choices (not depicted) for enabling or disabling the sounds. Selection of the Exit item 146 directs the program 15a to exit from the Arrhythmias module 54e, and return to the display 40 (FIG. 5).

Figure 13:
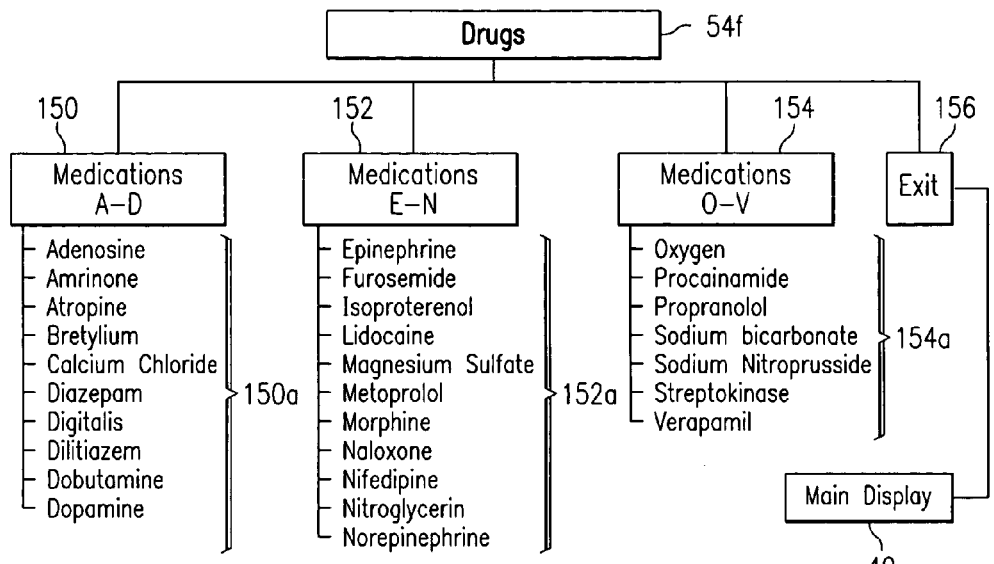

Referring to FIG. 13, selection of the Drugs module 54f (FIG. 5) directs execution of the program 15a to provide information regarding drugs, divided alphabetically into items 150–154, respectively Medications A–D, E–N, and O–V. These items include a group of choices 150a–154a for information including the dosage, indications, uses, actions, side effects, and precautions for the alphabetically grouped drugs. Selection of the Exit item 156 directs the program 15a to exit from the Drugs module 54f, and return to the display 40 (FIG. 5).

Figure 14:
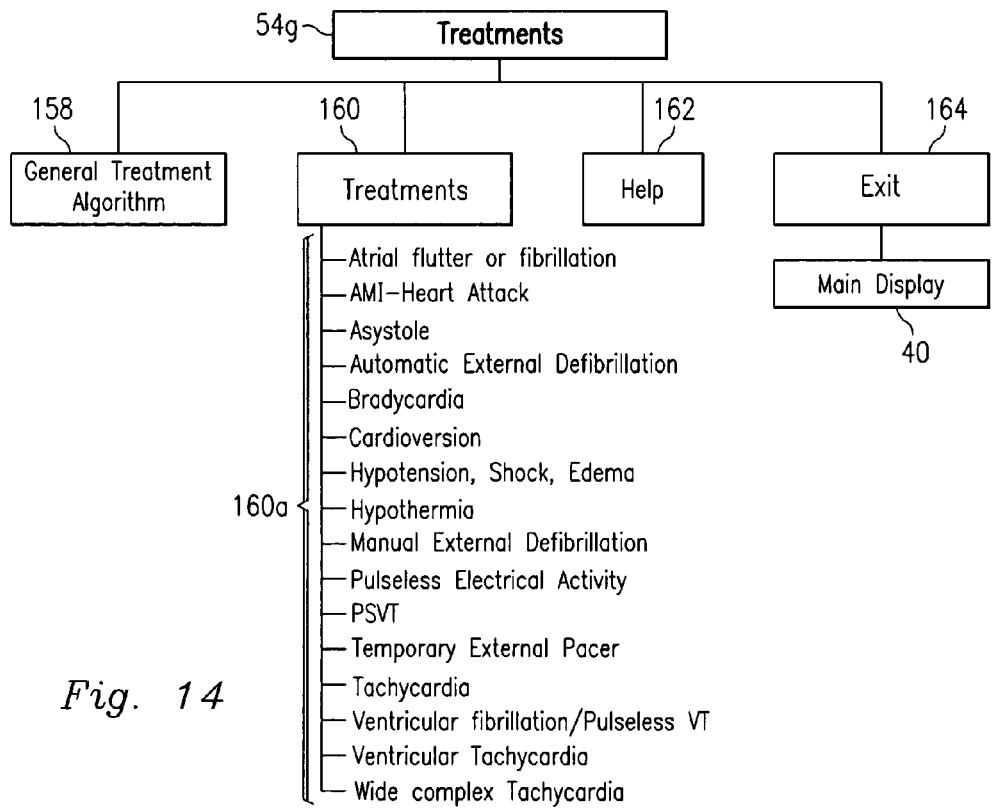

Referring to FIG. 14, selection of the Treatments module 54g (FIG. 5) directs execution of the program 15a to provide informational algorithms regarding treatment action sequences, including the items General Algorithm 158, Treatments 160, Help 162, and Exit 164. The General Algorithm 158 allows the user to work through a treatment scenario by answering questions as to a program-simulated patient's status. The Treatments item 160 includes a group of choices 160a to receive information on topics including atrial flutter, AMI heart attack, asystole, automatic external defibrillation, bradycardia, cardioversion, shock, hypothermia, manual external defibrillation, pulseless electrical activity, PSVT, temporary external cardiac pacemaker, tachycardia, ventricular fibrillation, ventricular tachycardia, and wide complex tachycardia. The Help item 162 provides information regarding using the Treatments module 54g. Selection of the Exit item 164 directs the program 15a to exit from the Treatments module 54g, and return to the display 40 (FIG. 5).

Referring back to FIG. 5, selection of a test module 54h–j from the test box 50 directs execution of the program 15a to provide a testing sequence to help test the user on patient care protocols, such as CPR and other responses to Code scenarios. The program 15a paces through the steps of a patient distress scenario, giving the user a predetermined time to respond or complete the task required, thus enabling the user to experience the pressure of a Code situation. For example, the program 15a may test the user by presenting choices from which the user must select in order to treat the patient, wherein the user must complete the correct choice before the sequence proceeds to the next event. The program 15a enables the user to enable, disable, or check the virtual instruments 12 and sensors 30 for connection to supply input to the CIM 16.

If the virtual instruments 12 (FIGS. 1a and 2) are enabled, the user may implement patient care activity on the simulator 14 using the virtual instruments 12, with the results and quality of response being monitored by the program 15a. Alternatively, the user may use software-simulated instruments 12' (FIG. 1b) generated by the program 15a. The program 15a advances through the scenario until the patient recovers, and provides a running critique of the user's responses, with an explanation of each incorrect choice or action. Features of the test modules 54h–j include items that enable the user to specify that action sequences prescribed by the scenario comprise a predetermined number of compression/ventilation cycles on the simulator 14, or to allow the user to record the time and magnitude of the compression and ventilation activity performed on the simulator 14, or to select among a group of choices for hearing realistic sounds.

Figure 15:
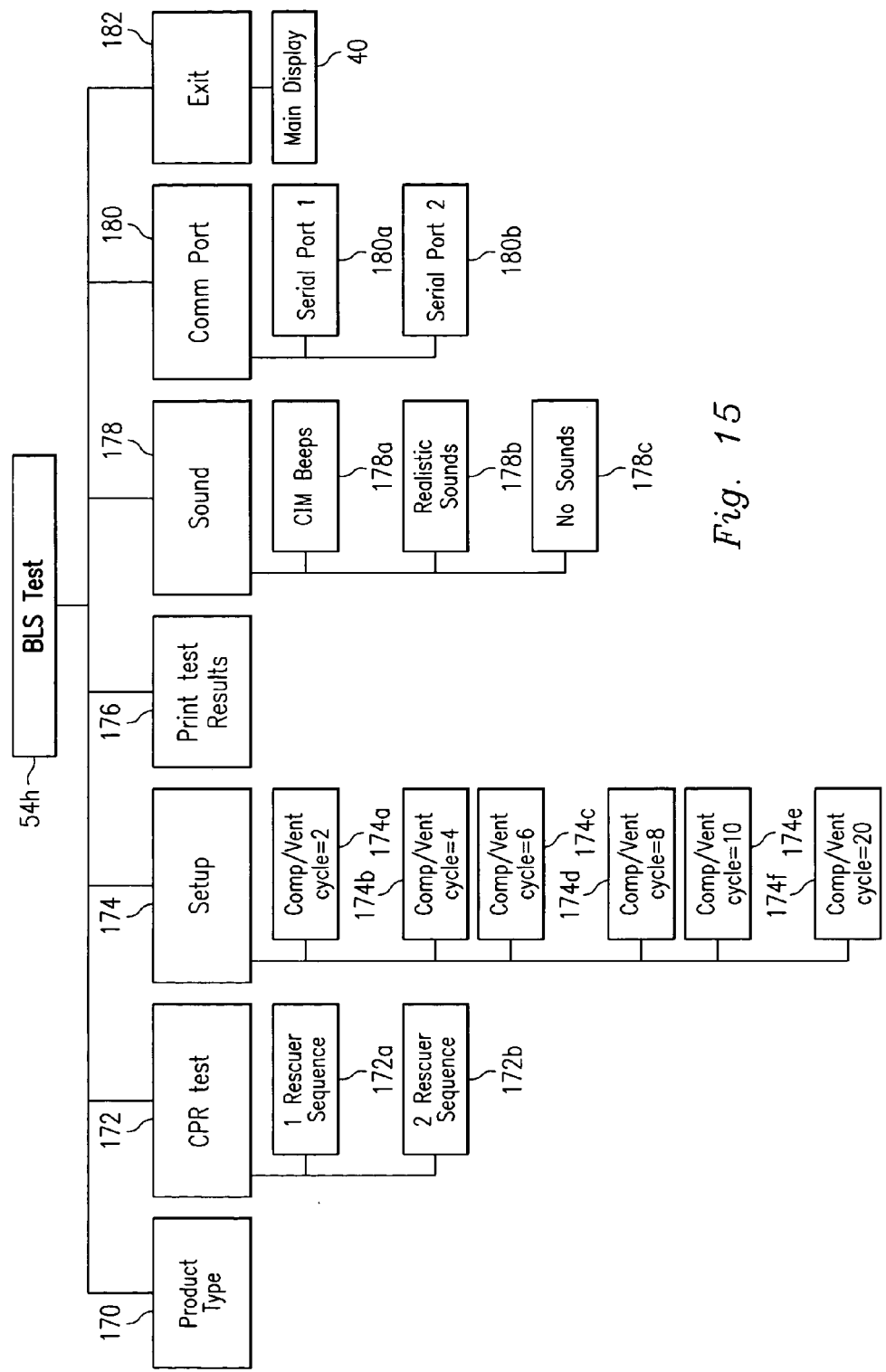

Referring to FIG. 15, selection of the BLS Test module 54h (FIG. 5) directs execution of the program 15a to provide items 170–182, respectively, Product type, CPR Test, Setup, Print, Sound, and Comm port, to help test the user on CPR techniques. The Product type item 170 is provided for specifying the type of simulator 14. Upon selection of the CPR test item 172, the user may select among a plurality of action sequences, to receive training in CPR with one rescuer 172a, or with two rescuers 172b. The Setup item 174 enables the user to specify that the action sequence comprises 2, 4, 6, 8, 10, or 20 compression/ventilation cycles, respectively 174*a*–*f*. The Print item 176 directs the program 15*a* to record the time and magnitude of the compression and ventilation activity executed by the user on the simulator 14. The Sound item 178 comprises a group of choices for CIM beeps, realistic sounds, or no sound, respectively 178*a*–*c*. The Comm port item 180 allows selection between a group of choices for serial port 1 and serial port 2, respectively 180*a*–*b*. Selection of the Exit item 182 directs the program 15*a* to exit from the BLS test module 54*h*, and return to the display 40 (FIG. 5).

Figure 16:
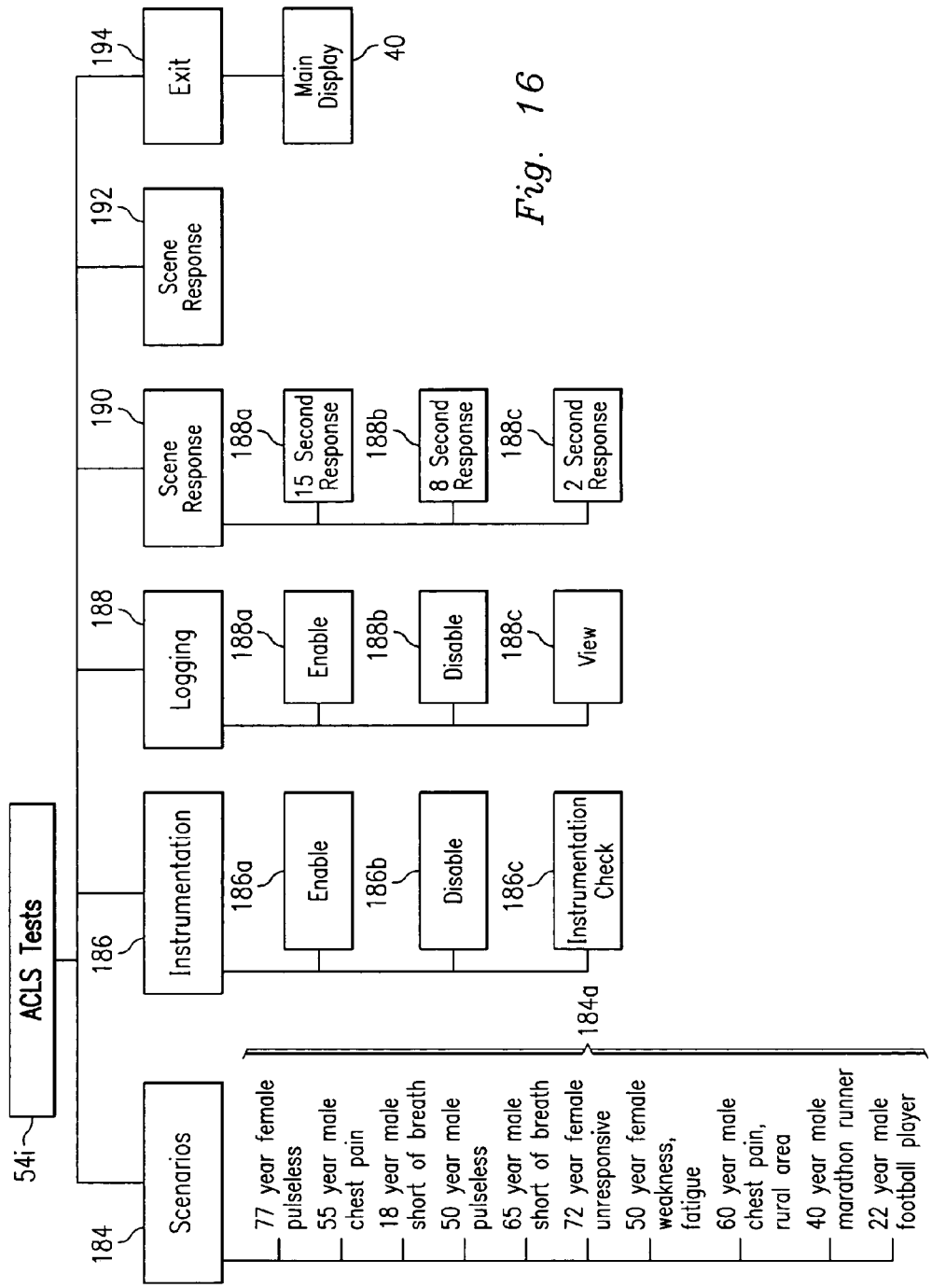

Referring to FIG. 16, selection of the ACLS Test module 54*i* (FIG. 5) allows the user to select among a plurality of items 184–194, for Scenarios, Instrumentation, Logging, Scene Response, ECG Sounds, and Exit, respectively. The Scenarios item 184 contains a group of action sequences 184*a*, comprising a pulseless 77 year old female, a 55 year old male with chest pain, an 18 year old male short of breath, a 50 year old pulseless male, a 65 year old male short of breath, a 72 year old unresponsive female, a 50 year old female with weakness and fatigue, a 60 year old male with chest pain in a rural area, a 40 year old male marathon runner, and a 22 year old football player. The user selects from the group 184*a* and then navigates a series of information screens while responding to queries as to the proper procedure for the selected action sequence. More specifically, the program 15*a* supplies details of the selected sequence, as well as a box (not depicted) showing the patient's ECG trace and vital signs. The Instrumentation item 186 enables the user to enable 186*a*, disable 186*b*, or check for connection 186*c*, the virtual instruments 12 and sensors 30 that supply input from the simulator 14 to the CIM 16. The user may use software-simulated instruments generated in the module 54*i* by the program 15*a*, or, alternatively, if the instrumentation is enabled by selecting sub-item 186*a*, the user may implement patient care activity on the simulator 14, with the results and quality of response being monitored by the program 15*a*. The Logging item 188 comprises sub-items 188*a*–*c* to enable, disable, or view a record of the time and magnitude of the compression and ventilation activity executed by the user on the simulator 14. The Scene Response item 190 has a group of choices 190*a*–*c* for selecting between a two, eight, or fifteen second scene response. The ECG Sounds item 192 has a group of choices (not depicted) for enabling or disabling the sounds. Selection of the Exit item 194 directs the program 15*a* to exit from the ACLS module 54*i*, and return to the display 40 (FIG. 5).

Figure 17A:
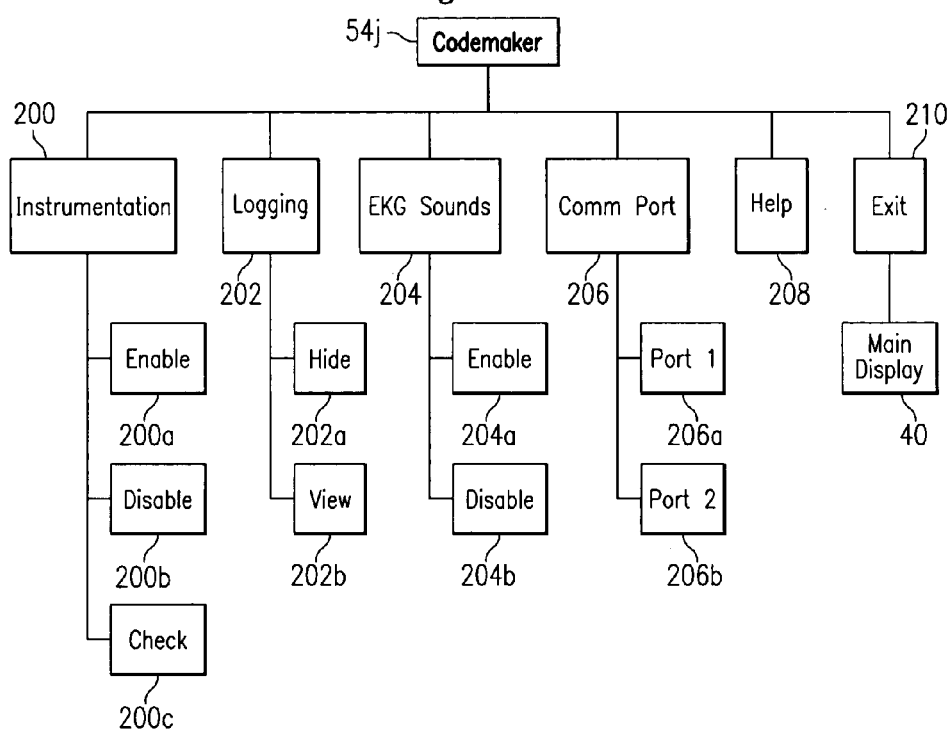
Figure 17B:
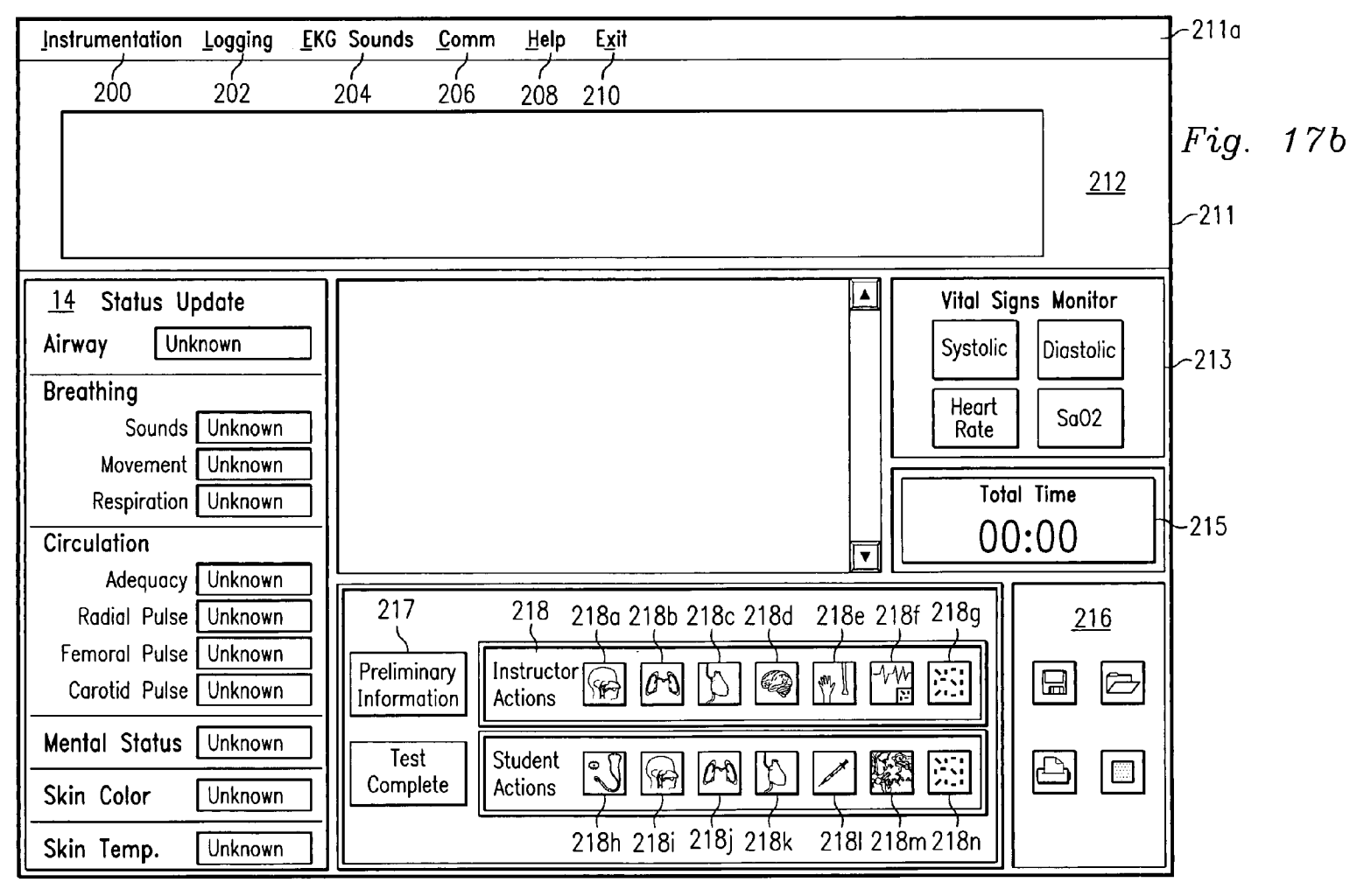
Figure 17C:
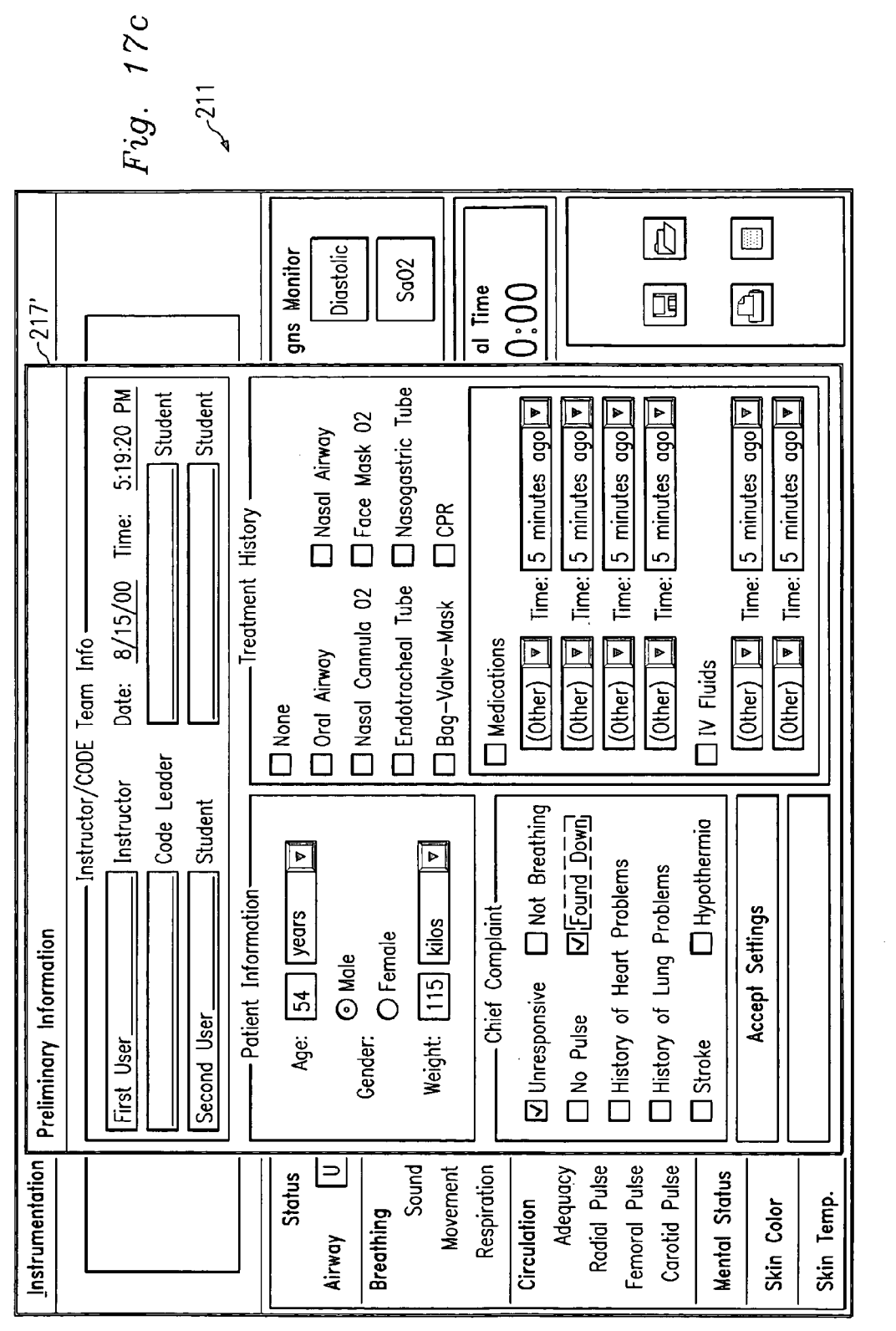

Testing may be defined by the program 15*a*, as above, or by the user. For example, selection of the Codemaker Test module 54*j* (FIG. 5) allows a first user, for example, an instructor, to create a scenario to test a second user, for example, a student. Referring to FIG. 17*a*, the Codemaker test module 54*j* includes a plurality of items 200–210, for Instrumentation, Logging, ECG Sounds, Comm. Port, Help, and Exit, respectively. The Instrumentation item 200 enables the user, by further selecting from a group of choices 200*a*–*c* to enable or disable or check the virtual instruments 12 and sensors 30 that supply input from the simulator 14 to the CIM 16. The Logging item 202 comprises a group of choices 202*a*–*b* to hide or view a record of the time and magnitude of the compression and ventilation activity executed by the user on the simulator 14. The record produced by the Logging item 202 can be used to provide feedback to the user.

Alternatively, if the instruments are disabled (item 200*b*), the student may institute appropriate treatment using software-generated instruments. The ECG Sounds item 204 has a group of choices 204*a* and 204*b* for enabling or disabling the sounds. The Comm port item 206 allows selection between a group of choices 206*a* and 206*b* for communication ports one and two, respectively. The Help item 208 provides direction for using the module 54*j*. Selection of the Exit item 210 directs the program 15*a* to exit from the Codemaker module 54*j*, and return to the display 40 (FIG. 5).

Referring to FIGS. 17*b*–17*f*, views of screen displays generated by the program for the Codemaker module are shown. The screen displays 211 have a menu bar 211*a* containing navigation items 200–210, for Instrumentation, Logging, ECG Sounds, Comm. Port, Help, and Exit, respectively. The screen displays also have an ECG chart 212, Vital Signs monitor 213, patient status update box 214, total elapsed time clock 215, and a data box 216 with conventional functions to save a session, open files, delete files, or print. A user may select a preliminary information button 217, or may be prompted to prompted to supply such information. Selection of the button 217 creates an internal display screen 217' (FIG. 17*c*), where the user may input preliminary data.

Figure 17D:
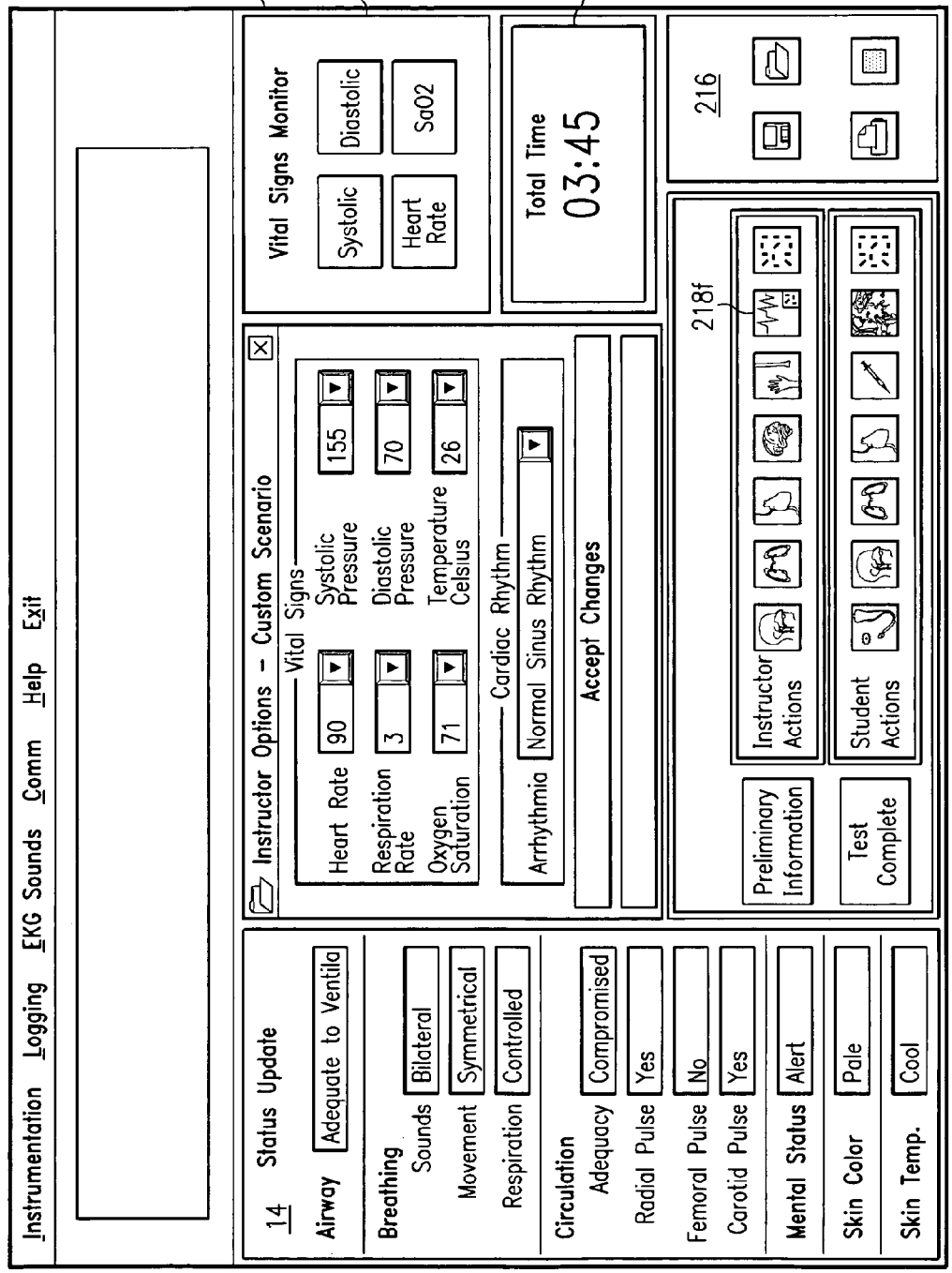
Figure 17E:
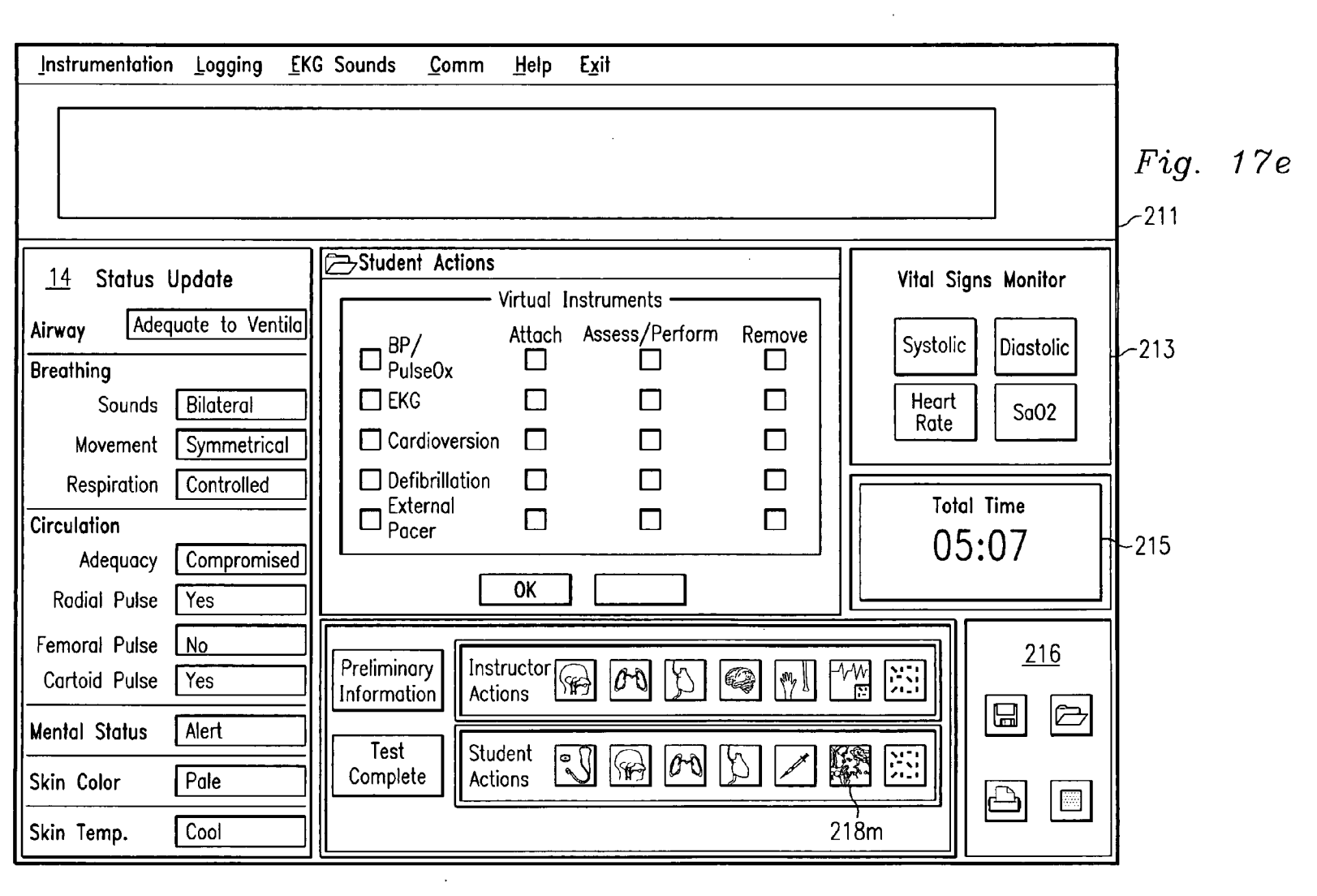

An Action box 218 retains buttons 218*a*–*g* for instructors to further customize conditions. For example, selection of the button 218*f* creates an internal display screen 218*f*' (FIG. 17*d*), where the instructor may input vital signs and cardiac rhythms which will be realistically reflected in the vital signs monitor 213. Thus, using buttons 217 and 218*a*–*g*, the instructor defines the patient simulator (virtual or tangible) of the testing scenario by entering a set of preliminary patient parameters regarding information such as sex, weight, and age, as well as patient indications, like shortness of breath, chest pain, mental awareness, and circulation. These patient indications are summarized in box 214 (FIG. 17*d*). An instructor defined testing system allows the instructor to test the student on local, national, or international patient care protocols. Many algorithms are selectable by opening files, including BLS, ACLS, Pediatric, and Obstetric (OB) emergencies. Other algorithms may be created and stored, and algorithms may be linked together as well.

Action may be taken in response to the conditions by the student via buttons 218*h*–*n*. For example, selection of the button 218*m* creates an internal display screen 218*m*' (FIG. 17*e*), where the student may select among virtual instruments to use to render patient care activities. The student may then perform the patient care activities virtually, or using the a tangible simulator.

All of the student and instructor actions are noted in the log 219 (FIG. 17*f*) along with time markers for later review. Action can be paused and resumed.

Benefits of this module include flexibility for instruction and the ability to detect mastery of the subject. An instructor-defined algorithm would presumably vary from well-known, structured algorithms, and thus avoid the problem of rote memorization of responses by the student.

Use of the modules 54*k*–*p* of the virtual instruments tutor box 52 provides information about instruments commonly used in Code scenarios. In some instances, opportunities to practice using some of the virtual instruments 12 in patient care protocols with the simulator 14 are provided.

Referring to FIG. 18, selection of the Sounds module 54*k* (FIG. 5) by the user causes the program 15*a* to display a series of screens, such as display 220. The display 220 includes a Sounds box 222 containing an On/Off button 222*a*, and a list of selectable heart and lung sounds, respectively 222*b* and 222*c*. Selection of a sound from the lists 222*b*–*c* will direct the program 15*a* to display a tutorial box 222*d* with information relating to the selected sound. The display is navigated by the Back, Next, and Exit buttons, respectively 80–84, and additionally contains a representation of a human torso 224 (e.g., 14' of FIG. 1b), such that when a stethoscope icon 226 (e.g., 12' of FIG. 1b), corresponding to the position of a mouse (not depicted) of the computer 15, is moved around the torso, the stethoscope icon glows when placed in the correct anatomical area for hearing the selected sound and the program 15a plays the sound. Thus, the program 15a displays both audio and visual feedback for learning the location for detecting selected body sounds in a patient. An Exit item 228 is provided for exiting the module 54k and returning to the display 40 (FIG. 5).

Alternatively, the portion of the program 15a controlling the sounds and stethoscope icon may be excerpted and saved to a portable data storage device, such as a CD-ROM, to create a learning system for locating selected body sounds in a patient featuring both audio and visual feedback.

Referring to FIG. 19, selection of the Vital Signs module 54l (FIG. 5) causes the program 15a to display a series of screens, such as display 230. The display 230 includes a Vital signs monitor box 232 containing indicator boxes for systolic pressure, diastolic pressure, heart rate, and oxygen saturation, 232a–d, respectively. The display 230 is navigated by the Back, Next, and Exit buttons, respectively 80–84. A Sample Rhythms item 234 contains a group of selectable rhythms for the user to observe, such as a normal sinus rhythm, sinus bradycardia, idioventricular rhythm, ventricular tachycardia, and ventricular fibrillation. An Exit item 236 is provided for exiting the module 54l and returning to the display 40 (FIG. 5).

Referring to FIG. 20, selection of the Virtual ECG Monitor module 54m (FIG. 5) causes the program 15a to display a series of screens, such as display 240. The display 240 includes an Electrocardiograph box 242 for displaying the ECG sweep 242a, and having a heart rate indicator 242b and On/Off button 242c. The display 240 is navigated by the Back, Next, and Exit buttons, respectively 80–84. A Sample Rhythms item 244 contains a group of selectable rhythms for the user to observe, such as a normal sinus rhythm, sinus bradycardia, idioventricular rhythm, ventricular tachycardia, and ventricular fibrillation. An ECG Sounds item 246 allows the user to enable or disable the associated sounds. An Exit item 248 is provided for exiting the module 54m and returning to the display 40 (FIG. 5).

Figure 21:
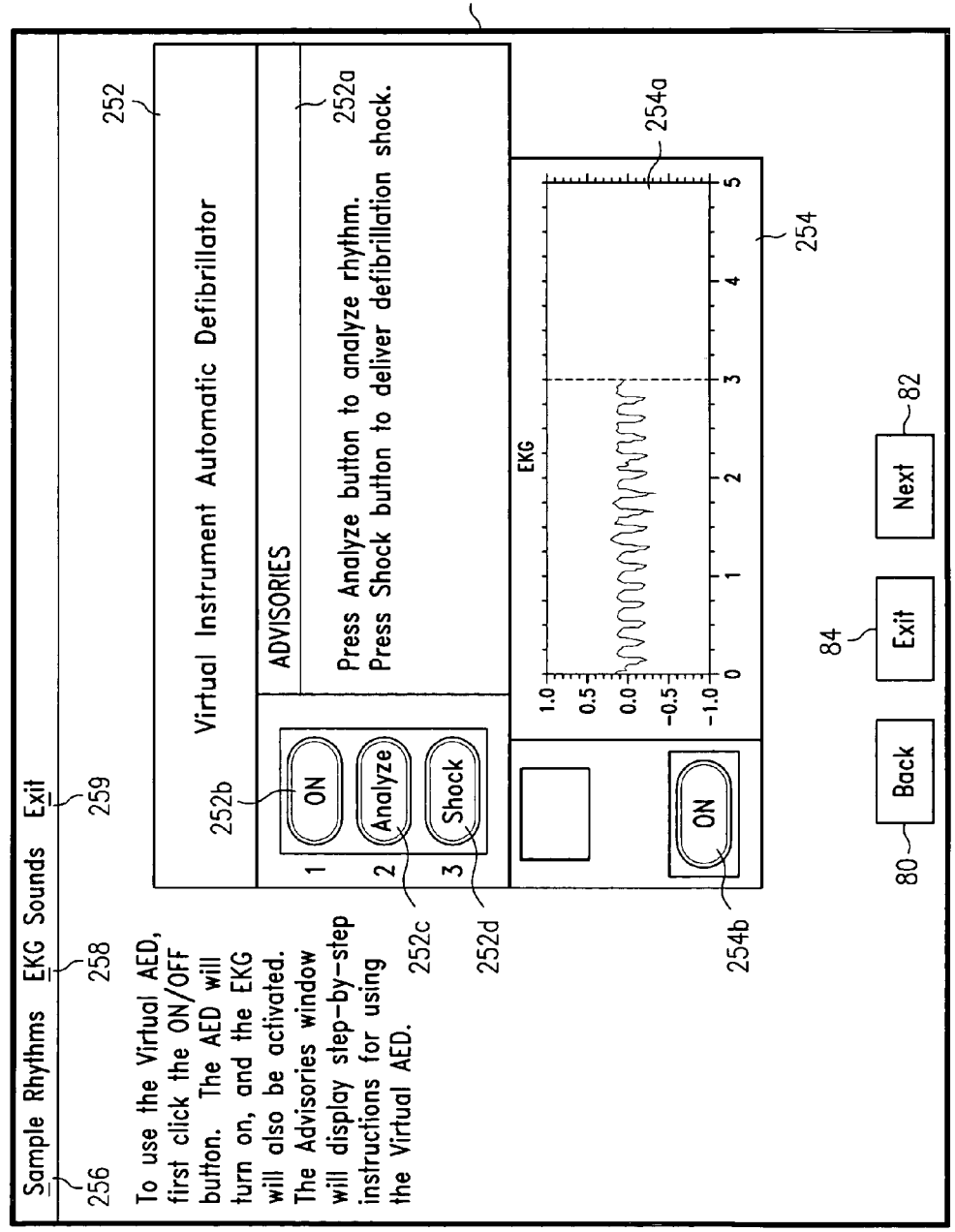

Referring to FIG. 21, selection of the Automatic Defibrillator module 54n (FIG. 5) causes the program 15a to display a series of screens, such as display 250. The display 250 includes a Control box 252 having an advisories box 252a, and On/Off, Analyze, and Shock buttons 252b–d. The display 250 also has an ECG box 254 having a sweep 254a, and On/Off button 254b. The display 250 is navigated by the Back, Next, and Exit buttons, respectively 80–84. A Sample Rhythms item 256 contains a group of selectable rhythms for the user to observe, such as a normal sinus rhythm, sinus bradycardia, idioventricular rhythm, ventricular tachycardia, and ventricular fibrillation. An ECG Sounds item 258 allows the user to enable or disable the associated sounds. An Exit item 259 is provided for exiting the module 54n and returning to the display 40 (FIG. 5).

Figure 22:
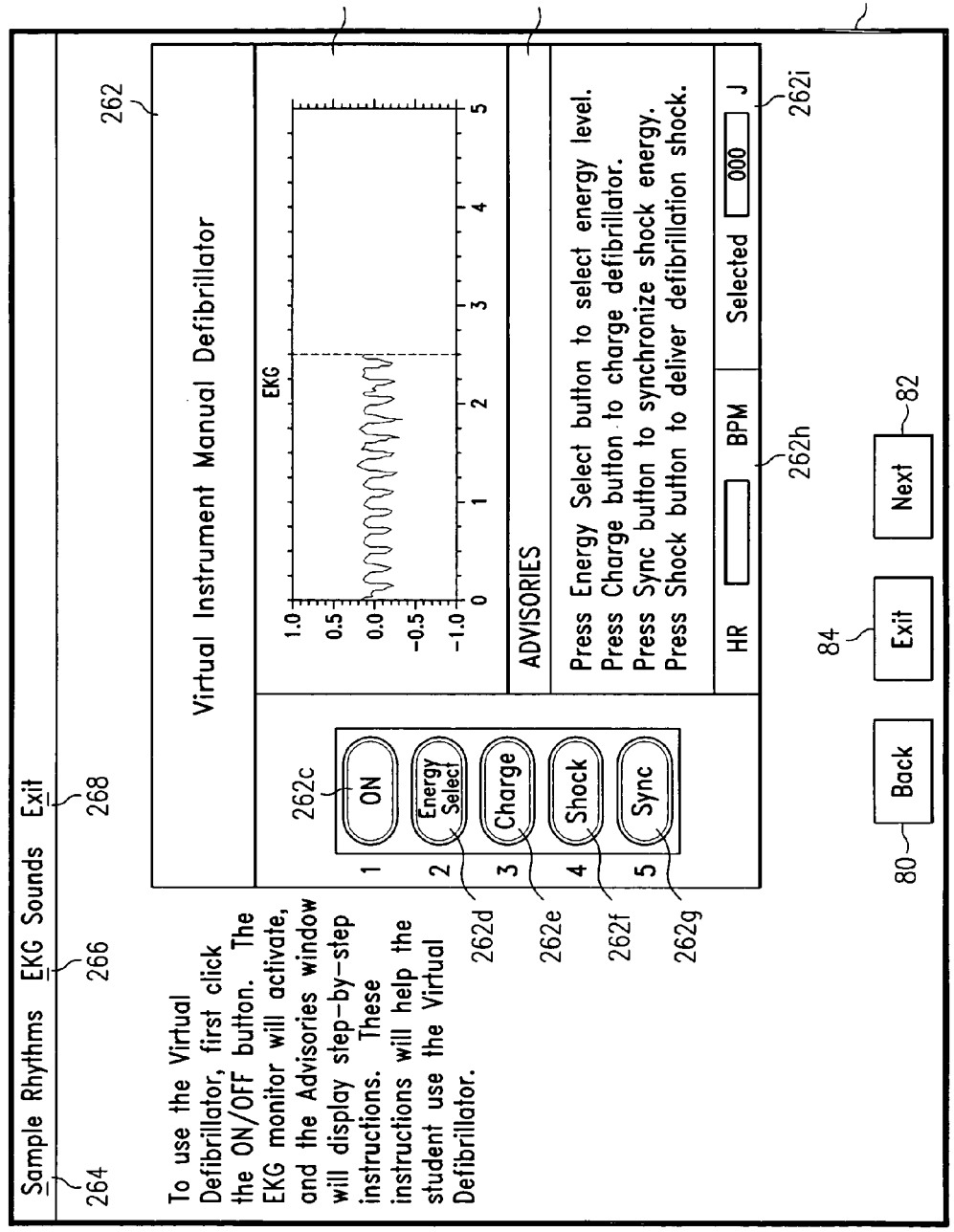

Referring to FIG. 22, selection of the Manual Defibrillator module 54o (FIG. 5) causes the program 15a to display a series of screens, such as display 260. The display 260 includes a Control box 262, having an imbedded ECG sweep 262a, an advisories box 262b, buttons 262c–g, respectively On/Off, Energy Select, Charge, Shock, and Synchronize, as well as a heart rate display 262h, and a selected energy indicator 262i. The display 260 is navigated by the Back, Next, and Exit buttons, respectively 80–84. A Sample Rhythms item 264 contains a group of selectable rhythms for the user to observe, such as a normal sinus rhythm, sinus bradycardia, idioventricular rhythm, ventricular tachycardia, and ventricular fibrillation. An ECG Sounds item 266 allows the user to enable or disable the associated sounds. An Exit item 268 is provided for exiting the module 54o and returning to the display 40 (FIG. 5).

Figure 23:
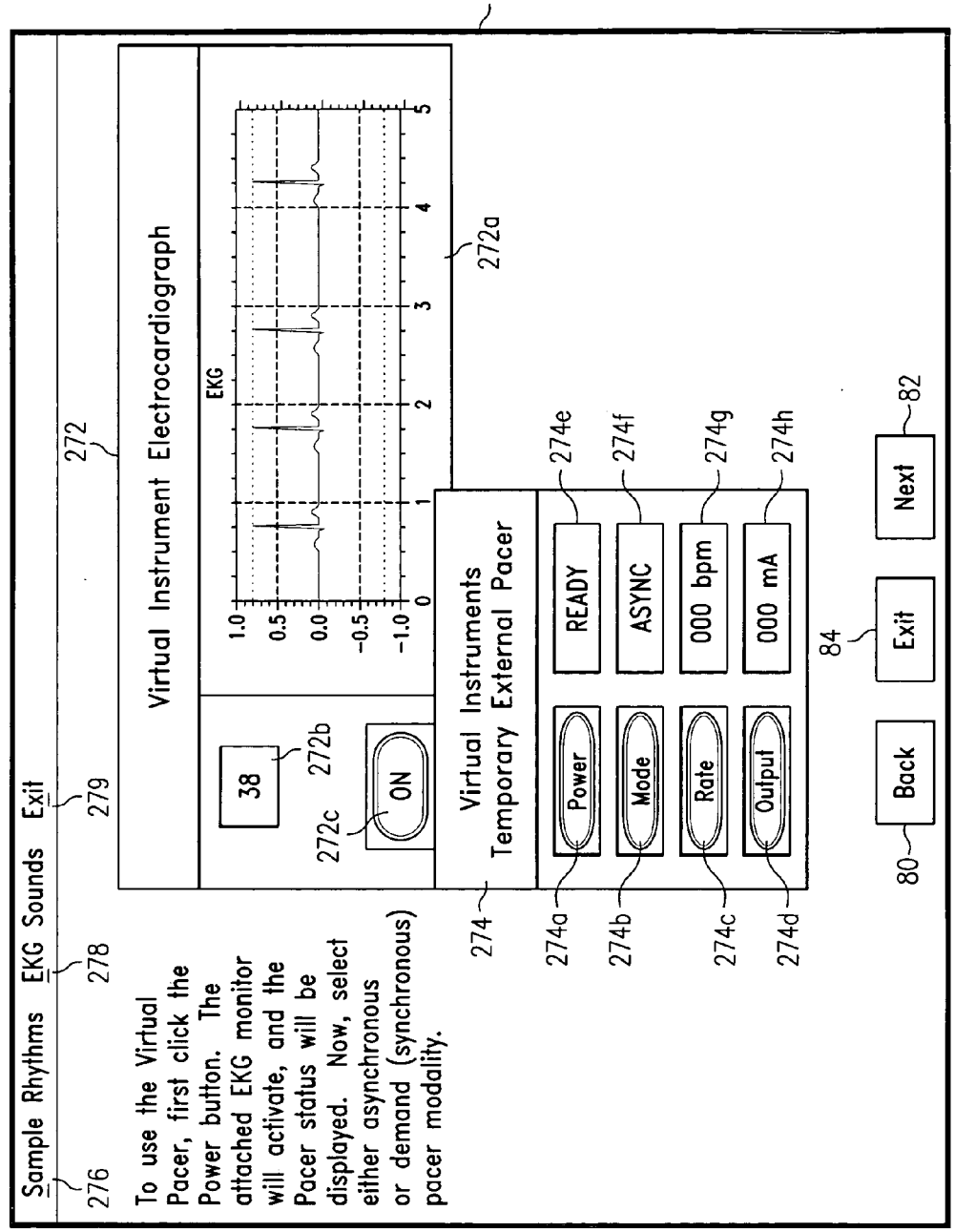

Referring to FIG. 23, selection of the Electrocardiograph module 54p (FIG. 5) causes the program 15a to display a series of screens, such as display 270. The display 270 includes an ECG box 272, having an associated ECG sweep 272a, a heart rate indicator 272b, and an On/Off button 272c. A Cardiac pacemaker box 274 is also provided by the program 15a and has buttons for power, mode, rate, and output, 274a–d, respectively, having associated status indicators 274e–h. The display 270 is navigated by the Back, Next, and Exit buttons, respectively 80–84. A Sample Rhythms item 276 contains a group of selectable rhythms for the user to observe, such as sinus bradycardia and idioventricular rhythm. An ECG Sounds item 278 allows the user to enable or disable the associated sounds. An Exit item 279 is provided for exiting the module 54p and returning to the display 40 (FIG. 5).

The modeling of biopotential waveforms, synchronization of sounds with waveforms, and other aspects of various scenarios may be prerecorded or may be calculated in real time. For example, the PIC 20 (FIG. 1) may be used to process information associated with a scenario and vary generate various scenario parameters in response to user action or inaction. Alternatively, the PIC 20 may augment a preexisting scenario by supplying real time modeling to portions of the scenario. For example, the morphology of the emulated ECG waveforms may be altered automatically by the PIC 20 to correspond with an increased heart rate. This enables each scenario to be customized in real time, which further reinforces the teaching value of the scenario.

In some embodiments, multiple scenarios may be linked together to provide a larger scenario that is more involved than a single scenario. Furthermore, such linking enables an instructor to escalate a training situation from a relatively straight-forward scenario to a more complicated scenario. This may be particularly effective if the escalation occurs as a result of a user's actions. For example, if a user fails to take appropriate measures during a first scenario, a second scenario may be executed that is based on the failure of the user in the first scenario. The second scenario may be selected by an instructor, automatically selected from a list of linked scenarios, or automatically selected from a list of scenarios associated with a particular action or lack of action. Selection parameters (e.g., difficulty levels, restricting scenarios to certain types of patient care, etc.) may be predefined to aid in such automatic selection. In addition, trending may be introduced into a scenario in either a predefined or a dynamically generated manner.

Figure 24:
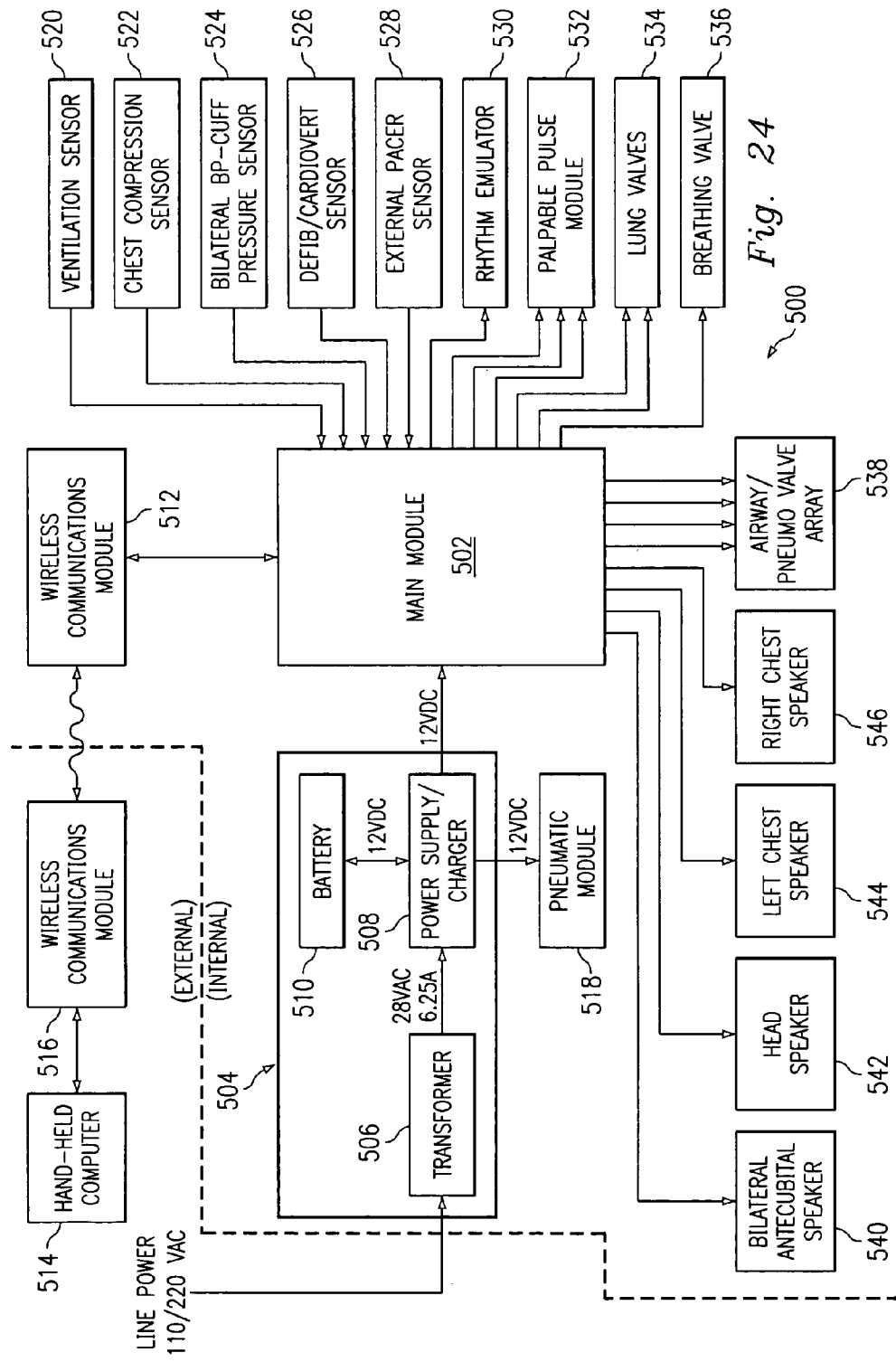
FIG. 24 is a schematic of an exemplary portable emergency care simulator system.

Referring now to FIG. 24, in another embodiment, a portable emergency care simulator system 500 is illustrated. The simulator system 500 may be integrated into the interactive education system 10 of FIG. 1a, or may simply share some functionality with the system 10. For purposes of illustration, the simulator system 500 is a fully articulating manikin having the form of an adult human having arms, legs, a torso, and selected internal organ models positioned within the torso, such as heart and lung models. Although an adult manikin is used in the present illustration, it is understood that the simulator system 500 may be scaled for use with a smaller manikin, such as a child-sized manikin. The manikin may also include an airway that can be intubated, as well as various intravenous and intramuscular injection sites. Furthermore, the manikin may be weighted in a realistic manner to simulate a non-responsive patient. In addition, various connectors and cables within the manikin may be reinforced, and various electronic and electrical components of the simulator system 500 may be protected within the manikin from shock, fluids, and compression forces. The simulator system 500 may also be modular, thereby enabling various components to be removed and/or added without modifying the remainder of the system.

Figure 29:
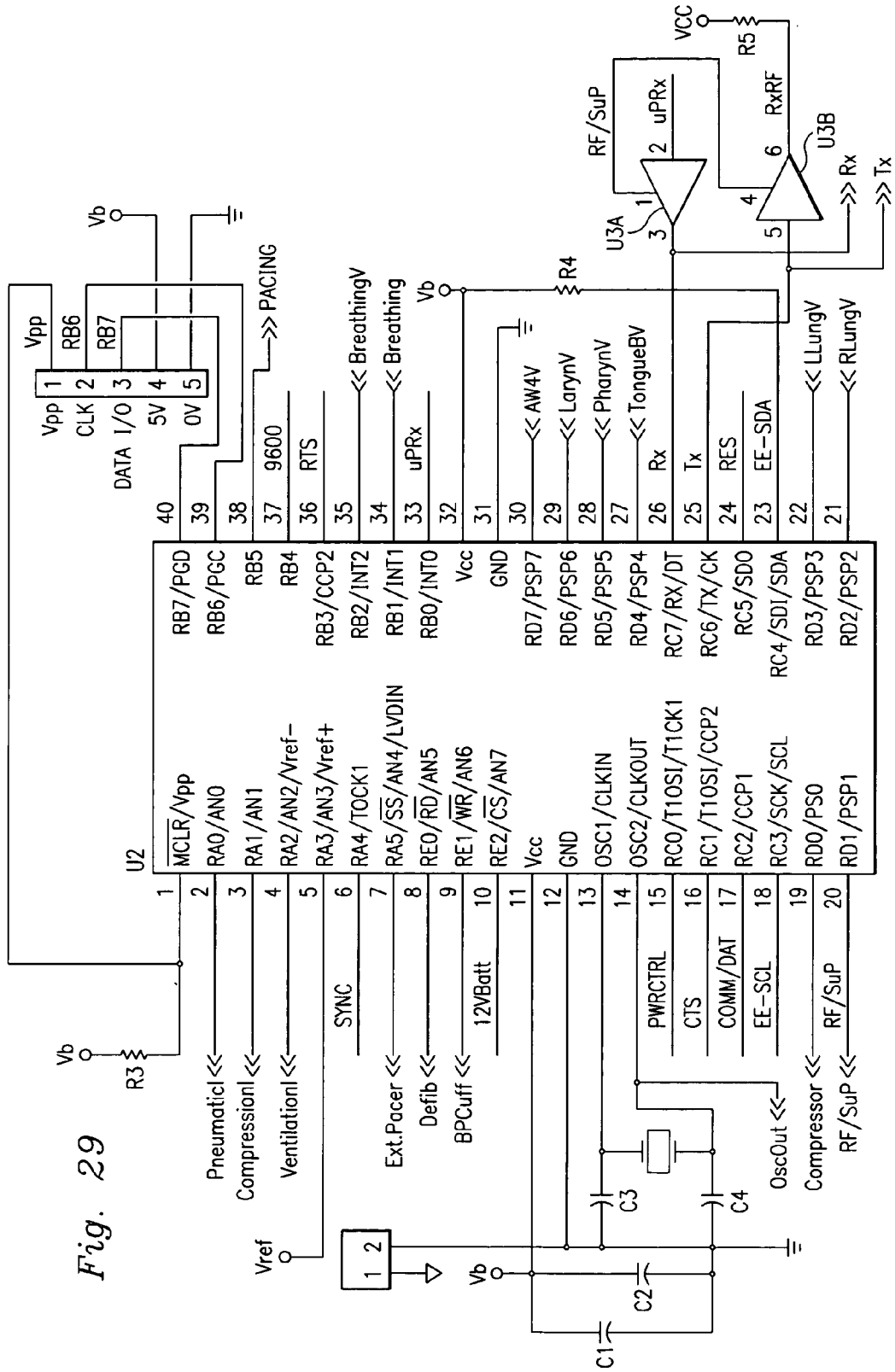
FIG. 29 is a circuit diagram of a first microprocessor and associated components that may be used to control the simulator system of FIG. 24.
Figure 30:
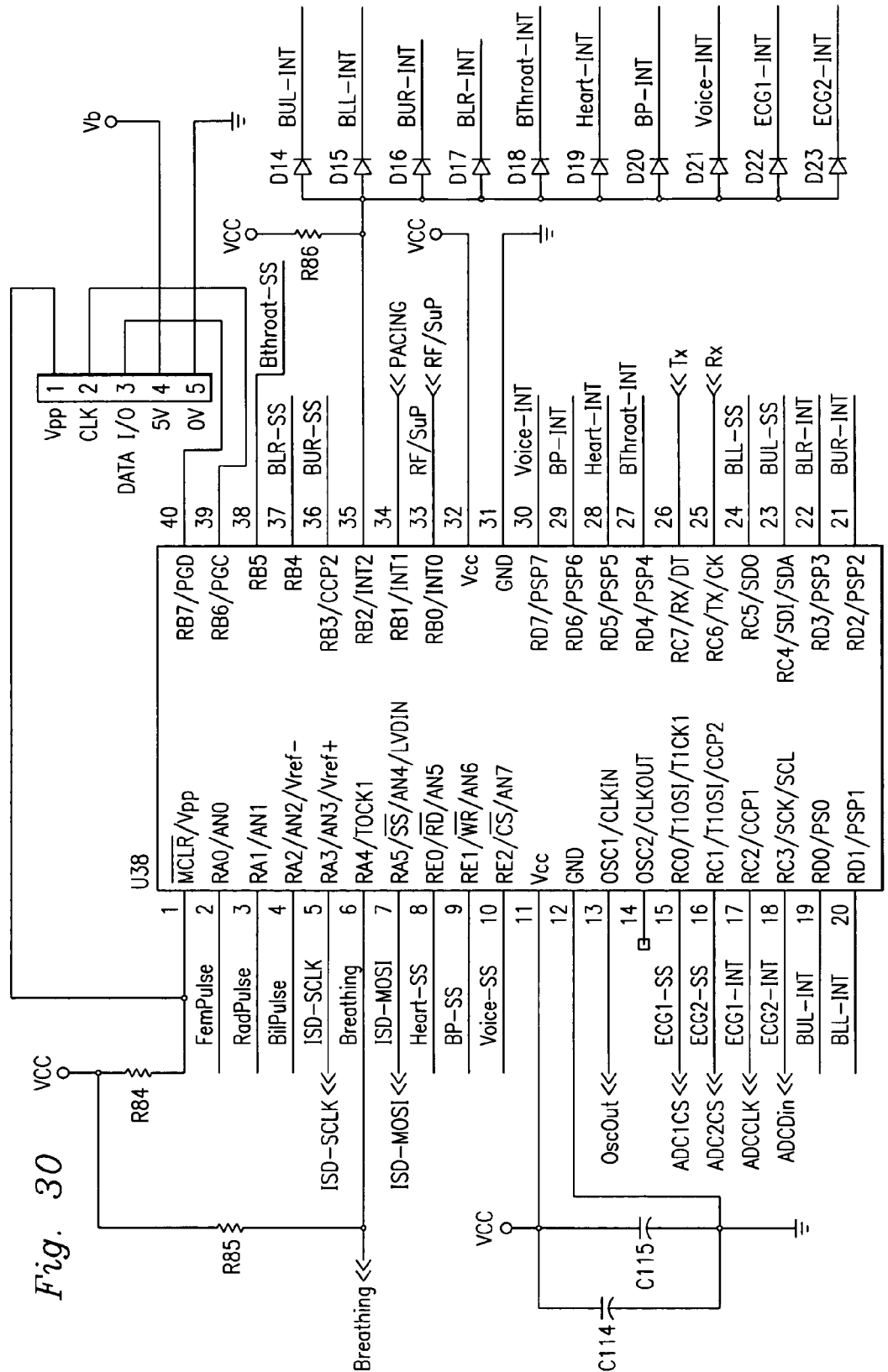
FIG. 30 is a circuit diagram of a second microprocessor and associated components that may be used to control the simulator system of FIG. 24.
Figure 31:
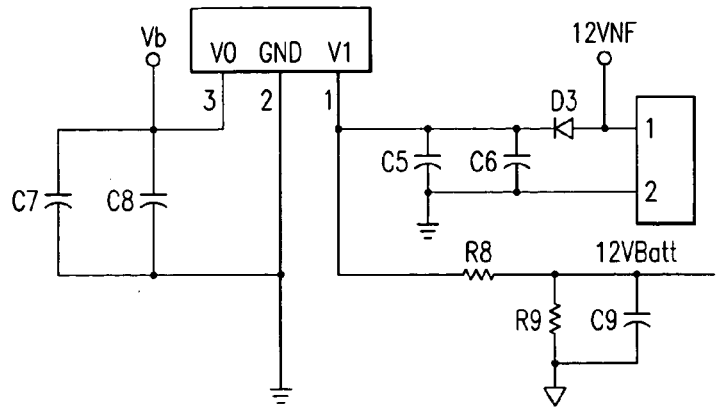
FIG. 31 is a circuit diagram of an exemplary power circuit that may be used in conjunction with the microprocessor of FIG. 29 or 30.

The simulator system 500 includes a main module 502 that is connected to and interacts with a plurality of other modules, as will be described below in greater detail. The main module 502 includes one or more processors, such as PIC18LF452 processors that are available from Microchip Technology, Inc. (Chandler, Ariz.), that are used to control at least some of the other modules. In the present embodiment, the main module 502 includes two processors (FIGS. 29, 30) which interact with other circuits (FIGS. 31–40) in the simulator system 500. It is noted that several of the modules comprise similar circuits and, therefore, a single representative circuit may be used to illustrate several circuits in the simulator system 500.

In the present example, the simulator system 500 may be powered by a power circuit 504 (such as that illustrated in FIG. 31) that provides power using one of two different power sources. The first power source includes direct line power (e.g., 110 or 220 VAC) that is received by the power module 504 and converted into a predefined second voltage or current using a transformer 506, such as a Series 4–49 transformer that is available from MCI Transformer Corp. (Babylon, N.Y.). For example, the transformer 506 may convert the received AC voltage into a second voltage (e.g., 28 VAC) or into a desired current (e.g.,6.25 amperes). The transformer 506 supplies power to a power supply/charger 508, such an SMP7 High Current Power Supply/Charger that is available from Altronix Corp (Brooklyn, N.Y.). The power supply/charger 508 may provide power to a battery 510, the main module 502, and a pneumatic module 518. It is understood that other modules may receive power directly from the power supply/charger 508 if desired. The battery 510 supplies the second power source.

In operation, the source of power may be user selected or may be automatically selected. For example, if the simulator system 500 is in operation and the power module 504 is connected to direct line power, then the power supply/charger 508 may automatically supply power to components of the simulator system 500 using the direct line power. However, if the simulator system 500 is in operation and not connected to direct line power, then the power supply/charger 508 may automatically draw power from the battery 510. If the simulator system 500 is not in operation and connected to direct line power, then the power supply/charger 508 may charge the battery 510. This enables both portable use of the simulator system 500, as well as providing a battery backup should the direct line power fail while the simulator system 500 is in use.

Figure 32:
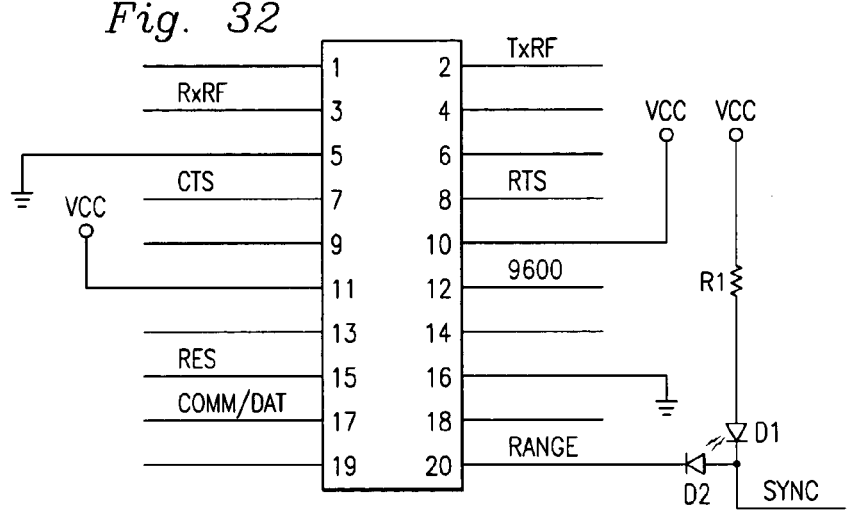
FIG. 32 is a circuit diagram of an exemplary wireless communication module circuit that may be used in conjunction with the microprocessor of FIG. 29 or 30.
Figure 33:
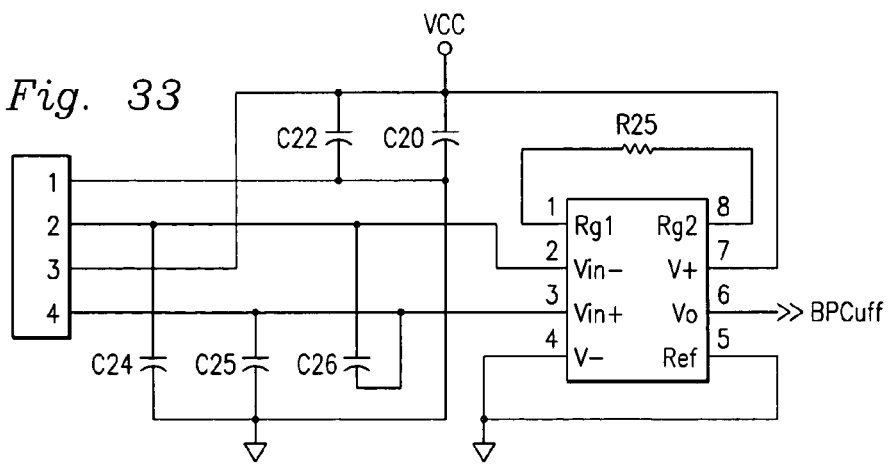
FIG. 33 is a circuit diagram of an exemplary sensor circuit that may be used in conjunction with the microprocessor of FIG. 29 or 30.
Figure 34:
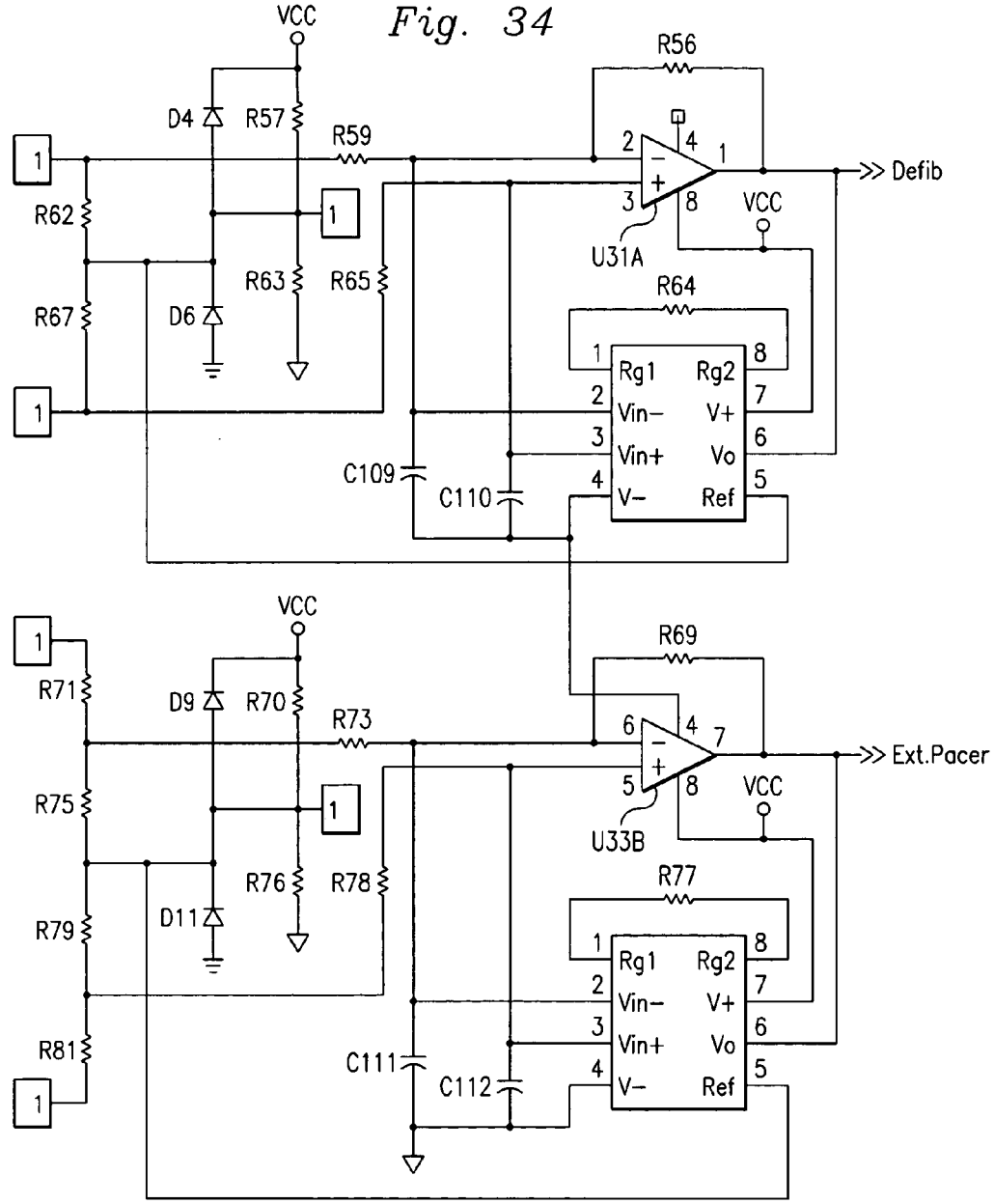
FIG. 34 is a circuit diagram of an exemplary defibrillator and external cardiac pacemaker circuit that may be used with the microprocessor of FIG. 29 or 30.
Figure 35A:
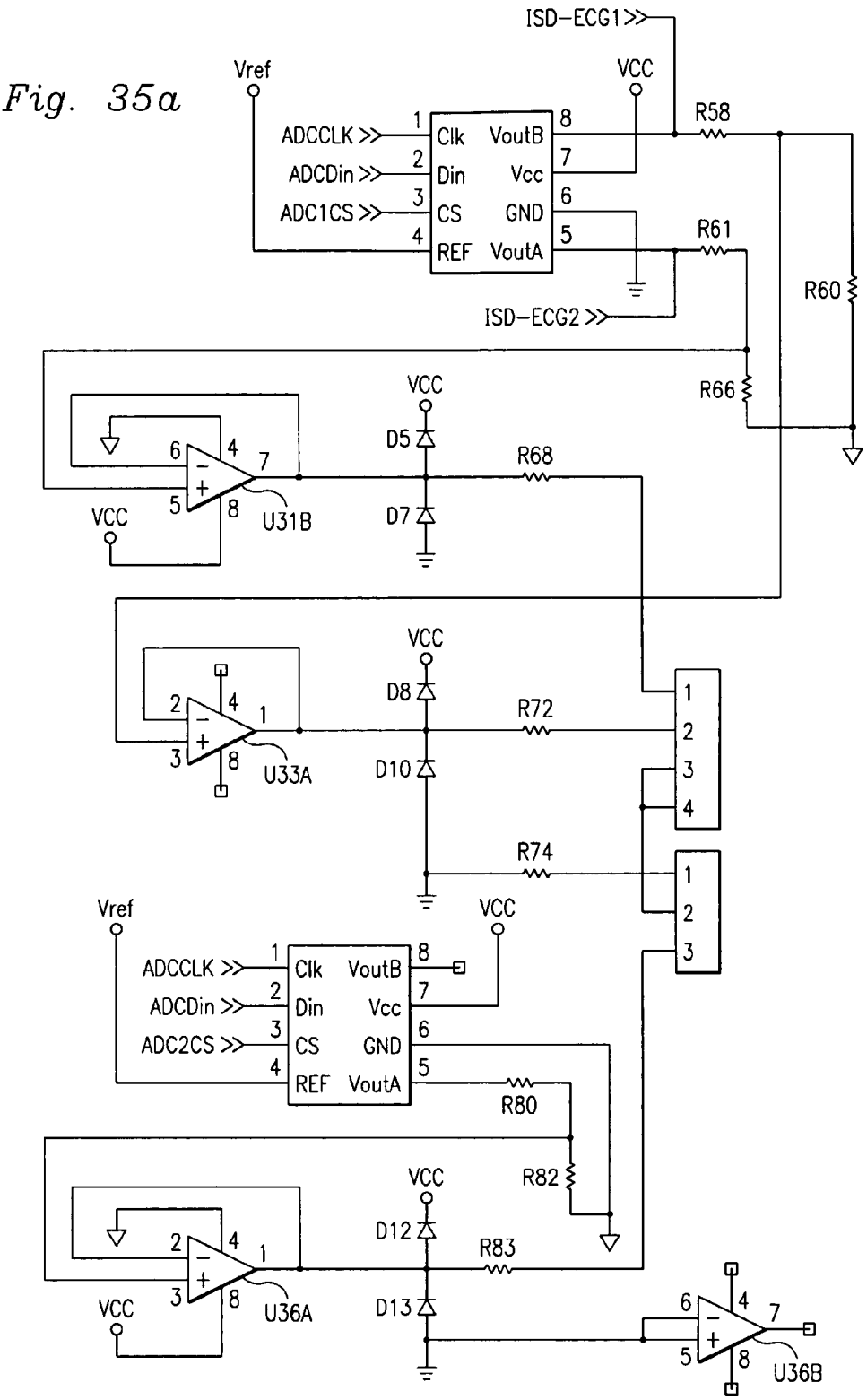
FIGS. 35a–c are circuit diagrams of an exemplary electrocardiogram circuit that may be used in conjunction with the microprocessor of FIG. 29 or 30.
Figure 35B:
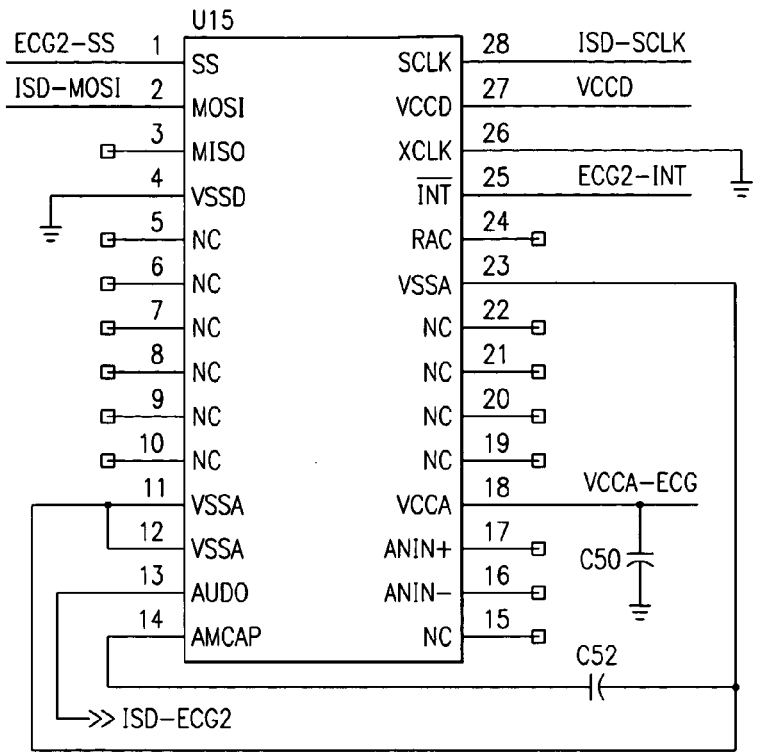
Figure 35C:
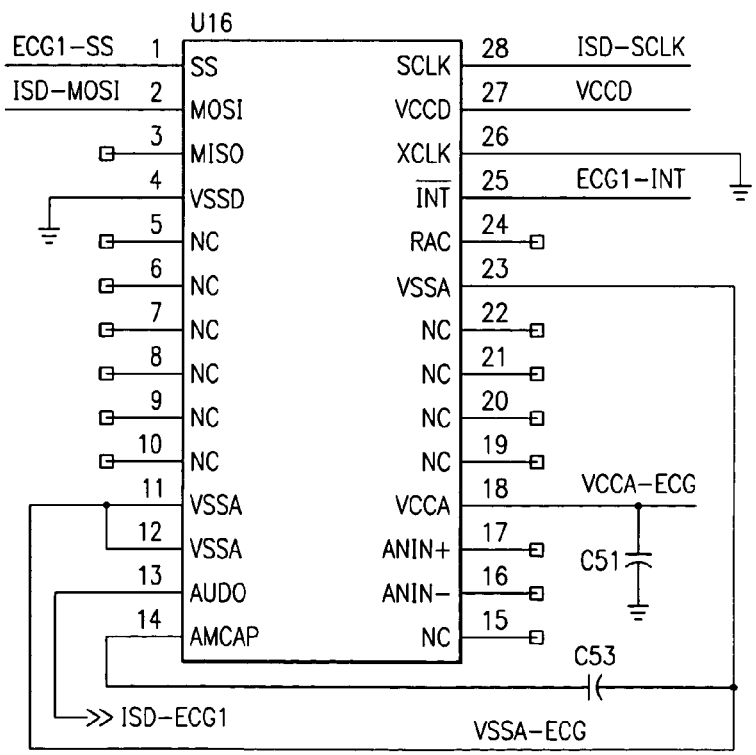
Figure 36:
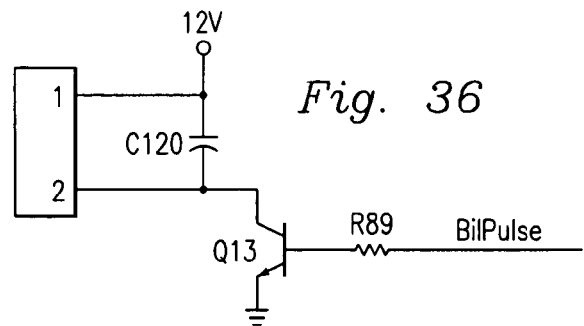
FIG. 36 is a circuit diagram of an exemplary palpable pulse site circuit that may be used in conjunction with the microprocessor of FIG. 29 or 30.
Figure 37:
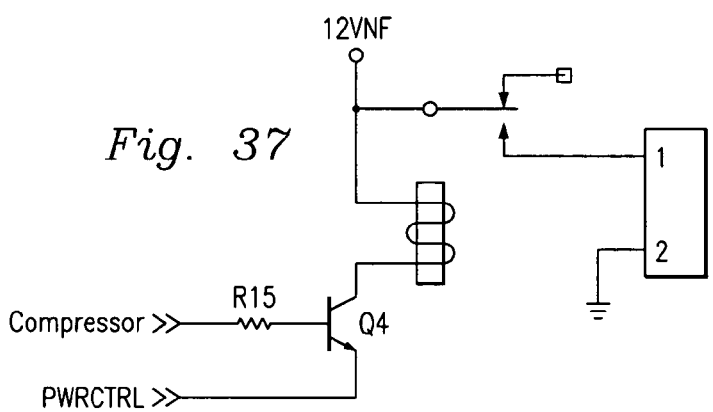
FIG. 37 is a circuit diagram of an exemplary compressor circuit that may be used in conjunction with the microprocessor of FIG. 29 or 30.
Figure 38:
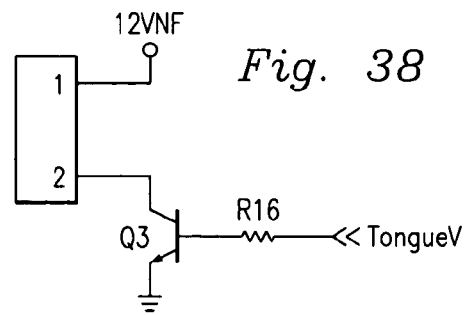
FIG. 38 is a circuit diagram of an exemplary valve actuation circuit that may be used in conjunction with the microprocessor of FIG. 29 or 30.
Figure 39:
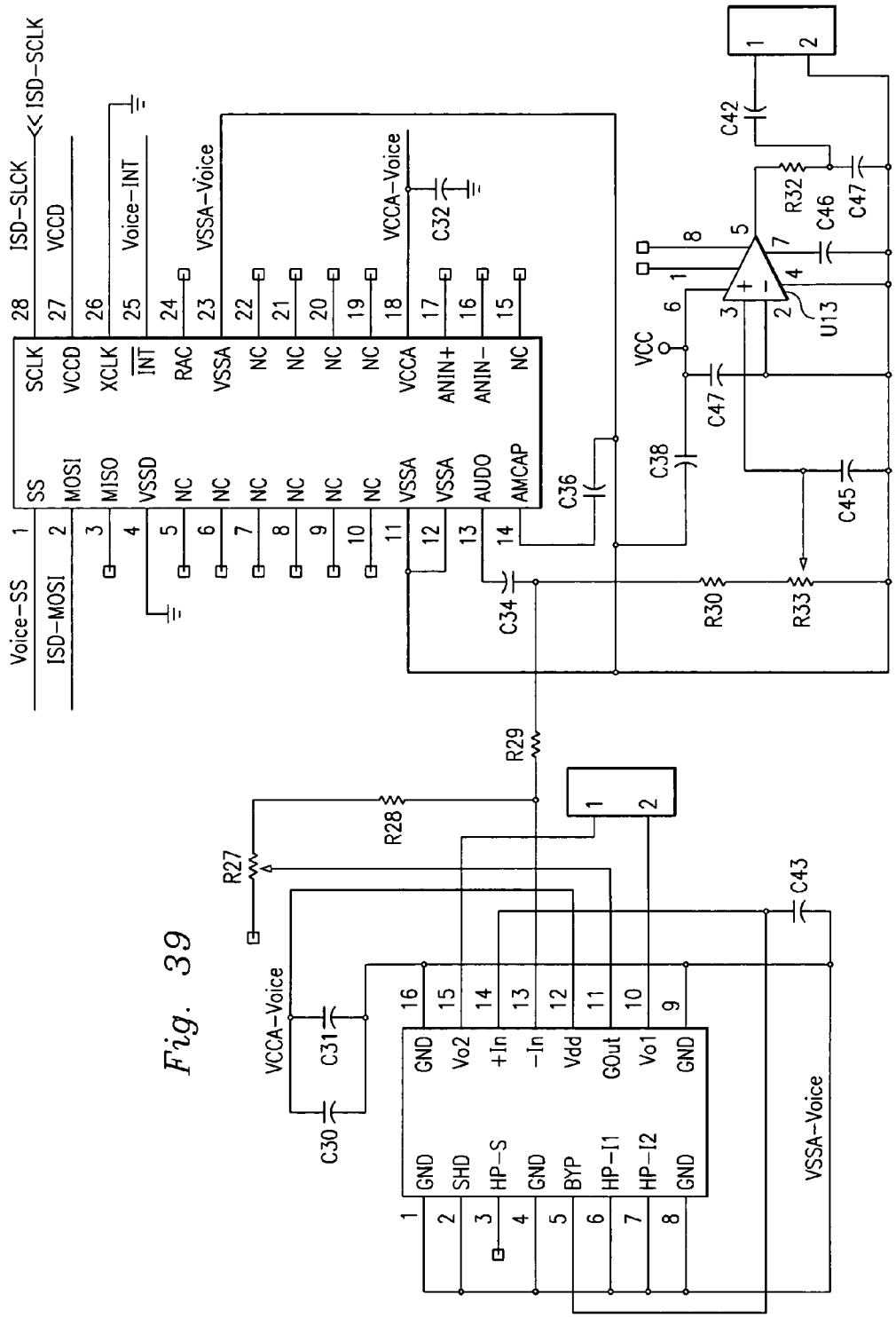
FIG. 39 is a circuit diagram of an exemplary voice circuit that may be used in conjunction with the microprocessor of FIG. 29 or 30.

The simulator system 500 may be controlled using a bidirectional wireless connection via a wireless communication module 512 (FIG. 32). A wireless communication enabled portable or handheld device 514, as well as a personal computer or similar non-portable device, may be used to communicate with the simulator system 500 via the wireless communication module 512 using another wireless communication module 516. The device 514 may include a programmable, touch-screen graphical user interface that may or may not be provided using a color display. The wireless communication module 516 may include one or more wireless protocols (e.g., Bluetooth or IEEE 802.11b) that enable the device 514 to connect and communicate with the simulator system 500 via a universal serial bus (USB) or similar connection. For example, the device 514 may be used to control the simulator system 500, save and retrieve sets of physiological data, execute scenarios on the simulator system 500, and monitor various sensors in the simulator system 500. In the present example, both the wireless communication module 512 and the wireless communication module 516 may use a RF communication module, such as an AC4490-100A or an AC4424, which are available from AeroComm, Inc. (Lenexa, Kans.). In some embodiments, the simulator system 500 may be controlled using a voice recognition system, such as Microsoft Speech, which is available from Microsoft Corp. (Redmond, Wash.). Furthermore, components of the simulator system 500 other than the main module 502 may be directly controlled by the device 514 if desired. It is understood that for such direct control to occur, the component would need an interface for communicating with the device 514, such as the wireless communication module 512.

Referring still to FIG. 24, the simulator system 500 includes a plurality of components in addition to the power circuit 504, wireless communication module 512, and pneumatic module 518. For example, the simulator system 500 may include a ventilation pressure sensor 520, a chest compression sensor 522, a bilateral BP cuff pressure sensor 524, a defibrillator/cardioverter sensor 526, an external cardiac pacemaker sensor 528, a rhythm emulator 530, a palpable pulse module 532, lung valves 534, a breathing valve 536, an airway/pneumothorax valve array 538, and a plurality of speakers, including bilateral antecubital speakers 540, a head speaker 542, a left chest speaker 544, and a right chest speaker 546. The operation of these components will be described below in greater detail.

The ventilation pressure sensor 520 is a pressure transducer that comprises a portion of a circuit (similar to that illustrated by the circuit of FIG. 33) that measures the intensity of ventilation based on the pressure inside lungs 574 independently of chest compression. The chest compression sensor 522 is a pressure transducer that comprises a portion of a circuit (e.g., FIG. 33) that measures the intensity of chest compression based on the pressure inside of a model heart (not shown) independently of ventilation. The bilateral BP cuff pressure sensor 524 comprises a portion of a circuit (FIG. 33) that measures the pressure produced by a standard blood pressure cuff applied to either arm of the manikin, as will be described later in greater detail. The defibrillator/cardioverter sensor 526 comprises a portion of a circuit (FIG. 34) that detects the delivery of a defibrillation shock produced by an external defibrillator or other defibrillation and cardioversion devices. The circuit safely dissipates the energy of defibrillation and reports the time of shock relative to an emulated ECG phase. The external cardiac pacemaker sensor 528 comprises a portion of a circuit (FIG. 34) that detects the use of an external cardiac pacing device. The circuit safely dissipates the energy of pacing and detects the pacing rate, and may also provide a signal to an ECG emulation circuit (FIGS. 35a–c) that allows the emulation of a captured ECG signal.

One or both of the processors within the main module 502 receive inputs from these sensors, which may then be transmitted to the device 514 via the wireless communication module 512. The simulator system 500 may include shunt resistors or an alternate dissipation method to dissipate the energy of defibrillation or pacing that approximates the natural electrical resistance expected by such devices.

Software within the main module 502, controllable via the device 514, may control various aspects of the behavior of the simulator system 500. For example, the processor may generate signals and use the rhythm emulator 530 to emulate the various biopotentials that might be measured in an actual patient by an AED, a defibrillator/cardioverter, an external cardiac pacemaker, or an EKG. These emulations may be executed using either recorded biopotential signals or signals generated in real time using predefined computer processes.

In some embodiments, the simulator system 500 may include external electrically conductive regions (not shown) on the skin of the manikin. These regions are locations where electrodes may be attached to the simulator system 500. For example, the manikin may include a first conductive region on its back (for attachment of a first cardiac pacemaker electrode) and second and third conductive regions on its chest (for attachment of a second cardiac pacemaker electrode, defibrillation devices, or EKG electrodes).

The manikin embodying the simulator system 500 may also have palpable pulse sites associated with the palpable pulse module 532. In the present example, the simulator system 500 includes three pulse sites representing bilateral carotid, radial, and femoral pulses. An exemplary circuit illustrated in FIG. 36 (shown for the bilateral carotid pulse site) may be used for each of the pulse sites. The intensity of the pulse at each pulse site may be independently controlled using an actuator, enabling the simulator system 500 to simulate the effect of reduced blood pressure at each site. Furthermore, each site may be independently synchronized to emulated ECG and heart sounds, and the pulse rate may be modulated by a breathing phase.

Figure 25:
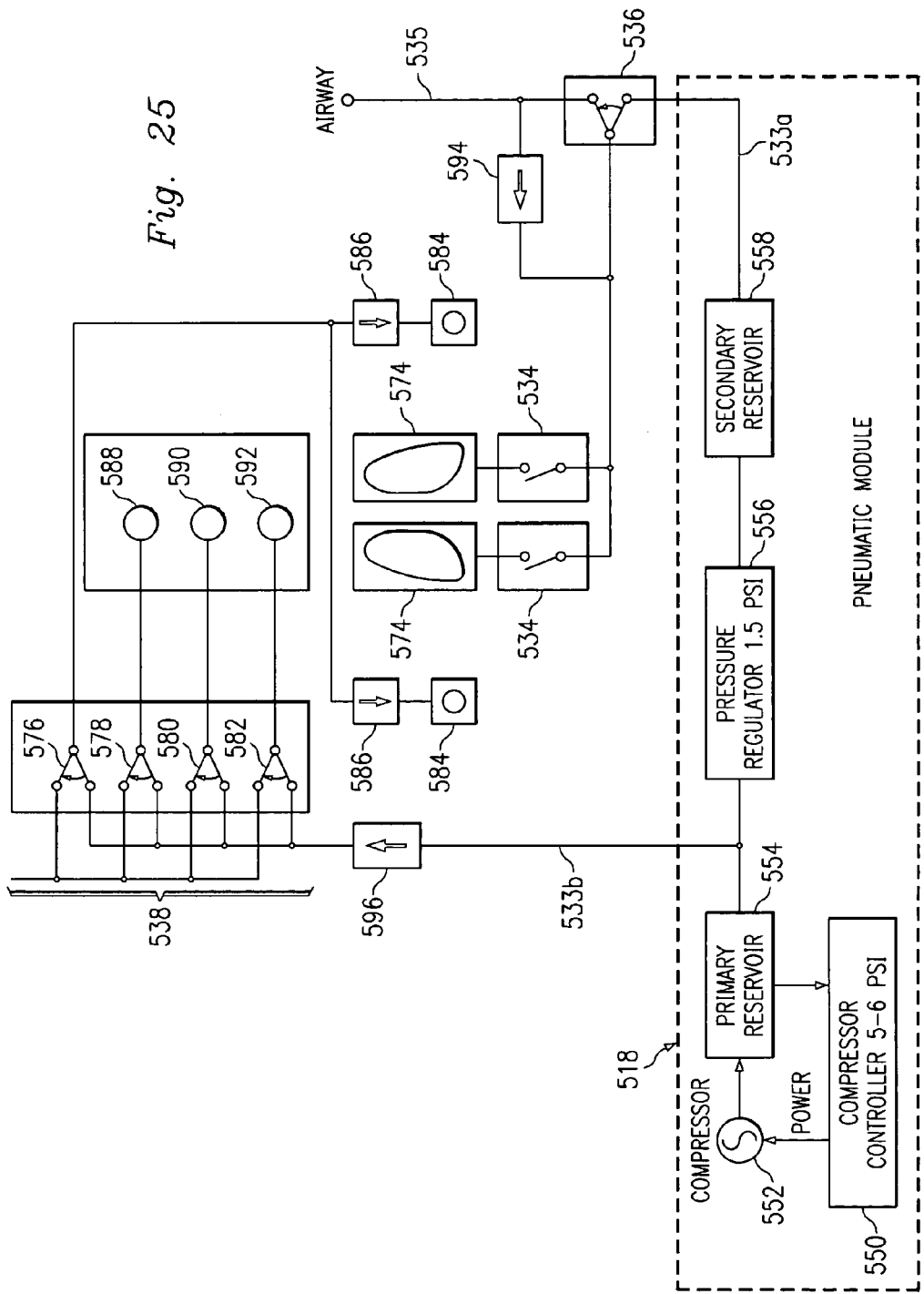
FIG. 25 is a schematic of an exemplary pneumatic module that may be used with the simulator system of FIG. 24.
Figure 26:
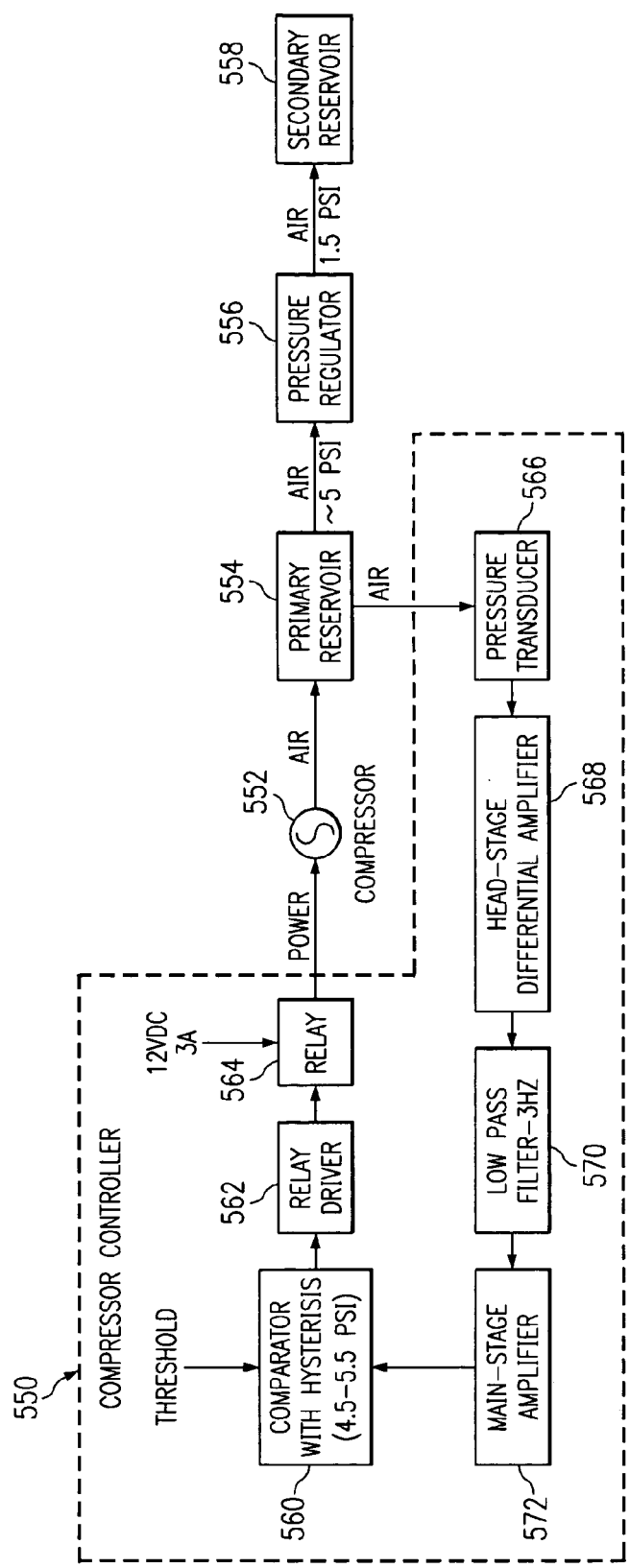
FIG. 26 is a schematic of an exemplary compressor controller that may be used with the pneumatic module of FIG. 25.

With additional reference to FIGS. 25 and 26, the pneumatic module 518, in conjunction with other components of the simulator system 500, enables the simulator system 500 to more realistically portray breathing and associated physiological conditions. In the present example, the pneumatic module 518 is controlled independently of the other components of the simulator system 500. Such independent control may be accomplished, for example, by using an on/off switch for purposes of activating and deactivating the pneumatic module 518. In other embodiments, the pneumatic module 518 may be controlled by the device 514 or the processor of the main module 502 via a compressor circuit such as that illustrated in FIG. 37.

The pneumatic module 518 includes a compressor controller 550, a compressor 552 (which may be a model 007CDC13, available from Rietschle Thomas Sheboygan, Inc., of Sheboygan, Wis.), a primary reservoir 554, a pressure regulator 556, and a secondary reservoir 558. As shown in FIG. 26, the compressor controller 518 includes a comparator 560, a relay driver 562, a relay 564, a pressure transducer 566, a head-stage differential amplifier 568, a low-pass filter 570, and a main-stage amplifier 572. Portions of the pneumatic module, such as the compressor 552, may be stored in the manikin's extremities (e.g., the legs) to minimize the transmission of sound from the pneumatic module 518 to potential sites of auscultation.

In operation, the pneumatic module 518 provides pressured air to the simulator system 500 as follows. Pressure in the primary reservoir 554 is sensed by the pressure transducer 566, which is a Wheatstone-bridge pressure transducer in the present example. The pressure transducer 566 produces a signal that is amplified by the head-stage differential amplifier 568 and then filtered by the low-pass filter 570. The filtered signal is amplified by the main-stage amplifier 572 and passed to the comparator 560. The comparator 560 is implemented with hysterisis to enable the comparator 560 to maintain a pressure between 4.5 and 5.5 pounds per square inch (psi). The comparator 560 is connected to the relay driver 562 that, based on the comparator's output, controls the relay 564 to provide power to the compressor 552 in order to maintain the pressure in the primary reservoir 554 at a predefined level. For purposes of illustration, the pressure in the primary reservoir 554 is maintained at approximately 4.5 to 5.5 psi. The pressure regulator 556, which may be a passive regulator such as a model 41795K3 regulator available from McMaster-Carr Supply Company (Atlanta, Ga.), maintains a predefined pressure in the secondary reservoir. In the present example, the secondary reservoir is maintained at a pressure of approximately 1.5 psi.

The pressured air may be provided by the pneumatic module 518 to the simulator system 500 through a first passage 533a and a second passage 533b. The pressured air may be controlled by the processor of the main module 502 using a plurality of valves or other control elements. For example, the valves may include lung valves 534, a breathing valve 536, and an airway/pneumothorax valve array 538. The pressure of the air directed to the valves depends on which reservoir is supplying the air. For purposes of illustration, the breathing valve 536 and lung valves 534 are connected to the secondary reservoir (1.5 psi) via the first passage 533a and the airway/pneumothorax valve array 538 is connected to the primary reservoir (4.5–5.5 psi) via the second passage 533b. The lung valves 534, breathing valve 536, and airway/pneumothorax valve array 538 may each be associated with a circuit, such as that illustrated in FIG. 38, that may be used to control the respective valve.

The breathing valve 536, which may be a model D2031 that is available from Humphrey Products Company (Kalamazoo, Mich.), is associated with an exhaust passage 535 (e.g., the manikin's airway) and enables the manikin to exhibit natural exhalation. The flow of air through the breathing valve 536 depends on the position in which the breathing valve 536 is set. If the breathing valve 536 is in a first position, air is directed only to the lung valves 534. If the breathing valve is in a second position, air is directed to the lung valves 534 via a one-way check valve 594, as well as to the manikin's airway 535. Note that the check valve 594 prevents air from escaping into the manikin's airway 535 when the breathing valve 536 is in the first position.

Each lung valve 534, which may be a Humphrey 315 valve that is available from Humphrey Products Company, is connected to a model lung 574 (FIG. 25). The lung valves 534 are connected to the pneumatic module 518 via one of two air paths. The particular air path depends on the position of the breathing valve 536, as described above.

To simulate inhalation, the lungs 574 may be inflated via the breathing valve 536 and during exhalation, the breathing valve 536 may be switched to allow air from the lungs 574 to escape via the airway 535. This creates a natural exhalation, which is a main indicator of breathing in the BLS protocol. During breathing, assisted ventilation may be performed to augment lung volume via the check valve 594. As previously noted, the check valve 594 prevents air from escaping into the manikin's airway 535 when the breathing valve 536 is in the first position (e.g., during inhalation).

The lung valves 534 may be actuated to provide air to the lungs 574, simulating pneumothorax or obstruction of one or both lungs. This prevents filling of one or both lungs during simulated breathing or manual ventilation. Different breathing rates and lung volumes may be stored in the main module 502 or may be set using the device 514. Furthermore, complex breathing patterns may be simulated, such as Cheyne-Stokes breathing or an asthma attack. The ventilation pressure sensor 520 provides feedback on the fluid pressure independently of chest compression of the manikin. If desired, the head speaker 542 (FIG. 24) may be used to simulate breathing sounds corresponding to the breathing pattern of the manikin.

The airway/pneumothorax valve array 538, which may be a Humphrey HG010E1 on manifold Humphrey HG110M3F that is available from Humphrey Products Company, is connected to a plurality of inflatable actuators via multiple valves 576, 578, 580, and 582. The valves 576, 578, 580, and 582 may each be controlled via a circuit such as that illustrated in FIG. 38. The valve 576 is connected to two pneumothoracotomy sites 584 that may be pressurized by a transient opening of the appropriate valve 576. Each pneumothoracotomy site 584 is an air reservoir (such as a balloon). Two check valves 586 prevent the pneumothoracotomy sites 584 from deflating once inflated, except via piercing a self-sealing latex septum enclosing each site.

The valve 578 is connected to a tongue edema air reservoir 588, which is positioned within the manikin to simulate tongue edema when inflated. The valve 580 is connected to a pharyngeal swelling air reservoir 590, which is positioned posterior to the pharynx of the manikin to simulate pharyngeal swelling when inflated. The valve 582 is connected to a laryngospasm air reservoir 592, which at least partially surrounds the larynx of the manikin to simulate laryngospasm. A check valve 596 is positioned between the primary reservoir and the airway/pneumothorax valve array 538 to prevent variations in the pressure of the air reservoirs 584, 588, 590, and 592 during breathing.

Figure 27:
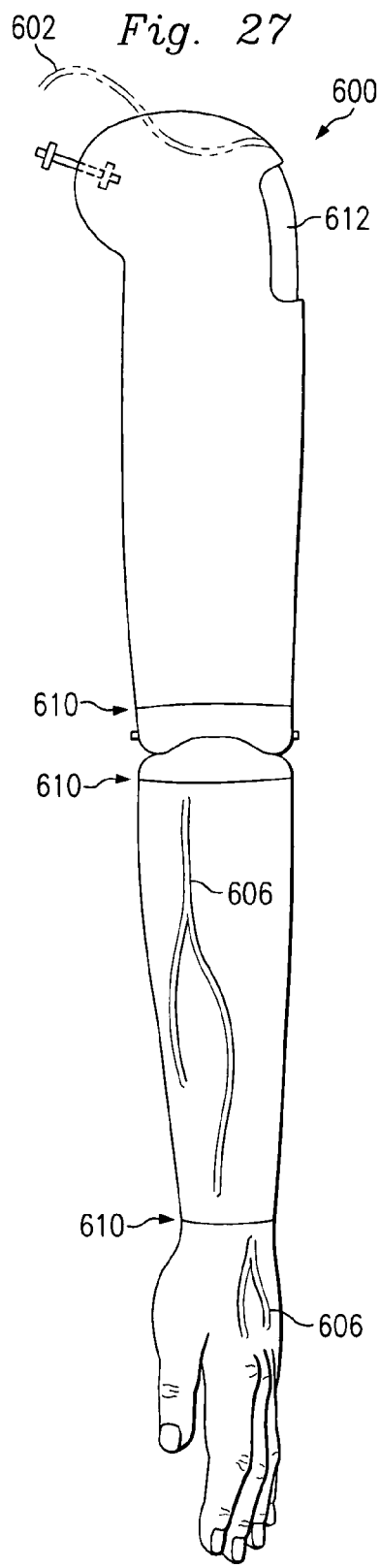
FIG. 27 is a schematic of an exemplary arm model that may be used with the simulator system of FIG. 24.
Figure 28:
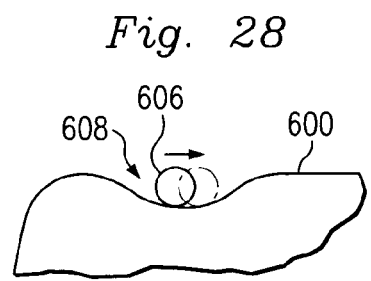
FIG. 28 is a cross-section of a lower portion of the arm model of FIG. 27.

With additional reference to FIGS. 27 and 28, an arm model 600 illustrates an exemplary implementation of a fluid passage 602 within a portion of the simulator system 500. In the present example, the fluid passage 602 is connected to a port 604 in the shoulder of the arm model 600, but it is understood that the port 604 may be located in other areas of the arm model 600 or in other areas of the model entirely (such as the torso). The arm model 600 also includes a vein system 606. As may be seen in the cross-sectional view of FIG. 28, the vein system 606 may be positioned in a groove 608 that enables a vein to "roll" with applied pressure. The arm model 600 may also include rotation points 610 that enable various portions of the model arm 600 to be rotated by a user. For example, a hand portion of the model arm 600 may be rotated by 180° to simulate a palm up, palm down, or any intermediate orientation. In the present example, the arm model 600 also includes an injection site 612.

Referring again to FIGS. 24–26, the processor of the main module 502 may control the actuation of the above-described valves, play corresponding sounds (such as those previously described with reference to Tables 1 and 2), and perform other functions to simulate a wide range of scenarios. In addition, the processor may perform at least some physiological modeling to create more realistic scenarios. For example, when executing certain cardiac rhythms, the processor may cause the manikin's heart rate to decrease during exhalation to simulate the sinovagal reflex.

Figure 40:
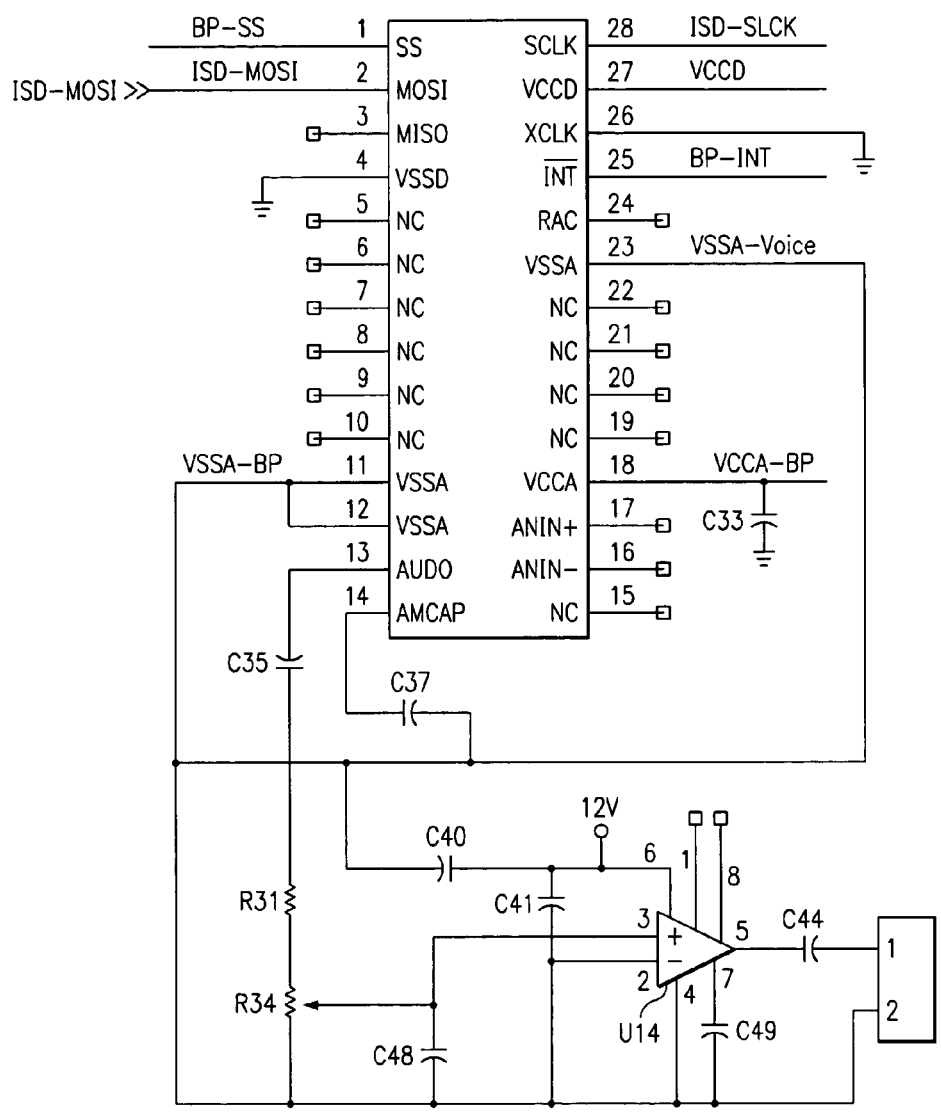
FIG. 40 is a circuit diagram of an exemplary sound circuit that may be used in conjunction with the microprocessor of FIG. 29 or 30.

The processor may also synchronize heart sounds (projected via the left heart speaker 544 and right heart speaker 546) with the selected cardiac rhythm. Furthermore, the processor may synchronize emulated EKG signals with palpable pulse actuators (associated with the palpable pulse module 532) and the heart sounds. Similarly, the intensity of the palpable pulse actuators may be varied to correspond to blood pressure. Lung sounds (projected via the left heart speaker 544 and right heart speaker 546) may be controlled by the processor to reflect the state of the pneumothorax. Korotkoff sounds (projected via the bilateral antecubital speakers 540) may be manipulated by the processor to correspond to the relation between simulated blood pressure and applied BP cuff pressure. In some embodiments, the head speaker 542 may be used to provide speech, breath sounds, and other vocalizations. For example, the speech may be recorded or may be generated using a speech synthesis engine such as the Festival Speech Synthesis System available from The Centre for Speech Technology Research (Edinburgh, Scotland). These sounds may be controlled via a voice circuit (FIG. 39) and a plurality of other circuits (one of which is illustrated in FIG. 40) for heart sounds, lung sounds, and other sounds.

It is understood that these are merely examples of physiological modeling that may be performed by the processor, and that other modeling may be used to simulate physiology. Such modeling may be transmitted from the device 514, stored in the processor, or stored on a memory device (e.g., a flash card or hard drive) that is accessible to the processor. Furthermore, the processor may provide such modeling in real time, or may augment a preexisting scenario by supplying real time modeling to portions of the scenario. For example, waveforms may be generated by the processor in real time to correspond with a scenario being executed.

In still another embodiment, a "virtual instruments" accessory may be used in place of actual medical equipment. One example of such an accessory is a portable computer, such as a laptop, that is equipped with a data acquisition (analog to digital) device and an external interface unit.

By recording emulated signals from a manikin (e.g., the simulator system 500 of FIG. 24) and by communicating directly with the device 514 (FIG. 24), the accessory may mimic AED, defibrillator, external cardiac pacemaker, automatic blood pressure, and pulse-oxygen-saturation devices. Libraries of recorded or dynamically generated biopotential signals may displayed in a variety of formats corresponding to the devices being mimicked. The external interface unit may accommodate AED, EKG, and external cardiac pacemaker electrodes, as well as defibrillator paddles (e.g., those devices that depend on both emulated cardiac biopotentials and electrode attachment quality). The external interface unit may also provide a virtual automatic blood pressure cuff and a pulse-oxygenation "finger-clip" probe, which may not require data acquisition of emulated signals, but may simply detect proper attachment and communicate wirelessly with the device 514 to determine a simulated physiological state.

Although illustrative embodiments have been shown and described, a wide range of modifications, changes, and substitutions are contemplated. It is understood that modifications, changes and substitutions are intended in the foregoing disclosure and in some instances some features of the invention will be employed without a corresponding use of other features. Furthermore, it is understood that variations may be made in the foregoing embodiments without departing from the scope of the disclosure. For example, although the processor of the main module 502 and the device 514 are illustrated with particular functionality, it is understood that their functionality may overlap and that each one may perform functions described above with respect to the other. In addition, although the pneumatic module and associated valves and reservoirs are described as using air, it is understood that any fluid may be used. Furthermore, although exemplary circuit configurations are illustrated, it is understood that the same functionality may be achieved using other circuit configurations and/or software. Improvements or modifications that become apparent to persons of ordinary skill in the art only after reading this disclosure are deemed within the spirit and scope of the application. Accordingly, it is appropriate that the appended claims be construed broadly and in a manner consistent with the scope of the invention.

What is claimed is:

1. A simulator system for teaching patient care to a user, the system comprising:
   a model of at least a portion of a human body, wherein the model comprises first and second lungs, a first fluid passage in fluid communication with the lungs, and a breathing valve, wherein the breathing valve is adapted to control the flow of fluid through the first fluid passage;
   a pneumatic module in fluid communication with first fluid passage and adapted for delivering pressurized fluid to the first fluid passage;
   a processor accessible to the breathing valve; and
   a memory accessible to the processor for storing a plurality of instructions for execution by the processor, the instructions including instructions for manipulating the breathing valve to regulate the flow of pressurized fluid from the pneumatic module through the first fluid passage to the first and second lungs.

2. The simulator system of claim 1 further comprising a fluid exhaust passage located within the model and adapted for directing fluid that is exiting the first and second lungs out of a mouth of the model.

3. The simulator system of claim 2 wherein the fluid exhaust passage is in fluid communication with the breathing valve.

4. The simulator system of claim 1 further comprising first and second lung valves accessible to the processor and positioned between the breathing valve and the first and second lungs, wherein the first lung valve controls the flow of fluid to the first lung, and wherein the second lung valve controls the flow of fluid to the second lung.

5. The simulator system of claim 1 further comprising:
   a first fluid reservoir;
   a second fluid passage in fluid communication with the first fluid reservoir and the pneumatic module; and
   a fluid reservoir valve positioned in the second fluid passage between the first fluid reservoir and the pneumatic module, wherein the fluid reservoir valve is adapted to inflate the first fluid reservoir by controlling the flow of fluid through the second fluid passage to the first fluid reservoir.

6. The simulator system of claim 5 further comprising a second fluid reservoir associated with the second fluid passage and controllable by the fluid reservoir valve, wherein the first and second fluid reservoirs are positioned within the model to serve as pneumothoracotomy sites.

7. The simulator system of claim 6 wherein the first and second fluid reservoirs each comprise a self-sealing latex septum.

8. The simulator system of claim 6 further comprising a one-way valve positioned between the pneumatic module and the first and second fluid reservoirs.

9. The simulator system of claim 5 wherein the first fluid reservoir is positioned within the model to simulate tongue edema when inflated.

10. The simulator system of claim 5 wherein the first fluid reservoir is positioned within the model to simulate pharyngeal swelling when inflated.

11. The simulator system of claim 5 wherein the first fluid reservoir is positioned within the model to simulate laryngospasm when inflated.

12. The simulator system of claim 5 wherein the fluid reservoir valve is accessible to the processor; and wherein the plurality of instructions stored in the memory for execution by the processor include instructions for manipulating the fluid reservoir valve to regulate the flow of pressurized fluid from the pneumatic module through the second fluid passage to the first fluid reservoir.

13. The simulator system of claim 1 further comprising a model heart, wherein the plurality of instructions stored in the memory for execution by the processor include instructions for altering a pace of the heart.

14. The simulator system of claim 13 wherein the heart is modeled in software.

15. The simulator system of claim 1 further comprising at least one palpable pulse actuator, wherein the plurality of instructions stored in the memory for execution by the processor include instructions for varying an intensity of the actuator.

16. The simulator system of claim 15 wherein the plurality of instructions stored in the memory for execution by the processor include instructions for synchronizing emulated EKG signals with the palpable pulse actuator.

17. The simulator system of claim 1 further comprising a plurality of speakers controllable by the processor.

18. The simulator system of claim 17 wherein the plurality of instructions stored in the memory for execution by the processor include instructions for synchronizing heart sounds projected from at least one of the speakers with a selected cardiac rhythm.

19. The simulator system of claim 17 wherein the plurality of instructions stored in the memory for execution by the processor include instructions for projecting lung sounds via at least one of the speakers.

20. The simulator system of claim 17 further comprising a speech synthesizer adapted for projecting simulated speech via at least one of the speakers.

21. The simulator system of claim 20 wherein the speech is pre-recorded.

22. The simulator system of claim 20 wherein the speech is dynamically generated.

23. The simulator system of claim 1 further comprising a wireless interface between the processor and an external device, wherein the processor is adapted to be controlled by the external device via the wireless interface.

24. The simulator system of claim 1 wherein the model further comprises a plurality of sensors accessible to the processor.

25. The simulator system of claim 24 wherein the sensors include an external cardiac pacemaker sensor.

26. The simulator system of claim 24 wherein the sensors include a chest compression sensor.

27. The simulator system of claim 24 wherein the sensors include a ventilation sensor.

28. The simulator system of claim 24 wherein the sensors include a bilateral blood pressure cuff pressure sensor.

29. The simulator system of claim 24 wherein the sensors include a defibrillation/cardioversion sensor.

30. The simulator system of claim 1 further comprising a battery located within the model.

31. The simulator system of claim 30 further comprising a power supply adapted for providing power to the simulator system using line power or the battery.

32. The simulator system of claim 31 wherein the power supply is adapted to provide power to the simulator system using line power when attached to an external power source, and using battery power when not attached to an external power source.

33. The simulator of claim 30 wherein the battery is removable and adapted for charging by a charging device external to the simulator.

34. A simulator system for teaching patient care to a user, the system comprising:
- a model comprising first and second lungs, a first air passage adapted for providing air to the lungs, and a first valve, wherein the first valve is adapted to control the flow of air through the first air passage;
- a pneumatic module adapted for delivering air to the first air passage;
- a processor adapted for controlling the first valve; and
- a memory accessible to the processor for storing a plurality of instructions for execution by the processor, the instructions including instructions for controlling the first valve to regulate the flow of air from the pneumatic module through the first air passage to the first and second lungs.

35. The simulator system of claim 34 further comprising:
- a second air passage associated with an inflatable reservoir and the pneumatic module; and
- a second valve positioned between the inflatable reservoir and the pneumatic module, wherein the second valve is adapted to inflate the inflatable reservoir by controlling the flow of air through the second air passage.

36. The simulator system of claim 35 wherein the pneumatic module comprises:
- a compressor;
- a primary reservoir in fluid communication with the compressor;
- a secondary reservoir in fluid communication with the primary reservoir;
- a regulator positioned between the primary and secondary reservoirs, wherein the regulator is adapted to maintain the secondary reservoir at a lower pressure than the primary reservoir; and
- a compressor controller in fluid communication with the compressor and the primary reservoir.

37. The simulator system of claim 36 wherein the first air passage is in fluid communication with the secondary reservoir.

38. The simulator system of claim 37 wherein the second air passage is in fluid communication with the primary reservoir.

39. The simulator system of claim 36 wherein the compressor controller comprises:
- a pressure transducer in fluid communication with the primary reservoir;
- a comparator for comparing a pressure detected by the pressure transducer to a predefined pressure threshold; and
- a relay associated with the comparator and the compressor, wherein the relay is adapted for providing power to the compressor upon receiving a signal from the comparator.

40. The simulator system of claim 34 wherein the instructions include instructions for:
- providing a plurality of scenarios, wherein each scenario is associated with at least one physiological behavior;
- enabling a user to select one of the plurality of scenarios; and
- simulating the physiological behavior of the selected scenario using the model.

41. The simulator system of claim 40 wherein the instructions include instructions for linking together a plurality of scenarios into a single scenario.

42. The simulator system of claim 40 wherein the instructions include instructions for trending, wherein a parameter associated with a scenario is altered as the scenario is executed.

43. The simulator system of claim 40 further comprising a wireless interface associated with the processor, wherein the processor is controllable via the wireless interface by an external device.

44. The simulator system of claim 40 wherein instructions include instructions for creating a plurality of waveforms that correspond to the selected scenario.

45. The simulator system of claim 44 wherein at least some of the waveforms are dynamically generated by the processor.

* * * * *